US010339598B1

(12) United States Patent
Karpan et al.

(10) Patent No.: US 10,339,598 B1
(45) Date of Patent: Jul. 2, 2019

(54) METHOD, APPARATUS, AND SYSTEM FOR DISPLAYING A WEARABLE ARTICLE INTERFACE ON AN ELECTRONIC DEVICE

(71) Applicant: Amy's Closet, LLC, Brooklyn Park, MD (US)

(72) Inventors: Amy Kathryn Karpan, Brooklyn Park, MD (US); Walter Franklin Coppersmith, III, Round Rock, TX (US); Quoc Vong Tran, Austin, TX (US)

(73) Assignee: AMY'S CLOSET, LLC, Brooklyn Park, MD (US)

( * ) Notice: Subject to any disclaimer, the term of this patent is extended or adjusted under 35 U.S.C. 154(b) by 0 days.

(21) Appl. No.: 16/189,823

(22) Filed: Nov. 13, 2018

Related U.S. Application Data

(60) Provisional application No. 62/731,635, filed on Sep. 14, 2018.

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0621* (2013.01); *G06Q 30/0627* (2013.01); *G06Q 30/0633* (2013.01)

(58) Field of Classification Search
CPC .................................. G06Q 30/06–08
USPC ................................ 705/26.1–27.2
See application file for complete search history.

(56) References Cited

U.S. PATENT DOCUMENTS

| 2009/0222127 | A1* | 9/2009 | Lind | A41H 3/007 |
| | | | | 700/132 |
| 2010/0030663 | A1* | 2/2010 | Wannier | G06Q 10/043 |
| | | | | 705/26.1 |

* cited by examiner

*Primary Examiner* — Ethan D Civan
(74) *Attorney, Agent, or Firm* — Dickinson Wright PLLC

(57) ABSTRACT

An electronic device including a computing system is provided. The computing system includes a memory and at least one processor. The computing system is configured to receive a selection of one or more preferences for wearable articles. The computing system is also configured to receive a selection of a first wearable article of a first article type displayed on a display screen. The computing system is further configured to identify one or more additional wearable articles each having a different article type from the first article type. In addition, the computing system is configured to generate for display on the display screen a second wearable article of a second article type from the one or more additional wearable articles based on at least one preference of the one or more preferences.

18 Claims, 39 Drawing Sheets

METHOD, APPARATUS, AND SYSTEM FOR DISPLAYING A WEARABLE ARTICLE INTERFACE ON AN ELECTRONIC DEVICE

CLAIM OF PRIORITY AND CROSS-REFERENCE TO RELATED APPLICATIONS

This Application claims the benefit of U.S. Provisional Application Ser. No. 62/731,635 filed Sep. 14, 2018 titled "Method, Apparatus, and System for Displaying a Wearable Article Interface on an Electronic Device." The provisional application is incorporated by reference herein as if reproduced in full below.

TECHNICAL FIELD

The present disclosure relates to displaying wearable articles on a user interface for display and sale.

BACKGROUND

Shoppers continuously search for mediums to efficiently and effectively search for and purchase clothing and other wearable articles. Often shoppers buy multiple articles of clothing or wearable articles for a specific purpose or a specific occasion. When shopping electronically, shoppers are often unable to visualize how many selected wearable articles may appear when worn or when paired with other wearable articles.

SUMMARY

This disclosure provides systems and methods for displaying a wearable article interface on an electronic device.

In a first embodiment, the disclosure provides an electronic device including a computing system. The computing system includes a memory and at least one processor. The computing system is configured to receive a selection of one or more preferences for wearable articles. The computing system is also configured to receive a selection of a first wearable article of a first article type displayed on a display screen. The computing system is further configured to identify one or more additional wearable articles each having a different article type from the first article type. In addition, the computing system is configured to generate for display on the display screen a second wearable article of a second article type from the one or more additional wearable articles based on at least one preference of the one or more preferences.

In a second embodiment, the disclosure provides a method implemented by a computing system of an electronic device. The method includes receiving, by the computing system, a selection of one or more preferences for wearable articles. The method also includes receiving, by the computing system, a selection of a first wearable article of a first article type displayed on a display screen. The method further includes identifying, by the computing system, one or more additional wearable articles each having a different article type from the first article type. In addition, the method includes generating, by the computing system, for display on the display screen a second wearable article of a second article type from the one or more additional wearable articles based on at least one preference of the one or more preferences.

In a third embodiment, the disclosure provides a non-transitory, computer-readable storage medium. The non-transitory, computer-readable storage medium stores one or more executable instructions that, when executed by at least one processor, causes the at least one processor to receive a selection of one or more preferences for wearable articles. The one or more executable instructions that, when executed by at least one processor, also causes the at least one processor to receive a selection of a first wearable article of a first article type displayed on a display screen. The one or more executable instructions that, when executed by at least one processor, further causes the at least one processor to identify one or more additional wearable articles each having a different article type from the first article type. In addition, the one or more executable instructions that, when executed by at least one processor, causes the at least one processor to generate for display on the display screen a second wearable article of a second article type from the one or more additional wearable articles based on at least one preference of the one or more preferences.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIG. 1 through 39, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
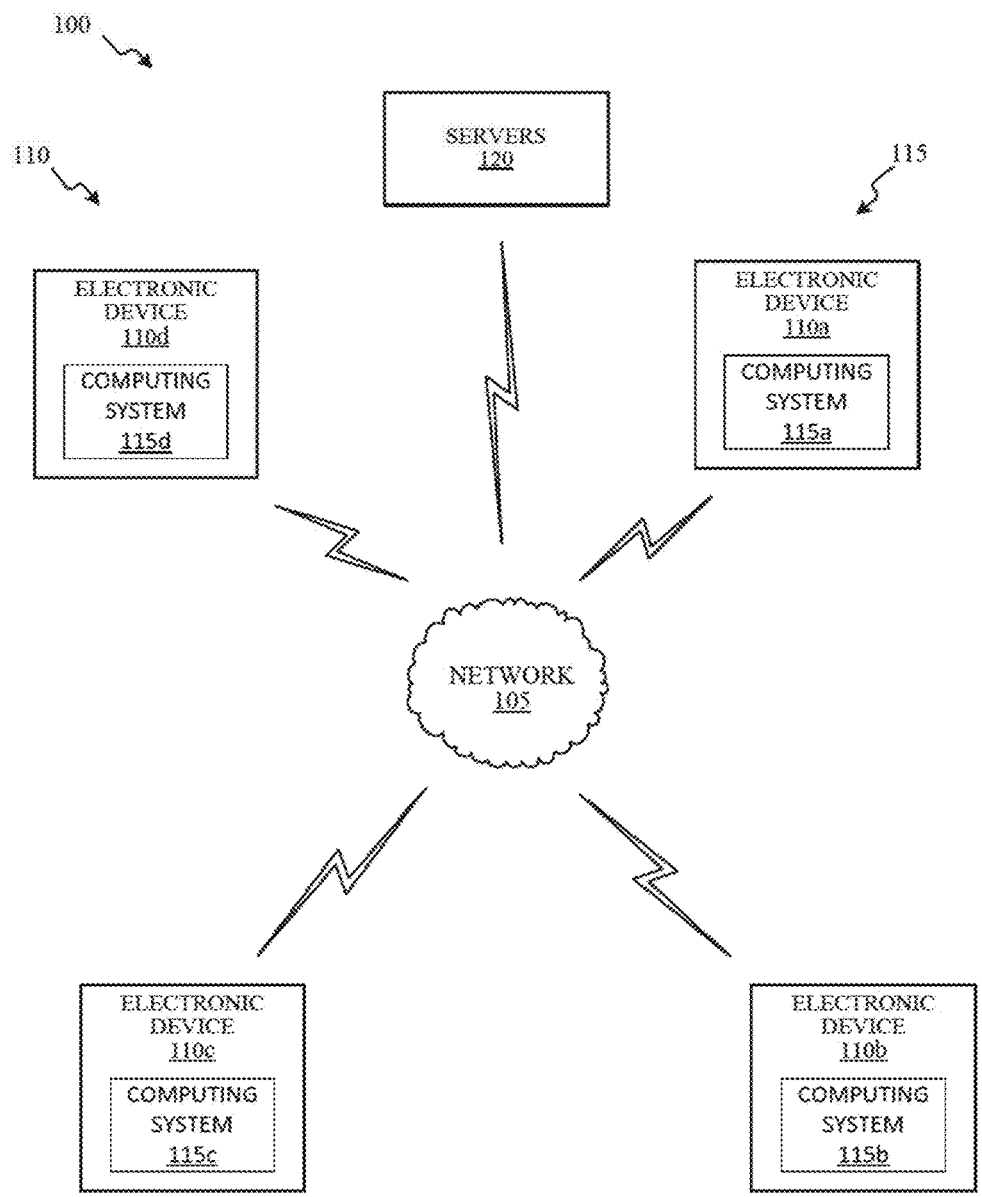
FIG. 1 illustrates a non-limiting, example network context for operating an electronic device according to certain embodiments of this disclosure.

FIG. 1 illustrates a non-limiting, example network context 100 for operating one or more electronic device 110 according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., an Ethernet connection) or over a wireless connection (e.g., a wireless local area network "WLAN" connection, a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit-switched cellular, 3G, LTE, WiBro) and internet protocols (e.g., HTTP).

The one or more constituent networks of the network 105 provide two-way electronic connectivity and electronic communication between each of the electronic devices 110 and the one or more servers 120. In certain embodiments, the one or more constituent networks of the network 105 provide two-way electronic connectivity and electronic communication between each of the electronic devices 110 and the one or more servers 120 using one or more same or different channels, protocols, or networks of network 105. For example, a circuit-switched cellular protocol wireless network of the network 105 provides electronic connectivity and electronic communication between the first electronic device 110a and the one or more servers 120 while a POTS wireless network of the network 105 provides electronic connectivity and electronic communication between the third electronic device 110c and the one or more servers 120.

In certain embodiments, the network context 100 may, according to certain embodiments, include one or more servers 120. In certain embodiments, the one or more servers 120 store a plurality of article profiles. Each article profile may include at least one of one or more generic article names, one or more images including an article, a description of an article, one or more characteristics of an article, one or more article types of an article, an article price, a merchant profile associated with (e.g., selling) an article, an article condition, or the like. In certain embodiments, an article profile may contain a history or provenance and identity verification characteristics for an article, such that articles a life history (e.g., sales, alterations, owners and uses) of an article may be tracked. In certain embodiments, an article profile may contain links to media (e.g., stories, pictures of the article in use, video of the article being worn), to tell the story of the life of the article through integrated media. In certain embodiments, an article may be a wearable article that may include at least one of a pair of shoes, a pair of pants, a rain jacket, a sweater, a pair of socks, a pair stockings, a shirt, a blouse, a coat, a hat, a pair of sunglasses, a bracelet, a ring, a pair of earrings, an undergarment, a scarf, a pair of leggings, a swimsuit, a robe, a pair of slippers, a pair of sandals, a clutch, a shawl, a purse, a handbag, a tie, a pair of cuff-links, a belt, a wallet, a watch, or the like. In certain embodiments, one or more characteristics of an article may include an article brand name, an article product name, an article size, one or more materials or fabrics forming an article, one or more colors of an article, one or more dimensions of an article, a condition of an article, or the like. In certain embodiments, one or more article types may include one or more article styles, one or more levels of formality (e.g., suited for formal events, suited for daily activity, suited for recreational activity).

The one or more servers 120 may also be configured to store created user profiles associated with users who may want to search, purchase, or sell wearable article through their electronic device 110 executing one or more wearable article display operations. In certain embodiments, the one or more servers 120 may also store wearable articles images and information associated with wearable articles for sale through each of the user profiles.

In certain embodiments, the network context 100 includes one or more electronic devices 110. The one or more electronic devices 110 may include a first electronic device 110a, a second electronic device 110b, a third electronic device 110c, and a fourth electronic device 110d. In certain embodiments, each of the one or more electronic devices 110 is configured to communicate data with the one or more servers 120 through the network 105. In certain embodiments, each of the one or more electronic devices 110 are configured to execute one or more wearable article display operations. In certain embodiments, each of the electronic devices 110 includes an electronic device display screen, an electronic device memory, and at least one electronic device processor. The electronic devices 110 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, a storage device, a peripheral device such as a switch, modem, router, or in general any type of electronic computing device.

In certain embodiments, each of the one or more electronic devices 110 includes a computing system 115. For example, the first electronic device 110a includes a first computing system 115a, the second electronic device 110b includes a second computing system 115b, the third electronic device 110c includes a third computing system 115c, and the fourth electronic device 110d includes a fourth computing system 115d. Each of the computing systems 115 may include an electronic device memory and at least one electronic device processor to execute one or more interactive gaming operations discussed herein.

Figure 2:
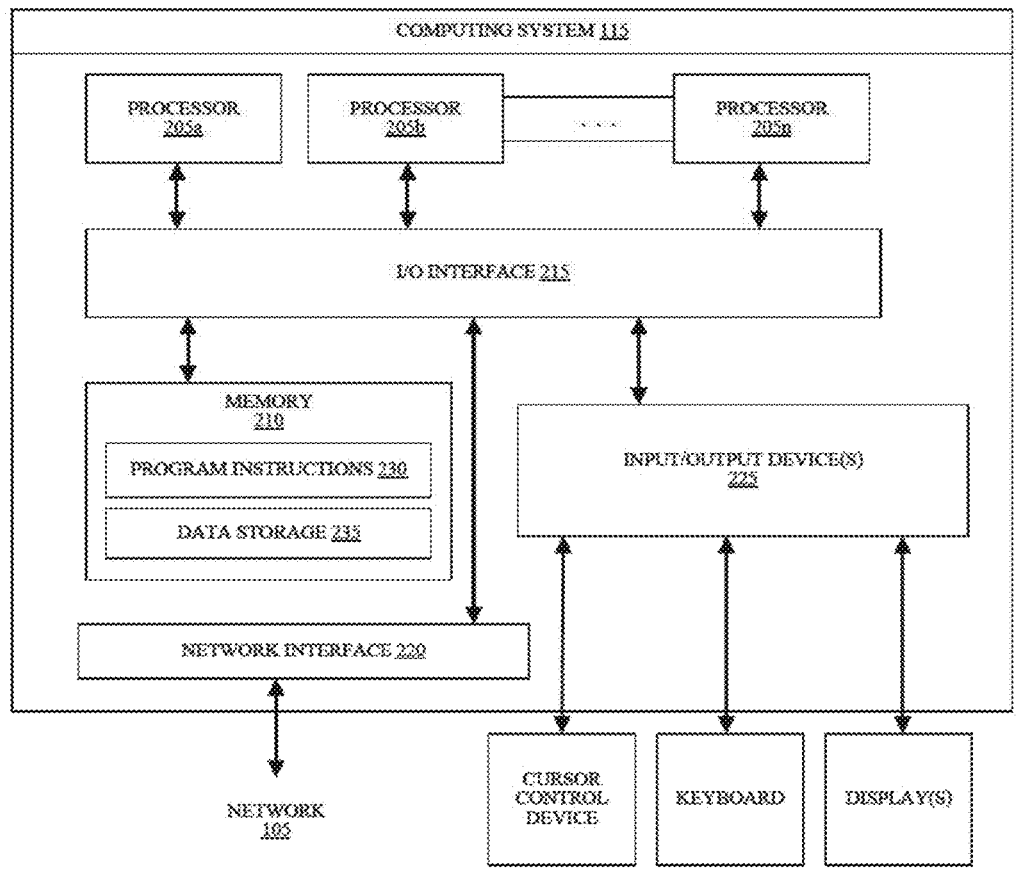
FIG. 2 illustrates a non-limiting, example computing system configured for wearable article display operations according to certain embodiments of this disclosure.

FIG. 2 illustrates a non-limiting, example of the computing system 115 illustrated in FIG. 1. The computing system 115 is configured to execute any and all of the embodiments and operations described herein including embodiments for performing one or more wearable article display operations. In certain embodiments, the computing system 115 may perform one or more wearable article display operations using the network 105 to receive a selection of one or more preferences for wearable articles, receive a selection of a first wearable article of a first article type displayed on a display screen, identify one or more additional wearable articles each having a different article type from the first article type, and generate for display on the display screen a second wearable article of a second article type from the one or more additional wearable articles based on at least one preference of the one or more preferences. In different embodiments, the computing system 115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for wearable article display operations, as described herein, may be executed on one or more computing systems 115, which may interact with various other devices. In the illustrated embodiment, the computing system 115 may include one or more processors 205a, 205b, . . . , and 205n (hereinafter "one or more processors 205," "processors 205," or "processor 205") coupled to a memory 210 via an input/output (I/O) interface 215. The computing system 115 may further include a network interface 220 coupled to I/O interface 215, and one or more input/output devices 225, such as cursor control device of the electronic device 110, a keyboard of the electronic device 110, and one or more displays of the electronic device 110. In some cases, it is contemplated that embodiments may be implemented using a single instance of computing system 115, while in other embodiments multiple such systems, or multiple nodes making up the computing system 115, may be configured to host different portions or instances of embodiments. For example, in one embodiment some elements may be implemented via one or more nodes of computing system 115 that are distinct from those nodes implementing other elements.

In various embodiments, the computing system 115 may be a uniprocessor system including one processor 205a, or a multiprocessor system including several processors 205a-205n (e.g., two, four, eight, or another suitable number). The processor 205 may be any suitable processor capable of executing instructions including instructions or operations for wearable article display operations as described herein. For example, in various embodiments the processor 205 may be general-purpose or embedded processors implementing any of a variety of instruction set architectures (ISAs), such as the x86, PowerPC, SPARC, or MIPS ISAs, or any other suitable ISA. In multiprocessor systems, each of processors 205 may commonly, but not necessarily, implement the same ISA.

The memory 210 may be configured to store the executable instructions or program instructions 230 in the data storage 235 accessible by the processor 205. In various embodiments, the memory 210 may be implemented using any suitable memory technology, such as static random access memory (SRAM), synchronous dynamic RAM (SDRAM), nonvolatile/Flash-type memory, or any other type of memory. In the illustrated embodiment, the program instructions 230 may be configured to implement a system for displaying wearable articles incorporating any of the functionality, as described herein. In some embodiments, program instructions 230 or data may be received, sent, or stored upon different types of computer-accessible media or on similar media separate from the memory 210 or the computing system 115. The computing system 115 is described as implementing at least some of the functionality of functional blocks in the figures described herein.

In certain embodiments, the I/O interface 215 may be configured to coordinate I/O traffic between the processor 205, the memory 210, and any peripheral devices in the computing system 115, including the network interface 220 or other peripheral interfaces, such as the input/output devices 225. In some embodiments, the I/O interface 215 may perform any necessary protocol, timing or other data transformations to convert data signals from one component (e.g., the memory 210) into a format suitable for use by another component (e.g., the processor 205). In some embodiments, the I/O interface 215 may include support for devices attached through various types of peripheral buses, such as a variant of the Peripheral Component Interconnect (PCI) bus standard or the Universal Serial Bus (USB) standard, for example. In some embodiments, the function of the I/O interface 215 may be split into two or more separate components, such as a north bridge and a south bridge, for example. Also, in some embodiments some or all of the functionality of the I/O interface 215, such as an interface to the memory 210, may be incorporated directly into the processor 205.

The network interface 220 may be configured to allow data to be exchanged between the computing system 115 and other devices attached to the network 105 (e.g., one or more servers 120) or between nodes of the computing system 115. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 225 may, in some embodiments, include one or more display terminals, keyboards, keypads, touchpads, scanning devices, voice, or optical recognition devices, or any other devices suitable for entering or accessing data by one or more computing systems 115. Further, various other sensors may be included in the I/O devices 225, such as imaging sensors, barometers, altimeters, LIDAR, or any suitable environmental sensor. Multiple input/output devices 225 may be present in the computing system 115 or may be distributed on various nodes of the computing system 115. In some embodiments, similar input/output devices may be separate from the computing system 115 and may interact with one or more nodes of the computing system 115 through a wired or wireless connection, such as over the network interface 220.

As shown in FIG. 2, the memory 210 may include program instructions 230, which may be processor-executable to implement any element, action, or operation including wearable article display operations, as described herein. In certain embodiment, the program instructions may implement at least a portion of methods described herein, such as the methods illustrated by FIGS. 34-38. In other embodiments, different elements and data may be included. Note that the data storage 235 may include any data or information, as described herein.

Those skilled in the art will appreciate that the computing system 115 is merely illustrative and is not intended to limit the scope of embodiments. In particular, the computing system 115 and devices may include any combination of hardware or software that can perform the indicated functions, including computers, network devices, Internet appliances, PDAs, wireless phones, pagers, GPUs, specialized computer systems, information handling apparatuses, or the like. The computing system 115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 115 may be transmitted to the computing system 115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or nonvolatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

As described herein, the computing system 115, utilizing the at least one processor 205, is configured to execute one or more wearable article display operations. In certain embodiments, the computing system 115, utilizing one or more processors 205, generates an interface display for display on a display screen. The interface display may be used to set up a new user profile or login into an existing user profile to view wearable articles, purchase viewed wearable articles, and post wearable articles for sale as described herein.

Figure 3A:
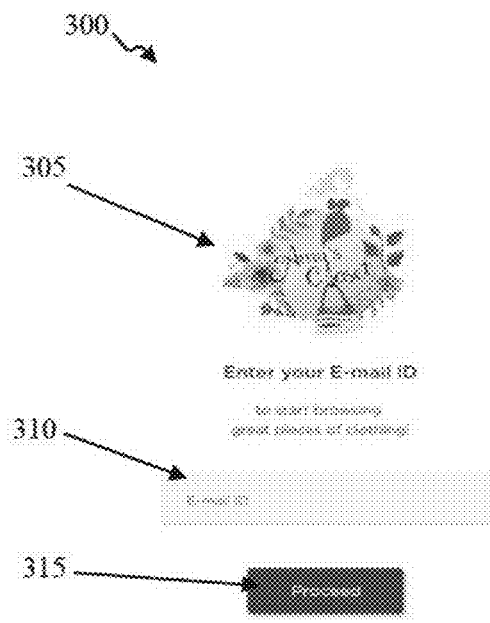
FIGS. 3A, 3B, and 3C illustrate non-limiting, example user interface displays according to certain embodiments of the disclosure.
Figure 3B:
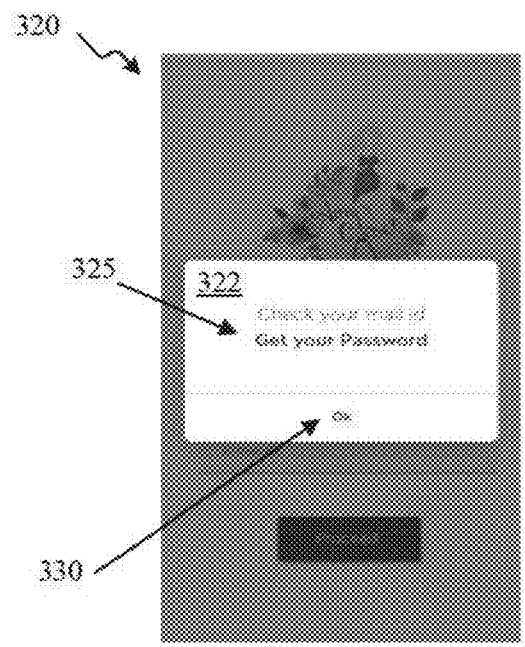
Figure 3C:
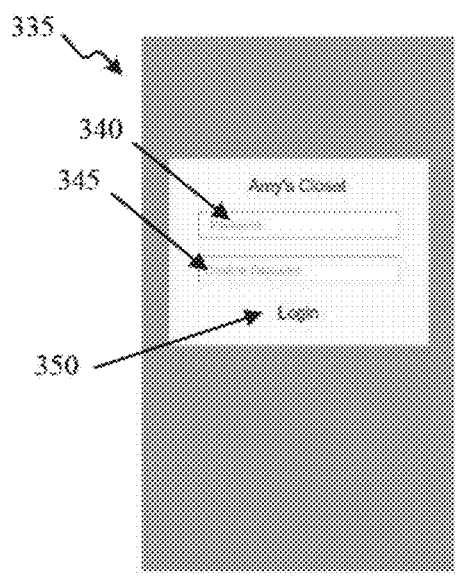

FIGS. 3A, 3B, and 3C illustrate non-limiting, example user interface displays 300, 320, and 335, respectively, according to certain embodiments of the disclosure. As shown in FIG. 3A, the user interface display 300 may include a message 305. The message 305 may include a logo (e.g., an "Amy's Closet" logo) and instructions (e.g., to "Enter your E-mail ID to start browsing great pieces of clothing!"). The user interface display 300 may also include an identification (ID) filed 310 (e.g., an email ID field) and a selection button 315. The selection button 315 may include a message (e.g., to "proceed"). As shown in FIG. 3B, the user interface display 320 includes a window 322. The window 322 may be overlaid the user interface display 300. The window 322 may include a message 325. For example, the message may recite "Check your mail id" and "Get your password." The window 322 may also include an acknowledgement button 330. The acknowledgement button 330 may recite "Ok." As shown in FIG. 3C, the user interface display 335 may include a password input field 340, a password confirmation input field 345, and a password submission button 350. The password submission button 350 may recite the term "login."

In operation, the computing system 115, utilizing the at least one processor 205 executing one or more wearable article display operations, generates the user interface display 300 for display on a display screen. After the user interface display 300 is displayed on the display screen, an email address ID is received in the ID field 310 and a selection of the selection button 315 is received. In response to receiving the selection of the selection button 315, the computing system 115, utilizing the at least one processor 205 executing one or more wearable article display operations, accesses the server 120 and determines whether the provided ID is associated with a user profile stored in the server 120.

When the computing system 115 determines that the email address ID is not associated with a user profile stored in the server 120, the computing system 115, utilizing the at least one processor 205 executing one or more wearable article display operations, may generate a user profile associated with the email address ID. The generated user profile may be stored in the server 120. The computing system 115 may also generate a unique password associated with the generated user profile. The unique password and the email address provided in the ID field 310 may be used to gain access to the generated user profile. The computing system 115 may also transmit the unique password to the email address provided in the ID field 310. When the computing system 115 determines that the email address ID is not associated with a user profile stored in the server 120, the computing system 115, utilizing the at least one processor 205 executing one or more wearable article display operations, may further generate the user interface display 320 for display on a display screen. The user interface display 320 may include the window 322 with the message 325 directing a viewer of the user interface display 320 to "check your mail id" and "get your password." After the window 322 is displayed, the computing system 115 may receive a selection of the acknowledgement button 330.

The computing system 115, utilizing the at least one processor 205 executing one or more wearable article display operations, generates the user interface display 335 for display on a display screen. When the computing system 115 determines that the email address ID provided in the ID field 310 is not associated with a user profile stored in the server 120, the computing system 115 generates the user interface display 335 for display on a display screen after receiving a selection of the acknowledgement button 330. In this case, the password input field 340 and the password confirmation input field 345 may receive the unique password transmitted by the computing system 115 to the email address ID provided in the ID field 310. After the unique password is provided in the password input field 340 and the password confirmation input field 345, the computing system 115, utilizing the at least one processor 205 executing one or more wearable article display operations, provides access to the user profile associated with email address ID provided in the ID field 310 in response receiving a selection of the password submission button 350.

When the computing system 115 determines that the ID provided in the ID field 310 is associated with a user profile stored in the server 120, the computing system 115 generates the user interface display 335 for display on a display screen after receiving a selection of the selection button 315. In this case, the password input field 340 and the password confirmation input field 345 may receive a password known to a viewer of the user interface display 335 and associated with the email address ID provided in the ID field 310. The password known to the viewer of the user interface display 335 may be a password previously selected or provided by the viewer of the user interface display 335. After the password is provided in the password input field 340 and the password confirmation input field 345, the computing system 115, utilizing the at least one processor 205 executing one or more wearable article display operations, provides access to the user profile associated with email address ID provided in the ID field 310 in response receiving a selection of the password submission button 350.

Figure 4:
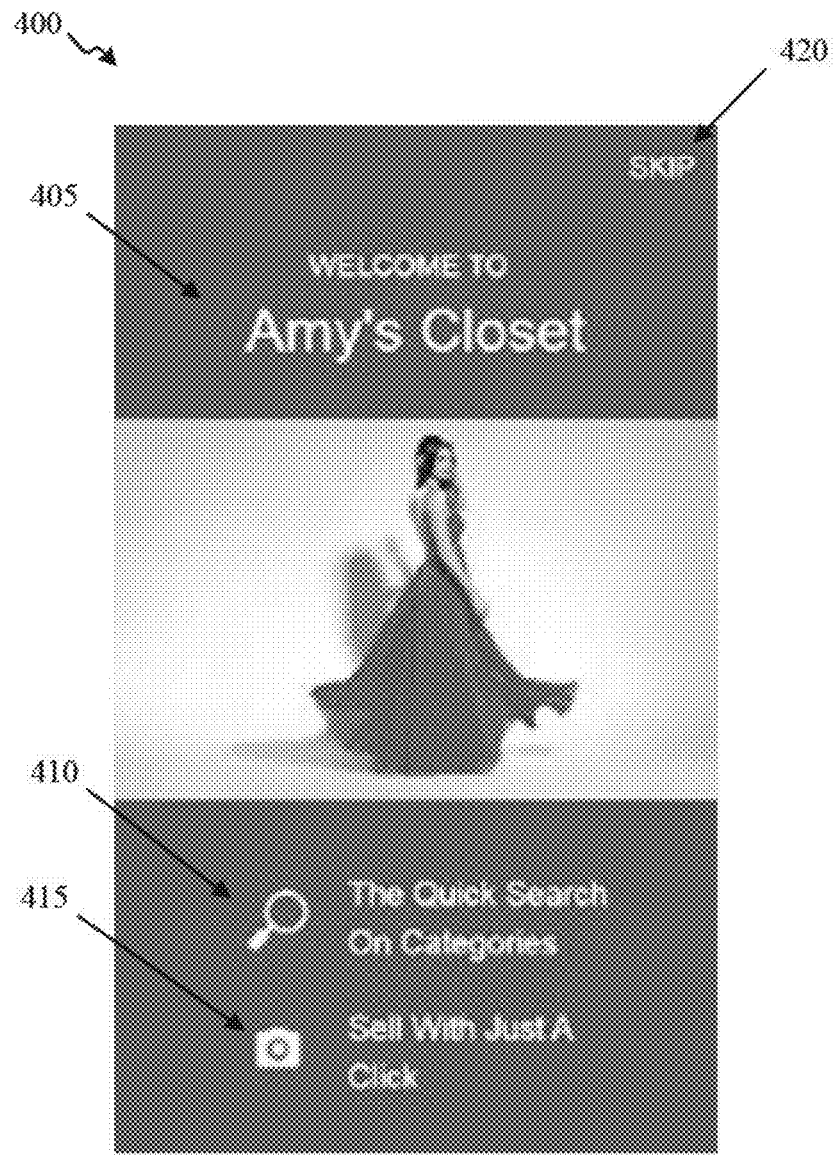
FIG. 4 illustrates another non-limiting, example user interface display according to certain embodiments of this disclosure.

FIG. 4 illustrates another non-limiting, example user interface display 400 according to certain embodiments of this disclosure. As shown in FIG. 4, the user interface display 400 may include a title message 405 (e.g., a title message reciting "Welcome to Amy's Closet"). The user interface display 400 may also include a search selection button 410 with a message reciting "The Quick Search On Categories." The user interface display 400 may further include a sell selection button 415 with a message reciting "Sell With Just A Click." In addition, the user interface display 400 may include a skip selection button 420.

The computing system 115, utilizing the at least one processor 205 executing one or more wearable article display operations, generates the user interface display 400 for display on a display screen. In certain embodiments, the computing system 115 may generate the user interface display 400 after a password is provided in the password input field 340 and the password confirmation input field 345 and after receiving a selection of the password submission button 350. The computing system 115 may also initiate a quick search engine in response to receiving a selection of the search selection button 410. The computing system 115 may further initiate wearable item sale protocol in response to receiving a selection of the sell selection button 415. In addition, the computing system 115 may generate another user interface in response to receiving a selection of the skip selection button 420.

Figure 5:
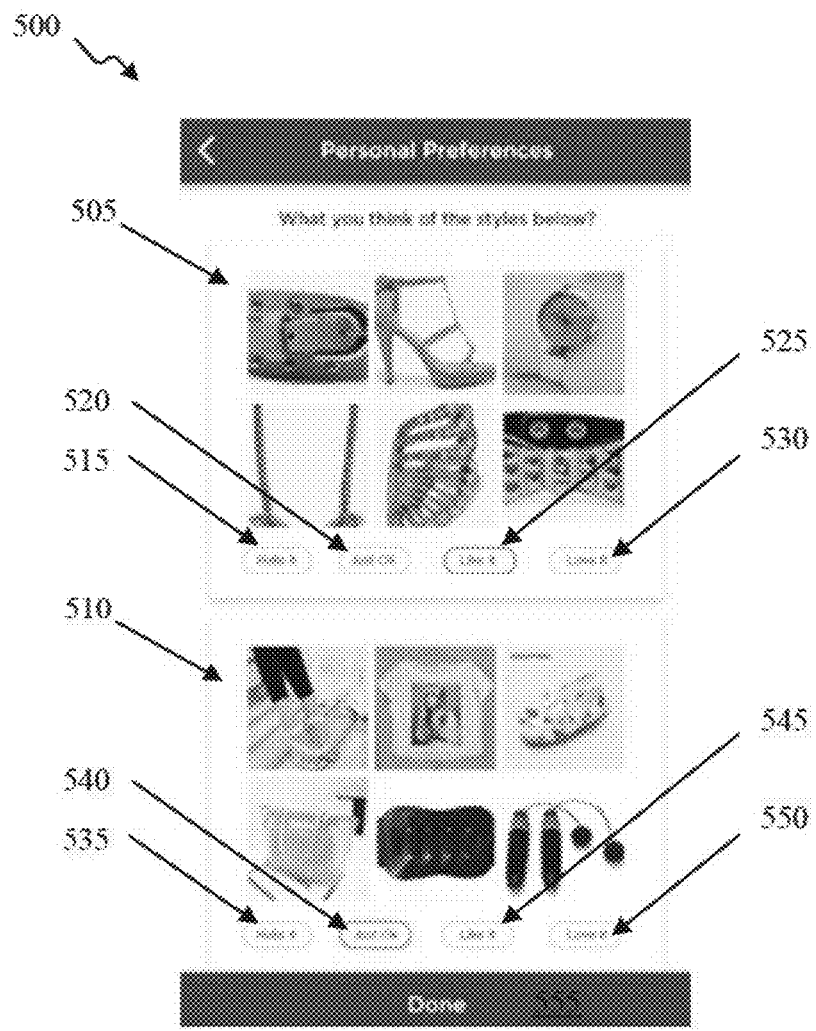
FIG. 5 illustrates a non-limiting, example user interface personal preference selection menu display according to certain embodiments of this disclosure.

FIG. 5 illustrates a non-limiting, example user interface personal preference selection menu display 500 according to certain embodiments of this disclosure. As shown in FIG. 5, the user interface personal preference selection menu display 500 includes one or more sets of displayed images such as a first set of displayed images 505 and a second set of display images 510. Each set of displayed images may include one or more images of wearable articles. For example, the first set of displayed images includes an image of a belt, an image of woman's shoe, an image of a watch, an image of a necklace, an image of a bracelet, and an image of another belt. As another example, the second set of displayed images includes an image of a pair of women's shoes, an image of a t-shirt, an image of another pair of women's shoes, an image of one or more handbags, an image of a bracelet, and an image of another pair of wearable articles. Each set of displayed images may also include a plurality of rating selection buttons. For example, the first set of displayed images includes a low rating selection 515 (e.g., having text reciting "hate it"), an average rating selection button 520 (e.g., having text reciting "just ok"), a high rating selection button 525 (e.g., having text reciting "like it"), and a very high rating selection button 530 (e.g., having text reciting "love it"). A received selection of one of the rating selection buttons may provide an indication of a preference for at least one of a style, a color scheme, a utility, a condition, a type, a brand, a price range, or the like of the one or more wearable articles depicted in the first set of displayed images. As another example, the second set of displayed images includes a low rating selection 535 (e.g., having text reciting "hate it"), an average rating selection button 540 (e.g., having text reciting "just ok"), a high rating selection button 545 (e.g., having text reciting "like it"), and a very high rating selection button 550 (e.g., having text reciting "love it"). A received selection of one of the rating selection buttons may provide an indication of a preference for at least one of a style, a color scheme, a utility, a condition, a type, a brand, a price range, or the like of the one or more wearable articles depicted in the second set of displayed images. In certain embodiments, the user interface personal preference selection menu display 500 may include a rating selection confirmation button 555 (e.g., having text reciting "done") that confirms a selection of a rating button for each set of displayed images.

The computing system 115, utilizing the at least one processor 205 executing one or more wearable article display operations, receives a selection of one or more preferences for wearable articles. For example, the computing system 115 may generate a user interface personal preference selection menu display 500 for display on a display screen. The user interface personal preference selection menu display 500 may include one or more sets of displayed images of wearable articles such as the first set of display images 505 and the second set of displayed images 510. Each of the one or more sets of displayed images may include a plurality of rating selection buttons. After the computing system 115 generates the user interface personal preference selection menu display 500 and the user interface personal preference selection menu display 500 is displayed on a display screen, the computing system 115 may receive a selection of rating selection button for each set of displayed images.

For example, the computing system 115 may receive a selection of the high rating selection button 525 associated with the first set of displayed images 505 and a selection of the average rating selection button 540 associated with the second set of display images 510. A received selection of the high rating selection button 525 may provide an indication of a preference for at least one of a style, a color scheme, a utility, a condition, a type, a brand, a price range, or the like of the one or more wearable articles depicted in the first set of displayed images. A received selection of the average rating selection button 540 may provide an indication of a preference for at least one of a style, a color scheme, a utility, a condition, a type, a brand, a price range, or the like of the one or more wearable articles depicted in the second set of displayed images.

After receiving the selection of the high rating selection button 525 and the average rating selection button 540, the computing system 115 may receive a selection of the rating selection confirmation button 555. In response to receiving the selection of the rating selection confirmation button 555, the computing system may identify one or more preferences (e.g., common preferences) between the wearable articles illustrated in the first set of displayed images 505 and associate the high rating selection button 525 with those identified one or more preferences. Further, in response to receiving the selection of the rating selection confirmation button 555, the computing system may identify one or more preferences (e.g., common preferences) between the wearable articles illustrated in the second set of displayed images 510 and associate the average rating selection button 540 with those identified one or more preferences.

Figure 6:
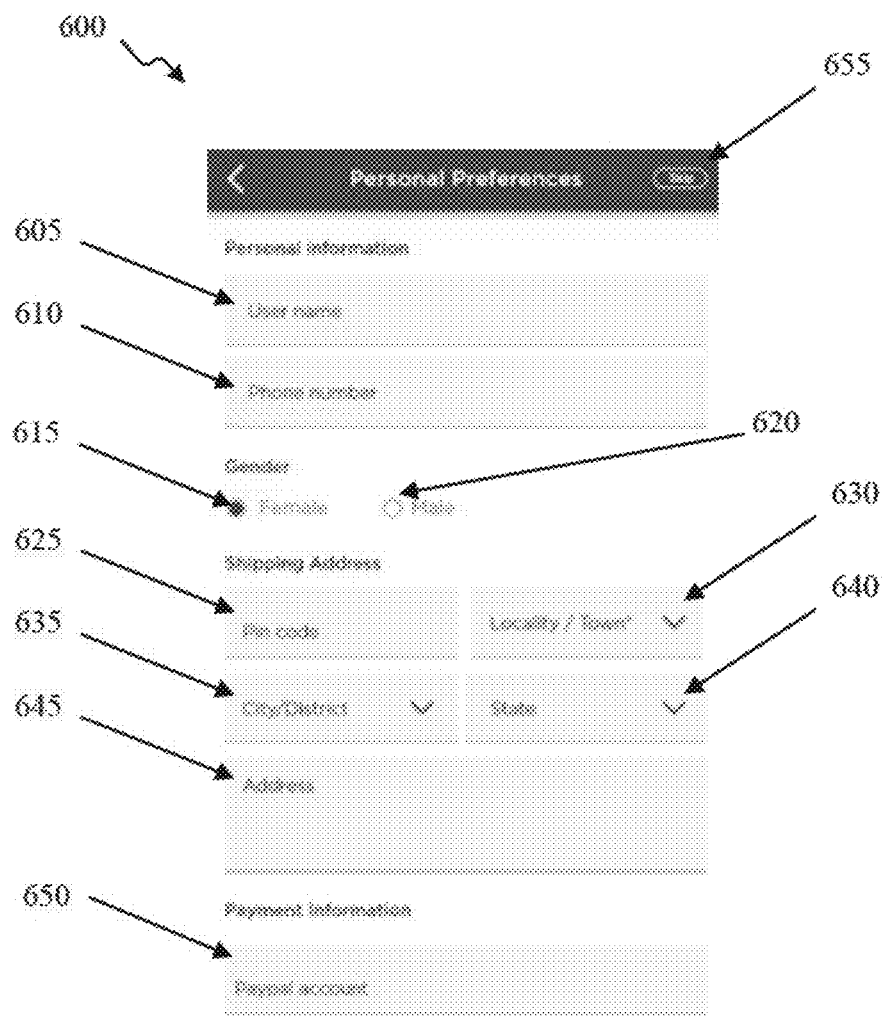
FIG. 6 illustrates a non-limiting, example user information input display according to certain embodiments of this disclosure.

FIG. 6 illustrates a non-limiting, example user information input display 600 according to certain embodiments of this disclosure. The user information input display 600 may be a display that is used to receive provided or updated information for a user profile. As shown in FIG. 6, the user information input display 600 may include a personal information section that includes a user name field 605 and a phone number field 610. The user name field 605 may be configured to receive a user name chosen for a user profile. The phone number field 610 may be configured to receive a telephone number of a user associated with the user profile. The user information input display 600 may also include a gender information section that includes a female gender selection button 615 and a male gender selection button 620. Selection of either the female gender selection button 615 or the male gender selection button 620 may be used to determine a gender of a user associated with the user profile.

The user information input display 600 may further include a shipping address section that includes a pin code field 625, a locality/town field 630, a city/district field 635, a state field 640, and an address field 645. The pin code field 625 may be configured to receive a pin code (e.g., a password) that may be used to obtain access to the user profile. The locality/town field 630 may be configured to receive a city or a town that may be associated with a residence of a user associated with the user profile. The city/district field 635 may be configured to receive county information or great metropolitan area information that may be associated with a residence of a user associated with the user profile. The state field 640 may be configured to receive an indication of a state that may be associated with a residence of a user associated with the user profile. The address field 645 may be configured to receive an indication of an address that may be associated with a residence of a user associated with the user profile. The user information input display 600 may further include a payment information section that includes a PAYPAL™ account field 650. The PAYPAL™ account field 650 may be configured to receive PAYPAL™ account information of a user that may be associated with the user profile. In certain embodiments, the user information input display 600 may also include a skip selection button 655 that may be configured to receive a selection and cause the computing system 115 to generate another display screen for display.

Additionally, or alternatively, the payment information section may include one or more credit card/debit card information fields, one or more bank account fields, or the like. The one or more credit card/debit card information fields may be configured to receive information for receiving or providing a payment through the user information input display 600 using a credit card or a debit card that may be associated with a user associated with the user profile. The one or more bank account information fields may be configured to receive information for receiving or providing a payment through the user information input display 600 using a bank account that may be associated with a user associated with the user profile.

The computing system 115, utilizing the at least one processor 205 executing one or more wearable article display operations, generates the user interface personal preference information input display 600 for display on a display screen. In certain embodiments, the computing system 115 may generate the user interface personal preference information input display 600 after one or more rating selection buttons are selected from the user interface personal preference selection menu display 500 illustrated in FIG. 5. Additionally, or alternatively, the computing system 115 may generate the user interface personal preference information input display 600 after one or more rating selection buttons are selected from the user interface personal preference selection menu display 500 and a selection of the rating selection confirmation button 555 is received.

Figure 7:
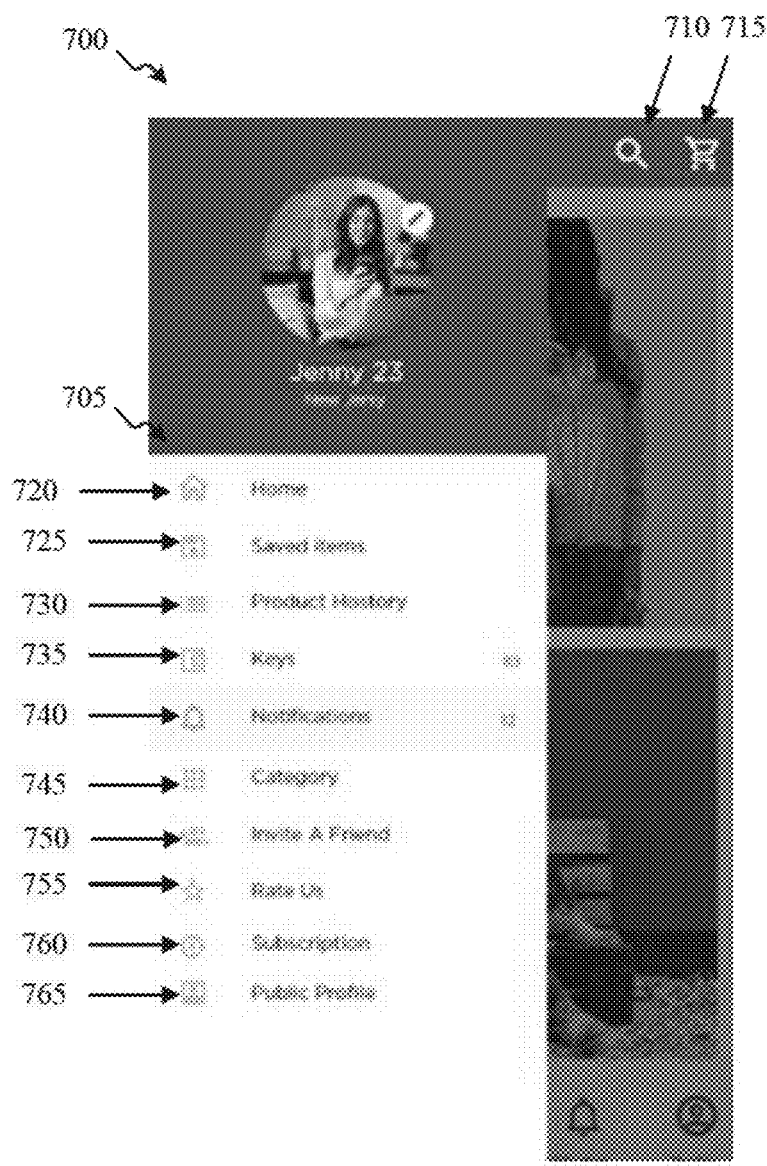
FIG. 7 illustrates a non-limiting, example user interface selection menu display according to certain embodiments of this disclosure.

FIG. 7 illustrates a non-limiting, example user interface selection menu display 700 according to certain embodiments of this disclosure. The computing system 115, utilizing the at least one processor 205 executing one or more wearable article display operations, generates the user interface selection menu display 700 for display on a display screen. The user interface selection menu display 700 may be a display that is used for guiding a user to view and interact with one or more features 705 of a user profile. As shown in FIG. 7, the user interface selection menu display 700 may display one or more features 705 of a user profile including a home page selection button 720 that, when selected, may cause the computing system 115, performing wearable article display operations, to generate a home page, a saved item page selection button 725 that, when selected, may cause the computing system 115, performing wearable article display operations, to generate a page that displays one or more items saved by a user associated with the user profile, a product history page selection button 730 that, when selected, may cause the computing system 115, performing wearable article display operations, to generate a page that displays a history of products for purchase by a user or from a user associated with the user profile, or a key page selection button 735 that, when selected, may cause the computing system 115, performing wearable article display operations, to generate a page that displays a number of purchased keys or credits to buy items through one or more displays described herein. In certain embodiments, the page that displays a number of purchased keys or credits to buy items, may also include one or more fields to purchase more keys or credits, for example, using the payment information provided through the user information input display 600 illustrated in FIG. 6.

Also, as shown in FIG. 7, the user interface selection menu display 700 may display one or more features 705 of a user profile including a notification page selection button 740 that, when selected, may cause the computing system 115, performing wearable article display operations, to generate a notification page, a category page selection button 745 that, when selected, may cause the computing system 115, performing wearable article display operations, to generate a category page, an "invite a friend" page selection button 750 that, when selected, may cause the computing system 115, performing wearable article display operations, to generate a page to invite a friend to view display screens, a "rate us" page selection button 755 that, when selected, may cause the computing system 115, performing wearable article display operations, to generate a page to rate display screens, a subscription page selection button 760 that, when selected, may cause the computing system 115, performing wearable article display operations, to generate a page to display subscription information associated with a user profile, and a public profile page selection button 765 that, when selected, may cause the computing system 115, performing wearable article display operations, to generate for display a public profile page associated with a user profile.

In certain embodiments, as shown in FIG. 7, the user interface selection menu display 700 may also include a search selection button 710 and a shopping cart selection button 715. The search selection button 710, when selected, may cause the computing system 115, performing wearable article display operations, to generate for display a wearable article search engine for searching for wearable articles. The shopping cart selection button 715, when selected, may cause the computing system 115, performing wearable article display operations, to generate for display a list of wearable articles selected for purchase by a user associated with a user profile.

Figure 8:
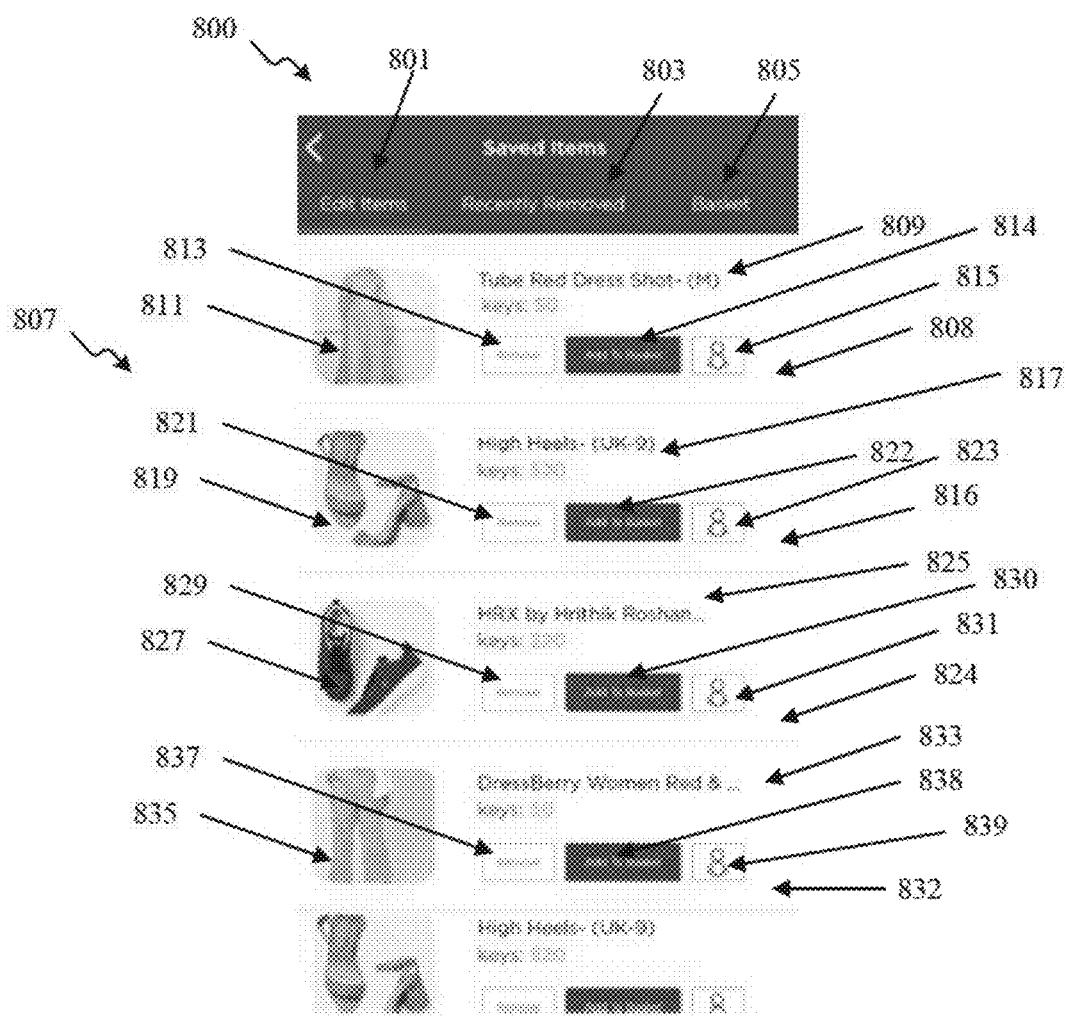
FIG. 8 illustrates a non-limiting, example user interface saved items display according to certain embodiments of this disclosure.

FIG. 8 illustrates a non-limiting, example user interface saved items display 800 according to certain embodiments of this disclosure. The computing system 115, utilizing the at least one processor 205 executing one or more wearable article display operations, generates the user interface saved items display 800 for display on a display screen. The user interface saved items display 800 may be generated by the computing system 115 in response to receiving a selection of a saved item page selection button 725 illustrated in FIG. 7. The user interface saved items display 800 may be a display for displaying saved items saved by a user associated with a user profile. In certain embodiments, the user interface saved items display 800 may include an edit items selection button 801, a recently removed selection button 803, and a basket selection button 805. The edit items selection button 801, when selected, may cause the computing system 115 to generate for display a list of one or more selected wearable articles 807 that are saved by a user associated with a user profile and may be selected for purchase or removed from consideration for purchase. As shown in FIG. 8, the edit items selection button 801 is selected and a list of one or more selected wearable articles 807 that are saved by a user associated with a user profile are displayed. Each of the one or more selected wearable articles 807 may be saved so that a user may subsequently decide to purchase or remove from consideration for purchase a selected wearable article through the user interface saved items display 800 and may include a first selected wearable article 808, a second selected wearable article 816, a third selected wearable article 824, and a fourth selected wearable article 832.

Each of the one or more selected wearable articles 807 may include wearable article information, one or more images of a wearable article, a remove wearable article selection button, an add wearable article to basket selection button, and a paper doll display selection button. For example, the first selected wearable articles 808 includes wearable article information 809, one or more images of a wearable article 811, a remove wearable article selection button 813, an add wearable article to basket selection button 814, and a paper doll display selection button 815. As another example, the second selected wearable articles 816 includes wearable article information 817, one or more images of a wearable article 819, a remove wearable article selection button 821, an add wearable article to basket selection button 822, and a paper doll display selection button 823. As another example, the third selected wearable articles 824 includes wearable article information 825, one or more images of a wearable article 827, a remove wearable article selection button 829, an add wearable article to basket selection button 830, and a paper doll display selection button 831. As another example, the fourth selected wearable articles 832 includes wearable article information 833, one or more images of a wearable article 835, a remove wearable article selection button 837, an add wearable article to basket selection button 838, and a paper doll display selection button 839.

In certain embodiments, for each of the one or more selected wearable articles 807, wearable article information may include at least a name of the wearable article, a size of the wearable article, and a price of the wearable article. For each of the one or more selected wearable articles 807, a remove wearable article selection button, when selected, may cause the computing system 115, performing wearable article display operations, to remove the wearable article from consideration for purchase. For each of the one or more selected wearable articles 807, an add wearable article to basket selection button, when selected, may cause the computing system 115, performing wearable article display operations, to add the wearable article to a purchase basket for purchase. For each of the one or more selected wearable articles 807, a paper doll display selection button, when selected, may cause the computing system 115, performing wearable article display operations, to display the wearable article in a paper doll format described herein.

Figure 9:
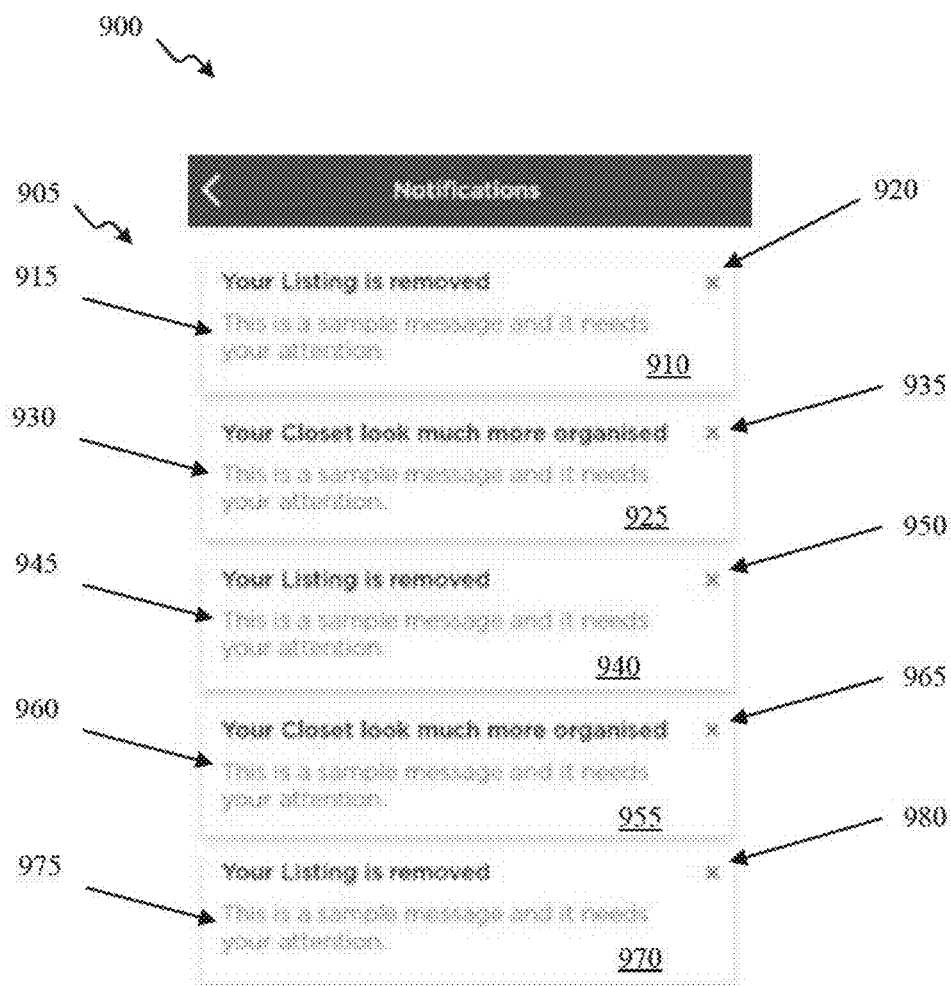
FIG. 9 illustrates a non-limiting, example user interface notifications display according to certain embodiments of this disclosure.

FIG. 9 illustrates a non-limiting, example user interface notifications display 900 according to certain embodiments of this disclosure. The computing system 115, utilizing the at least one processor 205 executing one or more wearable article display operations, generates the user interface notifications display 900 for display on a display screen. The user interface notifications display 900 may be generated by the computing system 115 in response to receiving a selection of a notification page selection button 740 illustrated in FIG. 7. The user interface notifications display 900 may be a display for displaying notifications associated with a user profile. In certain embodiments, the user interface notification display 900 may include one or more notifications 905 including a first notification 910, a second notification 925, a third notification 940, a fourth notification 955, and a fifth notification 970.

Each of the one or more notifications 905 may include notification information and a notification close-out button. The notification information may include notification text, a status of the notification, and a requested action to be taken in response the notification. The notification close-out button, when selected, the cause the computing system 115, performing one or more wearable article display operations, to remove a notification from the user interface notifications display 900. For example, the first notification 910 includes notification information 915 reciting "your listing is removed" and "this is a simple message and it needs your attention." The first notification 910 also includes a notification close-out button 920. As another example, the second notification 925 includes notification information 930 reciting "your closet look much more organized" and "this is a simple message and it needs your attention." The second notification 925 also includes a notification close-out button 935. As another example, the third notification 940 includes notification information 945 reciting "your list is removed" and "this is a simple message and it needs your attention." The third notification 940 also includes a notification close-out button 950. As another example, the fourth notification 955 includes notification information 960 reciting "your closet look much more organized" and "this is a simple message and it needs your attention." The fourth notification 955 also includes a notification close-out button 965. As another example, the fifth notification 970 includes notification information 975 reciting "your listing is removed" and "this is a simple message and it needs your attention." The fifth notification 970 also includes a notification close-out button 980.

Figure 10:
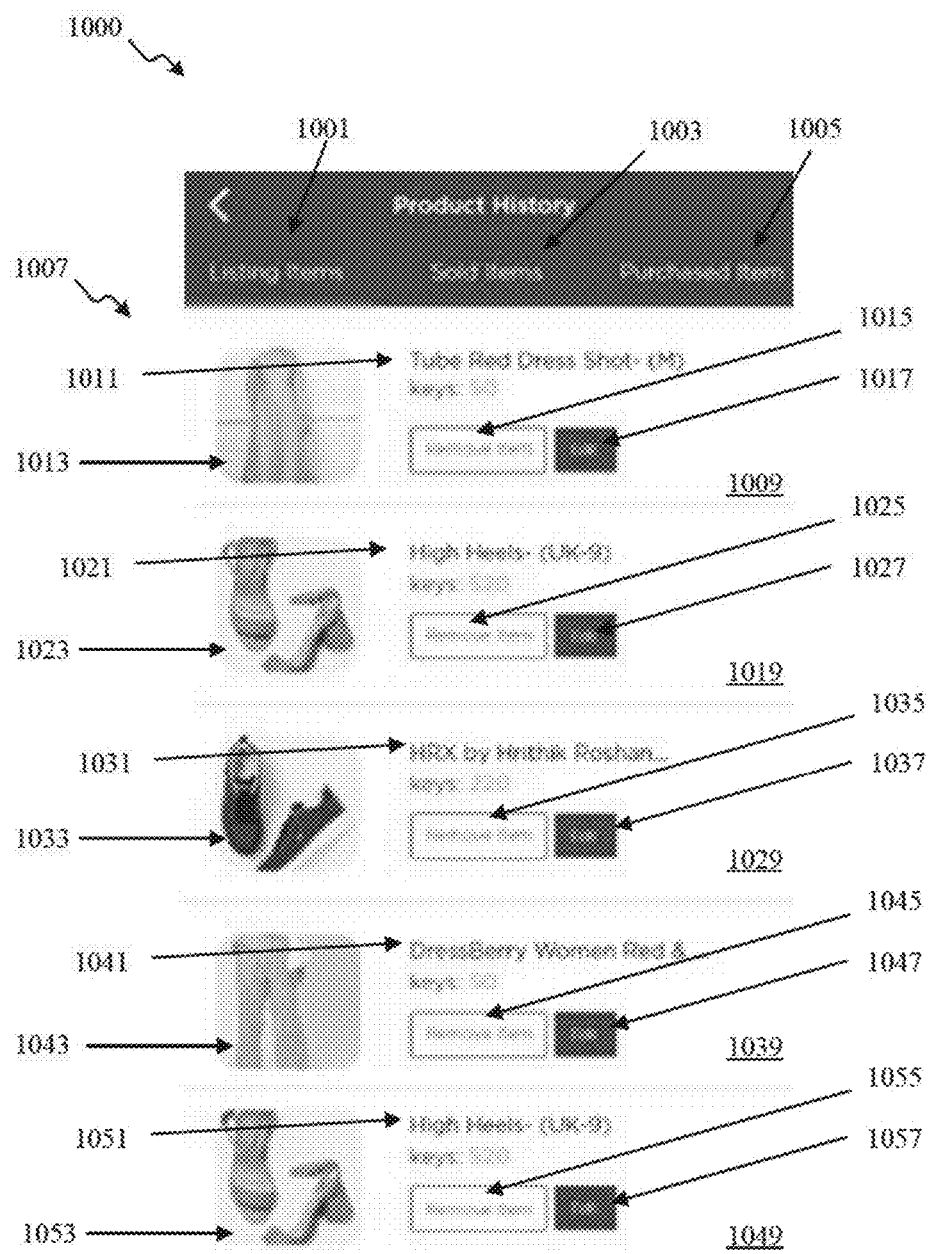
FIG. 10 illustrates a non-limiting, example user interface product history display according to certain embodiments of this disclosure.

FIG. 10 illustrates a non-limiting, example user interface product history display 1000 according to certain embodiments of this disclosure. The computing system 115, utilizing the at least one processor 205 executing one or more wearable article display operations, generates the user interface product history display 1000 for display on a display screen. The user interface product history display 1000 may be generated by the computing system 115 in response to receiving a selection of a product history page selection button 730 illustrated in FIG. 7. The user interface product history display 1000 may be a display for displaying a list of products that have been sold or purchased by a user associated with a user profile. In certain embodiments, the user interface product history display 1000 may include listing items selection button 1001, a sold items selection button 1003, and a purchased items selection button 1005. The listing items selection button 1001, when selected, may cause the computing system 115 to generate for display a list of one or more wearable articles 1007 that have been sold or purchased by a user associated with a user profile. As shown in FIG. 10, the listing items selection button 1001 is selected and a list of one or more wearable articles 1007 that have been sold or purchased by a user associated with a user profile are displayed. Each of the one or more wearable articles 1007 may be listed so that a user may view allow wearable articles either sold or purchase through the user interface product history display 1000 and may include a first wearable article 1009, a second wearable article 1019, a third wearable article 1029, a fourth wearable article 1039, and a fifth wearable article 1049.

Each of the one or more wearable articles 1007 may include wearable article information, one or more images of a wearable article, a remove wearable article selection button, and an edit wearable article selection button. For example, the first wearable article 1009 includes wearable article information 1011, one or more images of a wearable article 1013, a remove wearable article selection button 1015, and an edit wearable article selection button 1017. As another example, the second wearable article 1019 includes wearable article information 1021, one or more images of a wearable article 1023, a remove wearable article selection button 1025, and an edit wearable article selection button 1027. As another example, the third wearable article 1029 includes wearable article information 1031, one or more images of a wearable article 1033, a remove wearable article selection button 1035, and an edit wearable article selection button 1037. As another example, the fourth wearable article 1039 includes wearable article information 1041, one or more images of a wearable article 1043, a remove wearable article selection button 1045, and an edit wearable article selection button 1047. As another example, the fifth wearable article 1049 includes wearable article information 1051, one or more images of a wearable article 1053, a remove wearable article selection button 1055, and an edit wearable article selection button 1057.

In certain embodiments, for each of the one or more wearable articles 1007, wearable article information may include at least a name of the wearable article, a size of the wearable article, a manufacturer or a designer of the wearable article, and a price of the wearable article. For each of the one or more wearable articles 1007, a remove wearable article selection button, when selected, may cause the computing system 115, performing wearable article display operations, to remove the wearable article from the listed set of one or more wearable articles 1007. For each of the one or more wearable articles 1007, an edit selection button, when selected, may cause the computing system 115, performing wearable article display operations, to permit a user associated with a user profile to edit a listed wearable article.

Figure 11:
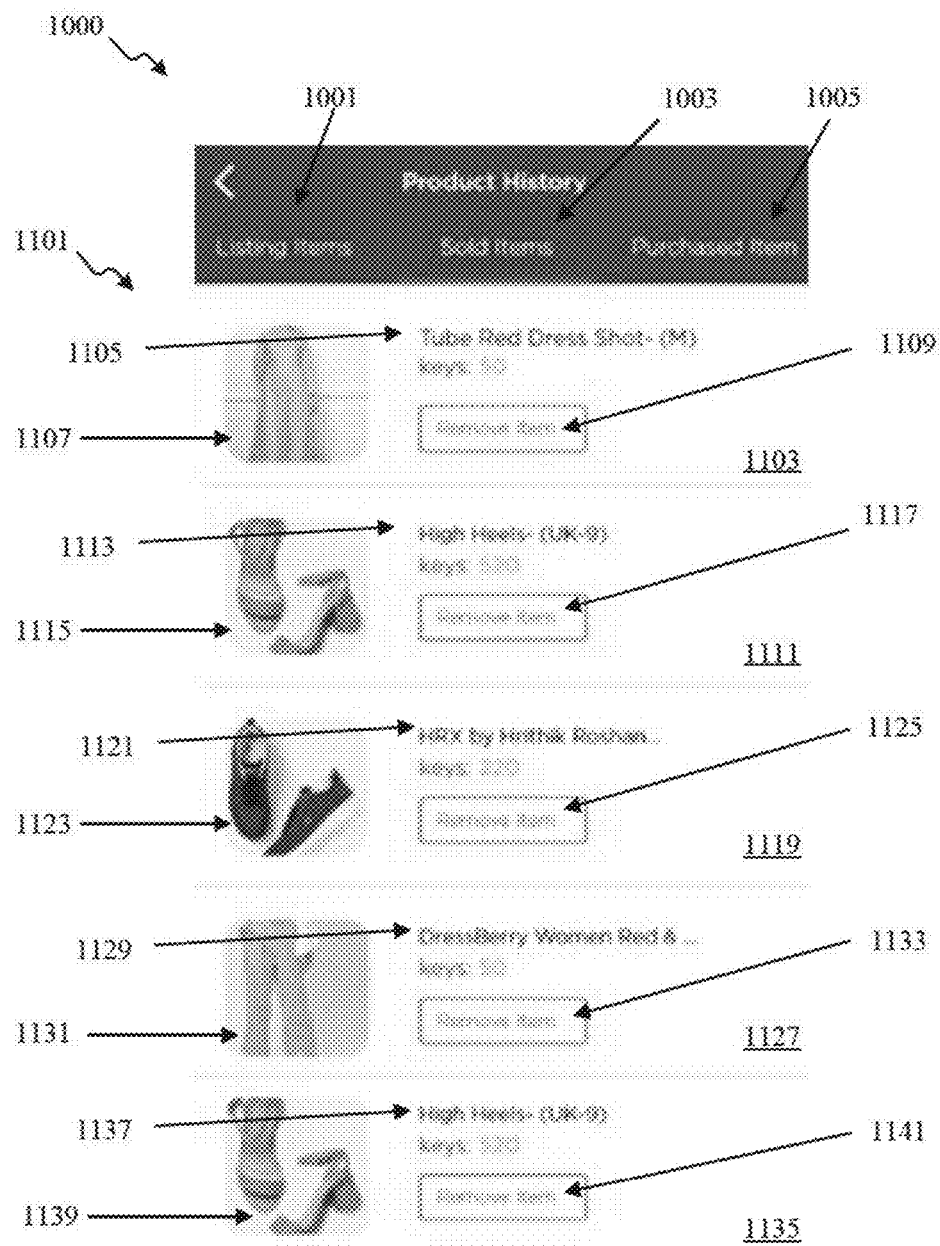
FIG. 11 illustrates a non-limiting, example user interface product history display according to certain embodiments of this disclosure.

FIG. 11 illustrates a non-limiting, example user interface product history display 1000 according to certain embodiments of this disclosure. As shown in FIG. 11, the sold items selection button 1003 is selected and a list of one or more wearable articles 1101 that have been sold by a user associated with a user profile is displayed. The sold items selection button 1003, when selected, may cause the computing system 115 to generate for display a list of one or more wearable articles 1101 that have been sold by a user associated with a user profile. Each of the one or more wearable articles 1101 may be listed so that a user may view allow wearable articles that have been sold through the user interface product history display 1000 and may include a first wearable article 1103, a second wearable article 1111, a third wearable article 1119, a fourth wearable article 1127, and a fifth wearable article 1135.

Each of the one or more wearable articles 1101 may include wearable article information, one or more images of a wearable article, and a remove wearable article selection button. For example, the first wearable article 1103 includes wearable article information 1105, one or more images of a wearable article 1107, and a remove wearable article selection button 1109. As another example, the second wearable article 1111 includes wearable article information 1113, one or more images of a wearable article 1115, and a remove wearable article selection button 1117. As another example, the third wearable article 1119 includes wearable article information 1121, one or more images of a wearable article 1123, and a remove wearable article selection button 1125. As another example, the fourth wearable article 1127 includes wearable article information 1129, one or more images of a wearable article 1131, and a remove wearable article selection button 1133. As another example, the fifth wearable article 1135 includes wearable article information 1137, one or more images of a wearable article 1139, and a remove wearable article selection button 1141.

In certain embodiments, for each of the one or more wearable articles 1101, wearable article information may include at least a name of the wearable article, a size of the wearable article, a manufacturer or a designer of the wearable article, and a price of the wearable article. For each of the one or more wearable articles 1101, a remove wearable article selection button, when selected, may cause the computing system 115, performing wearable article display operations, to remove the wearable article from the listed set of one or more wearable articles 1101.

Figure 12:
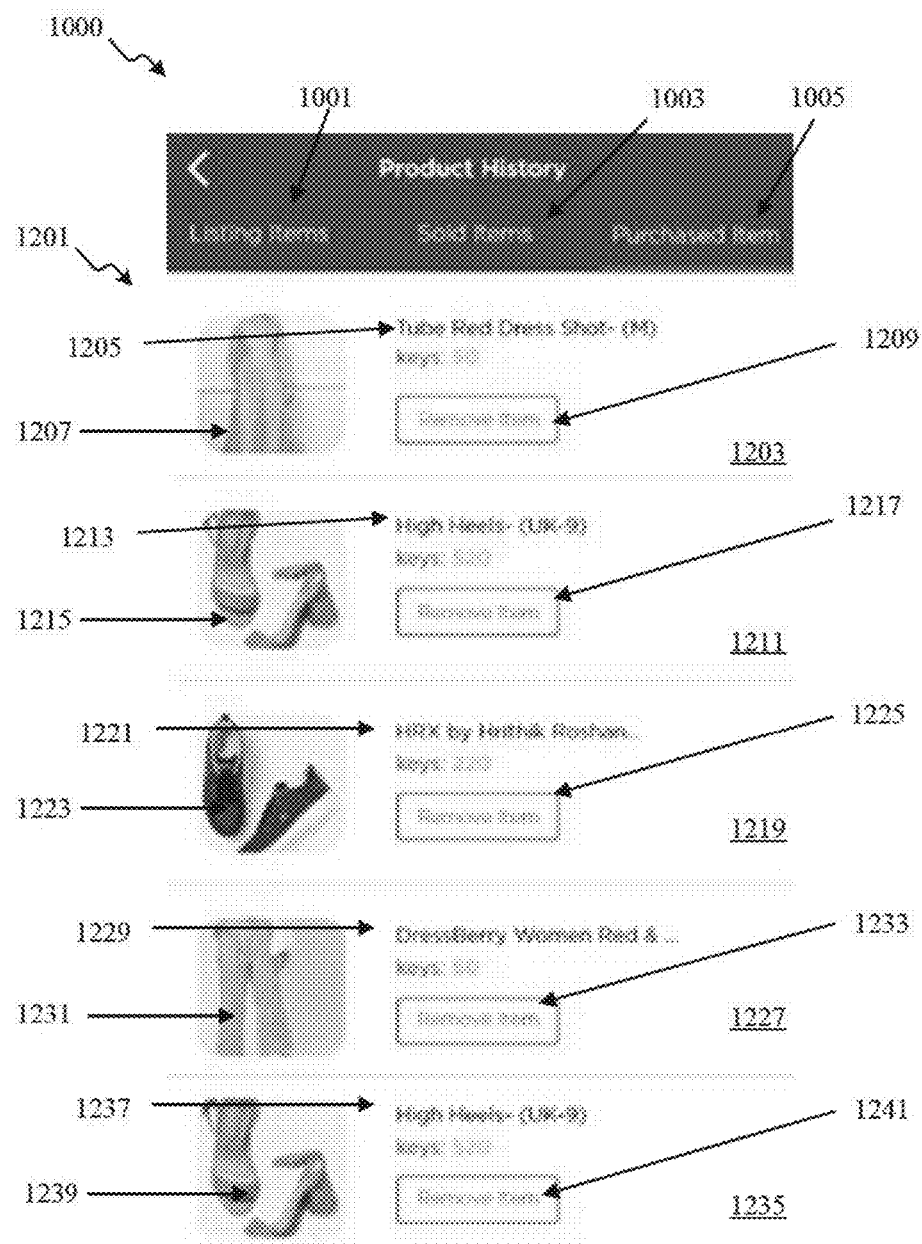
FIG. 12 illustrates a non-limiting, example user interface product history display according to certain embodiments of this disclosure.

FIG. 12 illustrates a non-limiting, example user interface product history display 1000 according to certain embodiments of this disclosure. As shown in FIG. 12, the purchased items selection button 1005 is selected and a list of one or more wearable articles 1201 that have been purchased by a user associated with a user profile is displayed. The purchased items selection button 1005, when selected, may cause the computing system 115 to generate for display a list of one or more wearable articles 1201 that have been purchased by a user associated with a user profile. Each of the one or more wearable articles 1201 may be listed so that a user may view wearable articles that have been purchased through the user interface product history display 1000 and may include a first wearable article 1203, a second wearable article 1211, a third wearable article 1219, a fourth wearable article 1227, and a fifth wearable article 1235.

Each of the one or more wearable articles 1201 may include wearable article information, one or more images of a wearable article, and a remove wearable article selection button. For example, the first wearable article 1203 includes wearable article information 1205, one or more images of a wearable article 1207, and a remove wearable article selection button 1209. As another example, the second wearable article 1211 includes wearable article information 1213, one or more images of a wearable article 1215, and a remove wearable article selection button 1217. As another example, the third wearable article 1219 includes wearable article information 1221, one or more images of a wearable article 1223, and a remove wearable article selection button 1225. As another example, the fourth wearable article 1227 includes wearable article information 1229, one or more images of a wearable article 1231, and a remove wearable article selection button 1233. As another example, the fifth wearable article 1235 includes wearable article information 1237, one or more images of a wearable article 1239, and a remove wearable article selection button 1241.

In certain embodiments, for each of the one or more wearable articles 1201, wearable article information may include at least a name of the wearable article, a size of the wearable article, a manufacturer or a designer of the wearable article, and a price of the wearable article. For each of the one or more wearable articles 1201, a remove wearable article selection button, when selected, may cause the computing system 115, performing wearable article display operations, to remove the wearable article from the listed set of one or more wearable articles 1201.

Figure 13:
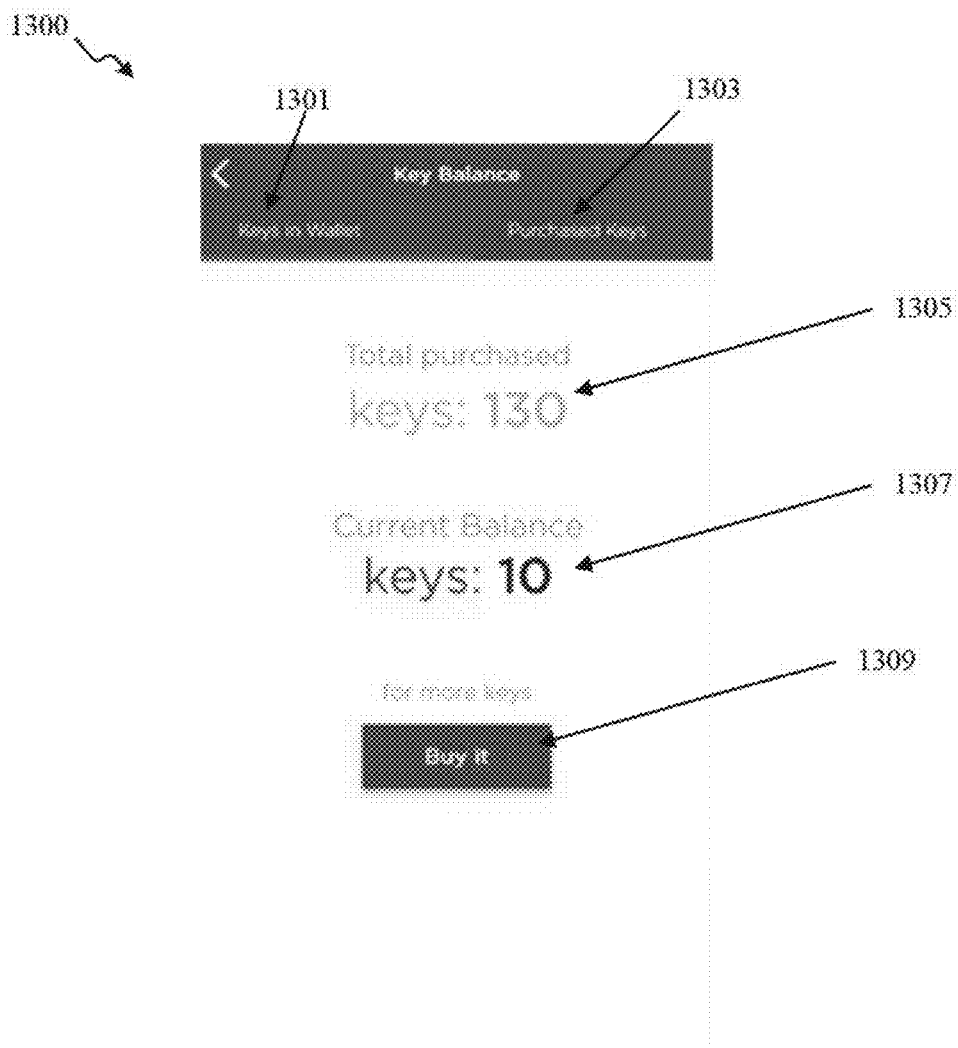
FIG. 13 illustrates a non-limiting, example user interface key balance display according to certain embodiments of this disclosure.

FIG. 13 illustrates a non-limiting, example user interface key balance display 1300 according to certain embodiments of this disclosure. The computing system 115, utilizing the at least one processor 205 executing one or more wearable article display operations, generates the user interface key balance display 1300 for display on a display screen. The user interface key balance display 1300 may be generated by the computing system 115 in response to receiving a selection of a key page selection button 735 illustrated in FIG. 7. The user interface key balance display 1300 may be a display for displaying a number of credits previously purchased and to be used to purchase items on displays described herein. In certain embodiments, the user interface key balance display 1300 may include a keys in wallet selection button 1301 and a purchased keys selection button 1303. The keys in wallet selection button 1301, when selected, may cause the computing system 115 to generate for display the number of keys purchased for use. As shown in FIG. 13, the keys in wallet selection button 1301 is selected, the total purchased keys indication 1305 is grayed-out, and the current balance of purchased keys indication 1307 is highlighted and displayed. In certain embodiments, when the purchased keys selection button 1303 is selected and the keys in wallet selection button 1301 is not selected, the total purchased keys indication 1305 is highlighted and displayed, and the current balance of purchased keys indication 1307 is grayed-out. Additionally, or alternatively, the user interface key balance display 1300 may include a buy key selection button 1309. The computing system 115, utilizing the at least one processor 205 executing one or more wearable article display operations, generates a display on a display screen to purchase keys, for example using payment information described herein, in response to receiving a selection of the buy key selection button 1309.

Figure 14:
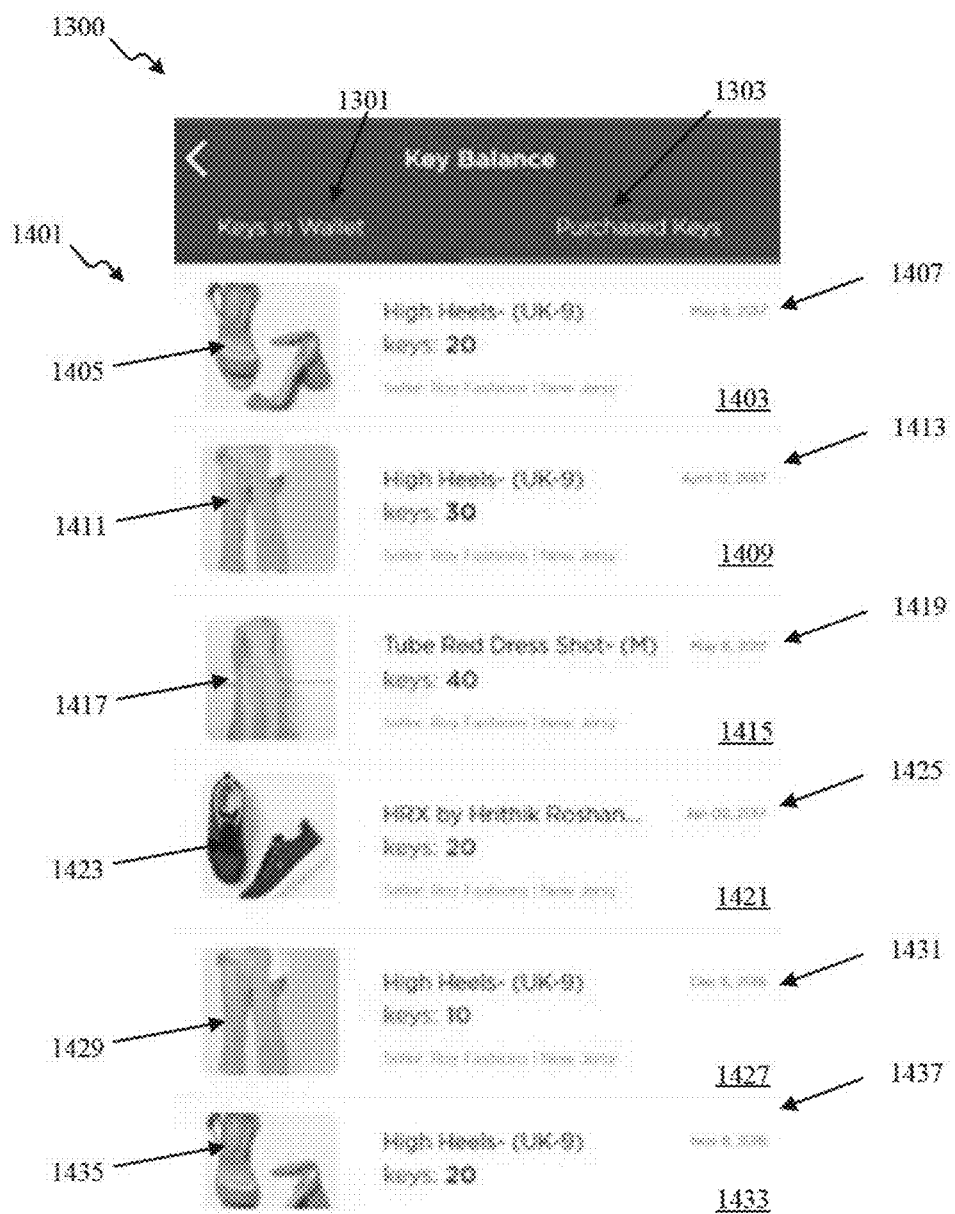
FIG. 14 illustrates a non-limiting, example user interface key wallet display according to certain embodiments of this disclosure.

FIG. 14 illustrates a non-limiting, example user interface key wallet display 1300 according to certain embodiments of this disclosure. As shown in FIG. 14, the purchased keys selection button 1303 is selected. The purchased keys selection button 1303, when selected, may cause the computing system 115 to generate for display a list of one or more wearable articles 1401 that have been purchased using keys by a user associated with a user profile. Each of the one or more wearable articles 1401 may include a first wearable article 1403, a second wearable article 1409, a third wearable article 1415, a fourth wearable article 1421, and a fifth wearable article 1427, and sixth wearable article 1433.

Each of the one or more wearable articles 1401 may include wearable article information and one or more images of a wearable article. For example, the first wearable article 1403 includes one or more images of a wearable article 1405 and wearable article information 1407. As another example, the second wearable article 1409 includes one or more images of a wearable article 1411 and wearable article information 1413. As another example, the third wearable article 1415 includes one or more images of a wearable article 1417 and wearable article information 1419. As another example, the fourth wearable article 1421 includes one or more images of a wearable article 1423 and wearable article information 1425. As another example, the fifth wearable article 1427 includes one or more images of a wearable article 1429 and wearable article information 1431. As another example, the sixth wearable article 1433 includes one or more images of a wearable article 1435 and wearable article information 1437. In certain embodiments, for each of the one or more wearable articles 1401, wearable article information may include at least a name of the wearable article, a size of the wearable article, a manufacturer or a designer of the wearable article, a price of the wearable article, and a date of purchase of the wearable article.

Figure 15:
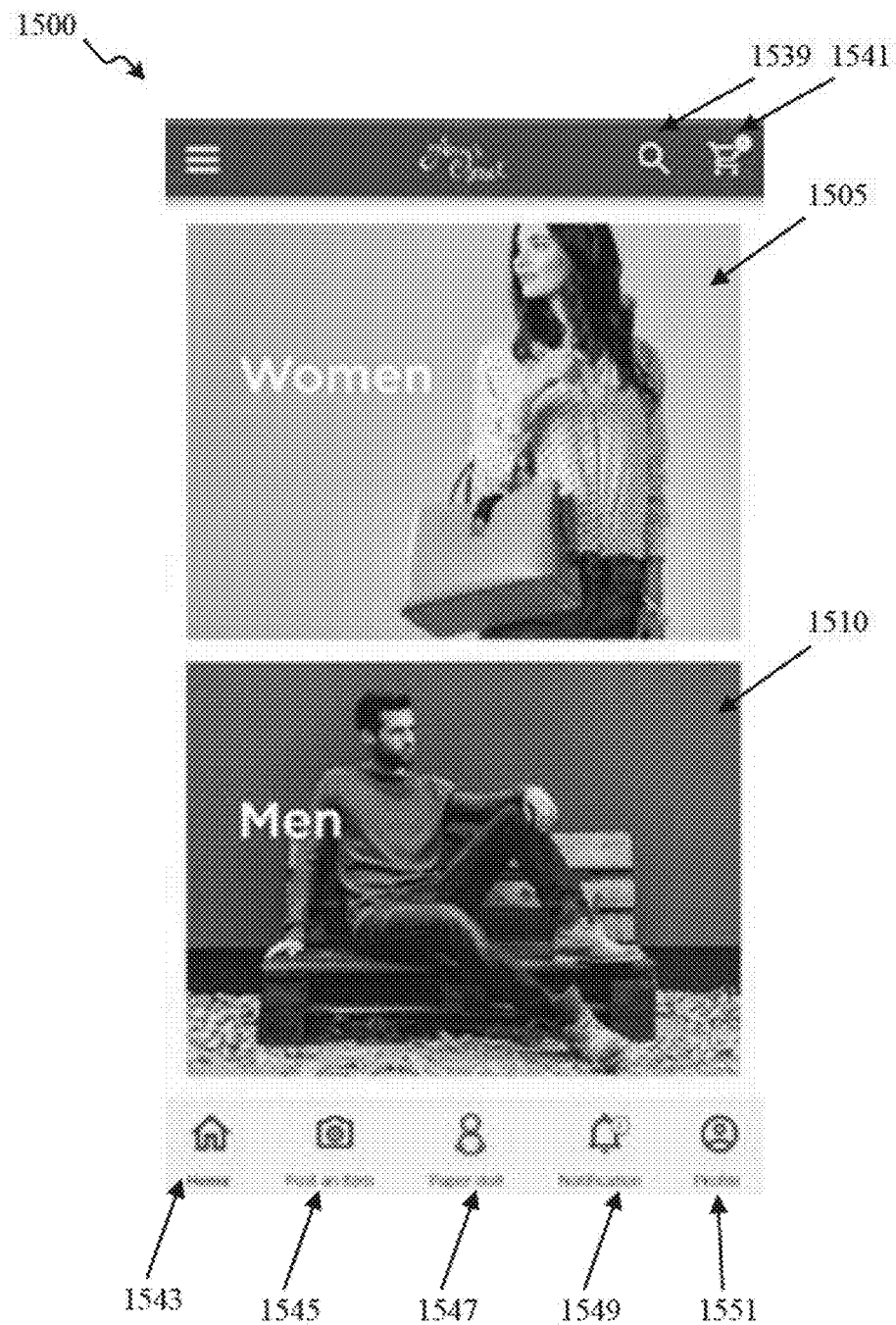
FIG. 15 illustrates a non-limiting, example user interface home screen display according to certain embodiments of this disclosure.

FIG. 15 illustrates a non-limiting, example user interface home screen display 1500 according to certain embodiments of this disclosure. The computing system 115, utilizing the at least one processor 205 executing one or more wearable article display operations, generates the user interface home screen display 1500 for display on a display screen. The user interface home screen display 1500 may be generated by the computing system 115 in response to initiating the computing system 115 to execute one or more wearable article display operations or in response to receiving a selection of one or more selection buttons described herein. The user interface home screen display 1500 may a women's wearable article search selection button 1505, a men's wearable article search selection button 1510, a home screen selection button 1543, a post an item selection button 1545, a paper doll selection button 1547, a notification selection button 1549, a profile selection button 1551, a general search button 1539, and a shopping cart selection button 1541. As shown in FIG. 15, the home screen selection button 1543 is selected so that the computing system 115, performing one or more wearable article display operations, may display the user interface home screen display 1500.

In certain embodiments, the women's wearable article search selection button 1505, when selected, may cause the computing system 115, performing wearable article display operations, to permit a viewer of the user interface home screen display 1500 to search for women's clothing or sell women's clothing. The men's wearable article search selection button 1510, when selected, may cause the computing system 115, performing wearable article display operations, to permit a viewer of the user interface home screen display 1500 to search for men's clothing or sell men's clothing. The post an item selection button 1545, when selected, may cause the computing system 115, performing wearable article display operations, to permit a viewer of the user interface home screen display 1500 to post an item to sell women's clothing or men's clothing. The paper doll selection button 1547, when selected, may cause the computing system 115, performing wearable article display operations, to generate a display of a paper doll described herein. The notification selection button 1549, when selected, may cause the computing system 115, performing wearable article display operations, to generate a display of a notification display screen as described herein. The profile selection button 1551, when selected, may cause the computing system 115, performing wearable article display operations, to generate a display of a user profile including information concerning a user profile as described herein. The general search button 1539, when selected, may cause the computing system 115, performing wearable article display operations, to generate a display to search for wearable articles as described herein. The shopping cart selection button 1541, when selected, may cause the computing system 115, performing wearable article display operations, to generate a display of a list of wearable articles that have been selected for purchase as described herein.

Figure 16:
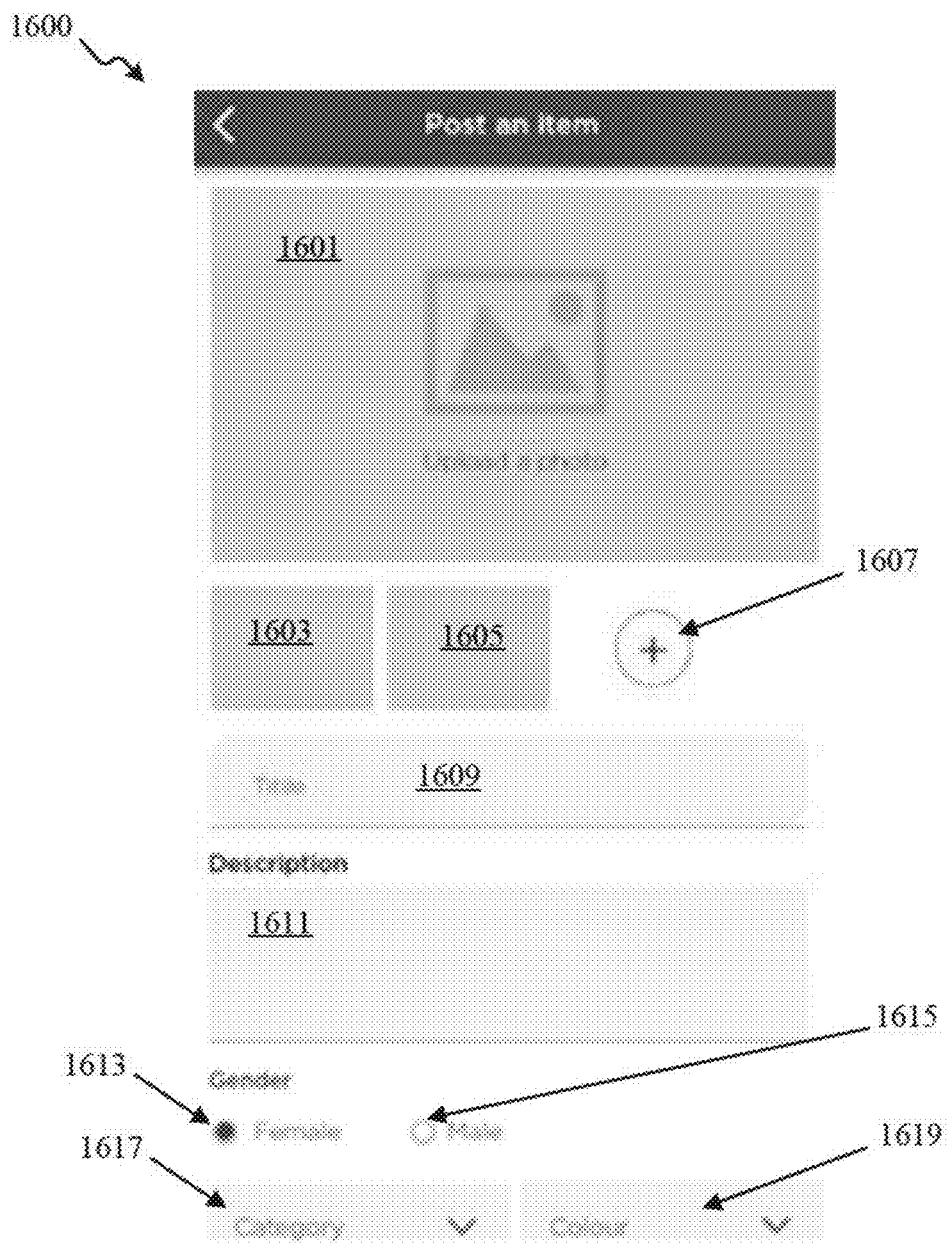
FIG. 16 illustrates a non-limiting, example user interface item post information input display according to certain embodiments of this disclosure.

FIG. 16 illustrates a non-limiting, example user interface item post information input display 1600 according to certain embodiments of this disclosure. The computing system 115, utilizing the at least one processor 205 executing one or more wearable article display operations, generates the user interface item post information input display 1600 for display on a display screen. The user interface item post information input display 1600 may be generated by the computing system 115 in response to receiving a selection of the post an item selection button 1545 illustrated in FIG. 15. The user interface item post information input display 1600 may be a display for providing information concerning a wearable article to display for sale to the public via one or more user interface displays described herein. In certain embodiments, the user interface item post information input display 1600 may include an image placement section 1601 configured to display an uploaded image of a wearable article for sale, another image placement section 1603, and another image placement section 1605 each configured to display uploaded images of a wearable article for sale. In certain embodiments, an image displayed in the image placement section 1603 or 1605 may be moved to the image placement section 1601 for display. In certain embodiments, the image placement section 1601 may be a larger section used as a primary display section for displaying a primary or preferred image associated with a wearable article for sale. The add image button 1607 may be used to add an image to one of the image placement sections 1601, 1603, or 1605. The item title field 1609 may be configured to receive text indicating a title of the wearable article to be displayed for sale. The item description field 1611 may be configured to receive text indicating a description of the wearable article to be displayed for sale. In certain embodiments, the description may include a name or brand of the wearable article, a size of the wearable article, a manufacturer or a designer of the wearable article, or the like. The female gender selection button 1613 and the male gender selection button 1615 may be selected to provide an indication of whether the article of clothing is for women or men.

Figure 17:
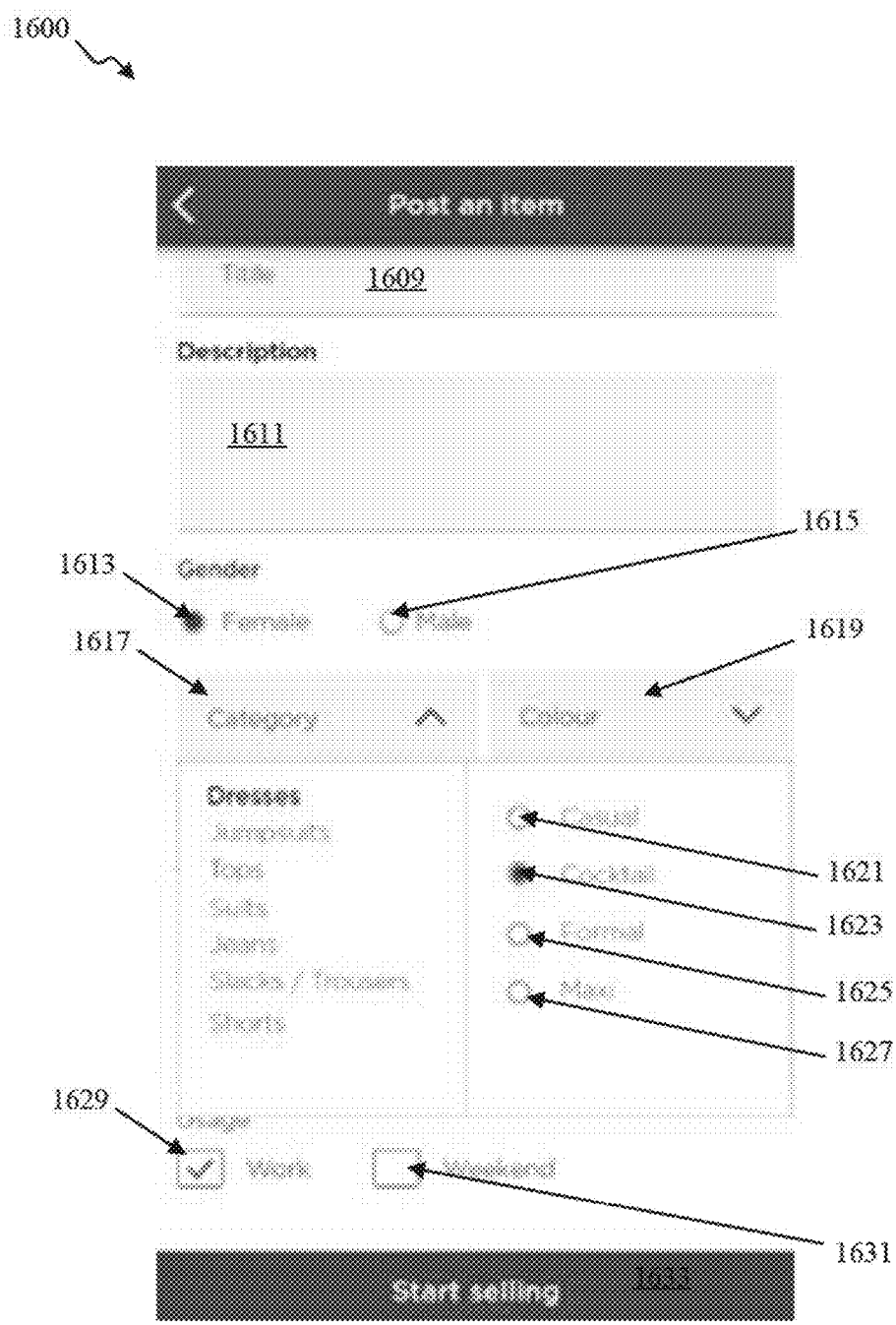
FIG. 17 illustrates a non-limiting, example user interface item post information input display according to certain embodiments of this disclosure.

FIG. 17 illustrates a non-limiting, example user interface item post information input display 1600 according to certain embodiments of this disclosure. In certain embodiments, the user interface item post information input display 1600 may include a category selection pull-down button 1617 that provides a list of categories to be selected to categorize a wearable article to be displayed for sale. For example, as shown in FIG. 17, the categories may include dresses, jumpsuits, tops, suits, jeans, slacks/trousers, shorts, or the like. In addition, the category selection pull-down button 1617 may also include a sub-category display for each category. For example, as shown in FIG. 17, when "dresses" are selected as a category, one or more of a casual selection button 1621, a cocktail selection button 1623, a formal selection button 1625, or a maxi selection button 1627 may also be selected to further distinguish the category that the wearable article to be display for sale is in. In certain embodiments, the user interface item post information input display 1600 may also include a work usage selection button 1629 and a weekend usage selection button 1631. Selection of at least one of the work usage selection button 1629 or the weekend usage selection button 1631 may provide additional information concerning the type of a wearable article to be displayed for sale. In certain embodiments, the user interface item post information input display 1600 may include a start selling selection button 1633. The start selling selection button 1633 may be selected to display for a sale a wearable article while providing information concerning the wearable article entered into the user interface item post information input display 1600.

Figure 18:
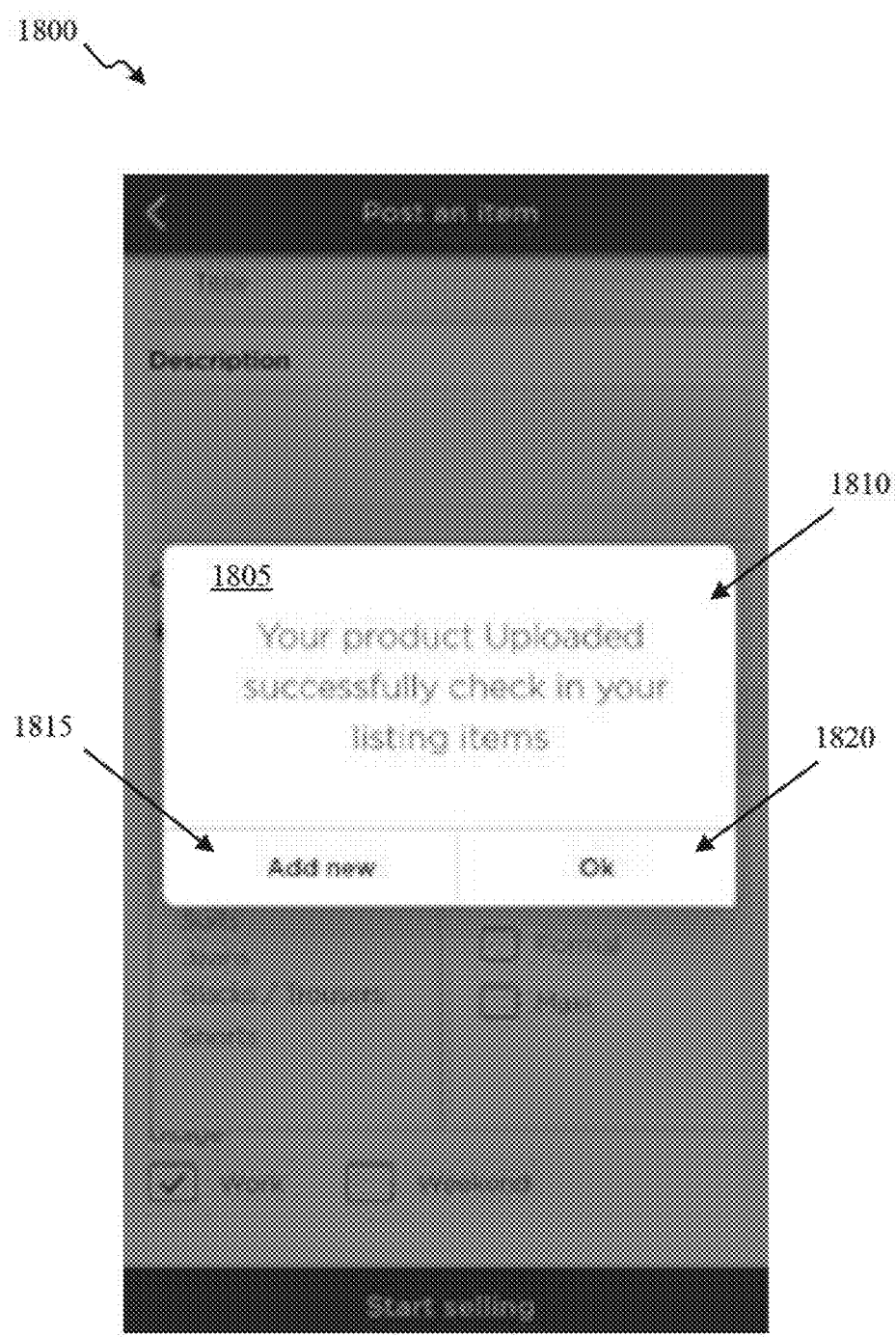
FIG. 18 illustrates a non-limiting, example user interface item post information input display according to certain embodiments of this disclosure.

FIG. 18 illustrates a non-limiting, example user interface item post information input display 1800 according to certain embodiments of this disclosure. The computing system 115, utilizing the at least one processor 205 executing one or more wearable article display operations, generates the user interface item post information input display 1800 for display on a display screen. The user interface item post information input display 1800 may be generated by the computing system 115 in response to receiving a selection of the start selling selection button 1633 illustrated in FIG. 17. As shown in FIG. 18, the user interface item post information input display 1800 includes a confirmation window 1805. The confirmation window 1805 may be overlaid the user interface item post information input display 1600 illustrated in FIGS. 16 and 17. The confirmation window 1805 may include a message 1810, an add new post selection button 1815, and a confirmation verification selection button 1820. The message 1810 may provide a confirmation that a wearable article has been posted for sale. For example, the message 1810 may recite "Your product Uploaded successfully check in your listing items." The add new post selection button 1815, when selected, may cause the computing system 115, performing one or more wearable article display operations, to generate another user interface item post information input display 1600 to post another item (e.g., another wearable article) for sale. The confirmation verification selection button 1820, when selected, may cause the computing system 115, performing one or more wearable article display operations, to close out or remove the confirmation window 1805.

Figure 19:
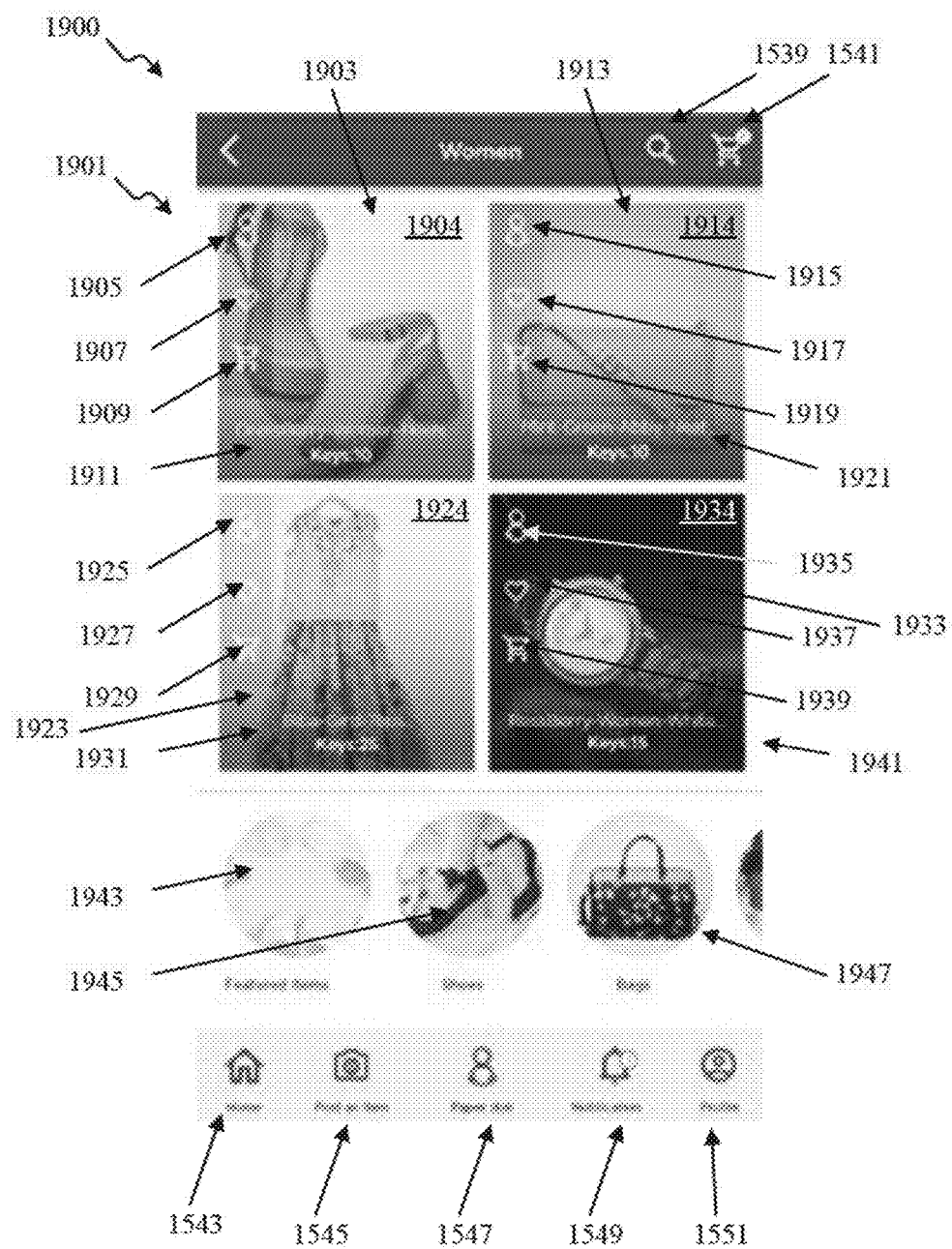
FIG. 19 illustrates a non-limiting, example user interface item display according to certain embodiments of this disclosure.

FIG. 19 illustrates a non-limiting, example user interface item display 1900 according to certain embodiments of this disclosure. The computing system 115, utilizing the at least one processor 205 executing one or more wearable article display operations, generates the user interface item display 1900 for display on a display screen. The user interface item display 1900 may be generated by the computing system 115 in response to receiving a selection of the women's wearable article search selection button 1505 illustrated in FIG. 15. As shown in FIG. 19, the user interface item display 1900 may display one or more wearable articles 1901 for viewing and selection by a user. For example, the one or more wearable articles 1901 may include a first wearable article 1903, a second wearable article 1913, a third wearable article 1923, and a fourth wearable article 1933. Each of the one or more wearable articles 1901 may include an image of the wearable article. For example, the first wearable article 1903 may include a first image 1904, the second wearable article 1913 may include a second image 1914, the third wearable article 1923 may include a third image 1924, and the fourth wearable article 1933 may include a fourth image 1934.

Each of the one or more wearable articles 1901 may include a paper doll selection button, a favorite selection button, an add to shopping cart selection button, and an information display section. For example, the first wearable article 1903 may include a paper doll selection button 1905, a favorite selection button 1907, an add to shopping cart selection button 1909, and an information display section 1911. The second wearable article 1913 may include a paper doll selection button 1915, a favorite selection button 1917, an add to shopping cart selection button 1919, and an information display section 1921. The third wearable article 1923 may include a paper doll selection button 1925, a favorite selection button 1927, an add to shopping cart selection button 1929, and an information display section 1931. The fourth wearable article 1933 may include a paper doll selection button 1935, a favorite selection button 1937, an add to shopping cart selection button 1939, and an information display section 1941.

Each of the paper doll selection buttons, when selected, may cause the computing system 115, performing one or more wearable article display operations, to transmit the image of the wearable article associated with the paper doll selection button to a paper doll display screen described herein. Each of the favorite selection buttons, when selected, may cause the computing system 115, performing one or more wearable article display operations, to store the wearable article associated with the favorite selection button to a list of selected favorite wearable articles. In certain embodiments, a selection of the favorite selection button may cause the computing system 115 to include the associated wearable article in the list of one or more selected wearable articles 807 of the user interface saved items display 800 illustrated in FIG. 8. Each of the shopping cart selection buttons, when selected, may cause the computing system 115, performing one or more wearable article display operations, to store the wearable article associated with the shopping cart selection button to a list of wearable articles that are selected for purchase. Each information display section may provide information associated with a wearable article. For example, an information display section may include a name of the wearable article, a source or designer of the wearable article, a size of the wearable article, or a price of the wearable article.

The computing system 115, utilizing the at least one processor 205 executing one or more wearable article display operations, receives a selection of a first wearable article of a first article type displayed on a display screen. For example, the computing system 115 may receive a selection of the paper doll selection button 1905 associated with the first wearable article 1903. The computing system 115 may also determine that the first wearable article 1903 is a pair of shoes and is a wearable article of a first article type (e.g., a wearable article that is to be worn on a person's feet). Similarly, the computing system 115 may receive a selection of the paper doll selection button 1915 associated with the second wearable article 1913. The computing system 115 may also determine that the second wearable article 1913 is a small purse or a clutch and is a wearable article of a second article type (e.g., a wearable article that is to be held or worn over a person's shoulder or arm). As another example, the computing system 115 may receive a selection of the paper doll selection button 1925 associated with the third wearable article 1923. The computing system 115 may also determine that the third wearable article 1923 is a dress and is a wearable article of a third article type (e.g., a wearable article that is to be worn over a person's torso or body). As yet another example, the computing system 115 may receive a selection of the paper doll selection button 1935 associated with the fourth wearable article 1933. The computing system 115 may also determine that the fourth wearable article 1933 is a wrist watch and is a wearable article of a fourth article type (e.g., a wearable article that is to be worn around a person's wrist). Each of the article types may be used to place respective wearable articles at different location on a paper doll as described herein.

Additionally, or alternatively, a favorite selection button or an add to shopping cart selection button may be selected. Similar to selected a paper doll selection button, the computing system 115 may identify a wearable article associated with the selected favorite selection button or associated with the selected add to shopping cart selection button. The computing system 115 may then determine an article type associated with the identified wearable article.

In certain embodiments, the user interface item display 1900 may also include a featured items selection button. As shown in FIG. 19, the user interface item display 1900 includes a feature items selection button 1943. The feature items selection button 1943, when selected, may cause the computing system 115, performing one or more wearable article display operations, to generate for display only features items as the one or more wearable articles 1901.

Additionally, or alternatively, the user interface item display 1900 may also include category specific selection buttons. A selection of a category specific selection button causes the computing system 115, performing one or more wearable article display operations, to generate for display only wearable articles of a specific category as the one or more wearable articles 1901. As shown in FIG. 19, the user interface item display 1900 includes a shoe category selection button 1945 and a bags category selection button 1947. When a selection of the shoe category selection button 1945 is received, the computing system 115, performing one or more wearable article display operations, may generate the one or more wearable articles 1901 containing only wearable articles that are shoes. When a selection of the bag category selection button 1947 is received, the computing system 115, performing one or more wearable article display operations, may generate the one or more wearable articles 1901 containing only wearable articles that are bags. It should be understood that category specific selection buttons are not limited to only shoes and bags. In certain embodiments, category specific selection buttons may additionally, or alternatively, include pants, rain jackets, sweaters, pairs of socks, pairs stockings, shirts, blouses, coats, hats, sunglasses, bracelets, rings, earrings, undergarments, scarfs, leggings, swimsuits, robes, slippers, sandals, shawls, ties, cuff-links, belts, wallets, watches, or the like.

Figure 20:
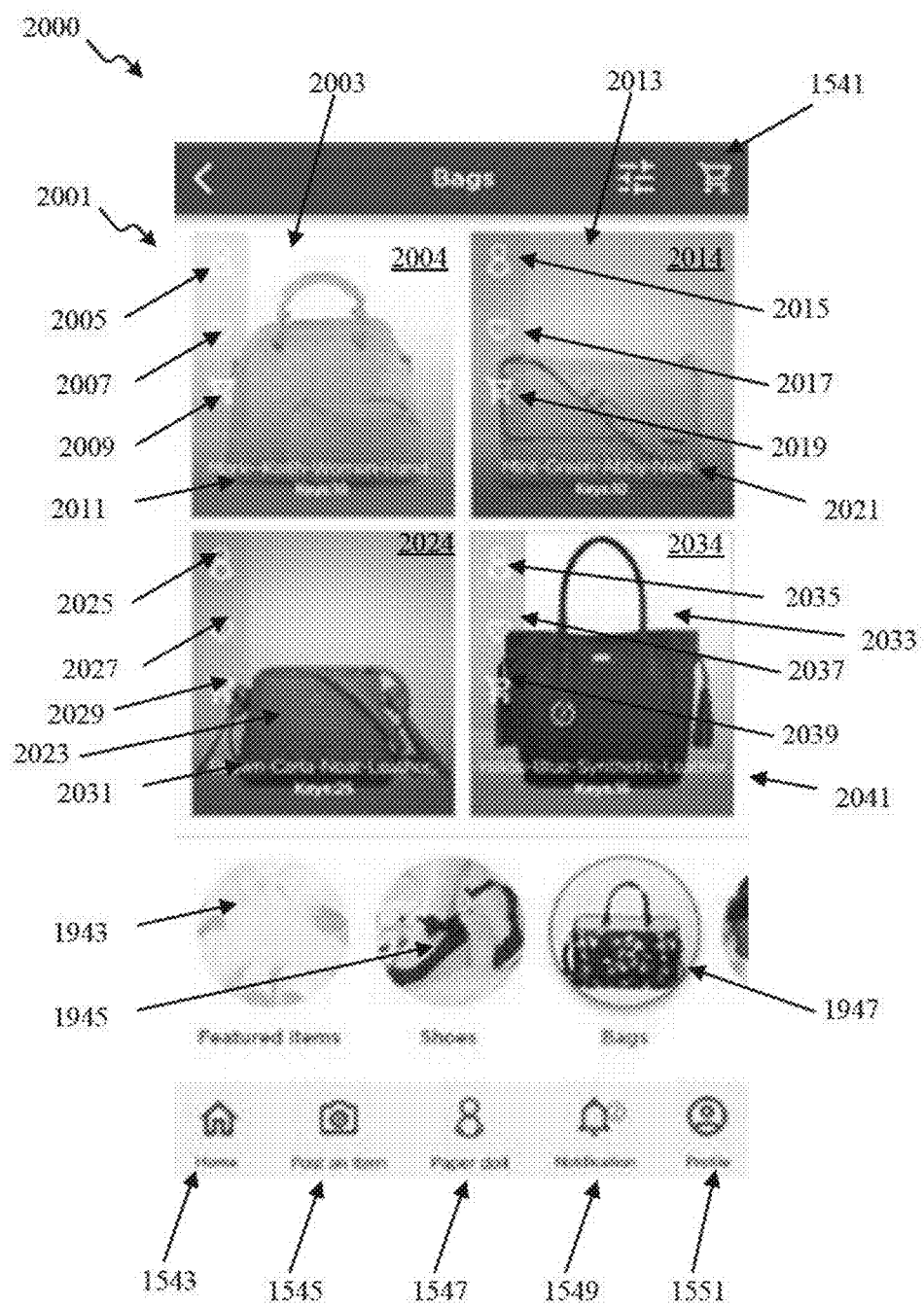
FIG. 20 illustrates a non-limiting, example user interface item display according to certain embodiments of this disclosure.

FIG. 20 illustrates a non-limiting, example user interface item display 2000 according to certain embodiments of this disclosure. The computing system 115, utilizing the at least one processor 205 executing one or more wearable article display operations, generates the user interface item display 2000 for display on a display screen. The user interface item display 1900 may be generated by the computing system 115 in response to receiving a selection of the bags category selection button 1947 illustrated in FIGS. 19 and 20. As shown in FIG. 20, the user interface item display 2000 may display one or more wearable articles 2001 for viewing and selection by a user. Because the bags category selection button 1947 has been selected, the one or more wearable articles 2001 may include only bags. For example, the one or more wearable articles 2001 may include a first bag 2003, a second bag 2013, a third bag 2023, and a fourth bag 2033. Each of the one or more wearable articles 1901 may include an image of the wearable article. For example, the first bag 2003 may include an image of the bag 2004, the second wearable article 2013 may include an image of the bag 2014, the third bag 1923 may include an image of the bag 2024, and the fourth bag 1933 may include an image of the bag 2034.

Each of the one or more wearable articles 2001 may include a paper doll selection button, a favorite selection button, an add to shopping cart selection button, and an information display section. For example, the first bag 2003 may include a paper doll selection button 2005, a favorite selection button 2007, an add to shopping cart selection button 2009, and an information display section 2011. The second bag 2013 may include a paper doll selection button 2015, a favorite selection button 2017, an add to shopping cart selection button 2019, and an information display section 2021. The third bag 2023 may include a paper doll selection button 2025, a favorite selection button 2027, an add to shopping cart selection button 2029, and an information display section 2031. The fourth bag 2033 may include a paper doll selection button 2035, a favorite selection button 2037, an add to shopping cart selection button 2039, and an information display section 2041.

Each of the paper doll selection buttons, when selected, may cause the computing system 115, performing one or more wearable article display operations, to transmit the image of the wearable article associated with the paper doll selection button to a paper doll display screen described herein. Each of the favorite selection buttons, when selected, may cause the computing system 115, performing one or more wearable article display operations, to store the wearable article associated with the favorite selection button to a list of selected favorite wearable articles. In certain embodiments, a selection of the favorite selection button may cause the computing system 115 to include the associated wearable article in the list of one or more selected wearable articles 807 of the user interface saved items display 800 illustrated in FIG. 8. Each of the shopping cart selection buttons, when selected, may cause the computing system 115, performing one or more wearable article display operations, to store the wearable article associated with the shopping cart selection button to a list of wearable articles that are selected for purchase. Each information display section may provide information associated with a wearable article. For example, an information display section may include a name of the wearable article, a source or designer of the wearable article, a size of the wearable article, or a price of the wearable article.

The computing system 115, utilizing the at least one processor 205 executing one or more wearable article display operations, receives a selection of a first wearable article of a first article type displayed on a display screen. For example, the computing system 115 may receive a selection of the paper doll selection button 2005 associated with the first bag 2003. The computing system 115 may also determine that the first bag 2003 is a bag and is a wearable article of a first article type (e.g., a wearable article that is to be held or worn over a person's shoulder or arm). Similarly, the computing system 115 may receive a selection of the paper doll selection button 2015 associated with the second bag 2013. The computing system 115 may also determine that the second bag 2013 is a bag and is a wearable article of the first article type (e.g., a wearable article that is to be held or worn over a person's shoulder or arm). As another example, the computing system 115 may receive a selection of the paper doll selection button 2025 associated with the third bag 2023. The computing system 115 may also determine that the third bag 2023 is a bag and is a wearable article of the first article type (e.g., a wearable article that is to be held or worn over a person's shoulder or arm). As yet another example, the computing system 115 may receive a selection of the paper doll selection button 2035 associated with the fourth bag 2033. The computing system 115 may also determine that the fourth bag 2033 is a bag and is a wearable article of the first article type (e.g., a wearable article that is to be held or worn over a person's shoulder or arm). Each of the article types may be used to place respective wearable articles at different location on a paper doll as described herein. In certain embodiments, for example, when at least two of the one or more wearable articles 2001 have a same article type, only one of the two or more wearable articles having the same article type may be displayed on a paper doll, described herein, at any one time.

Figure 21:
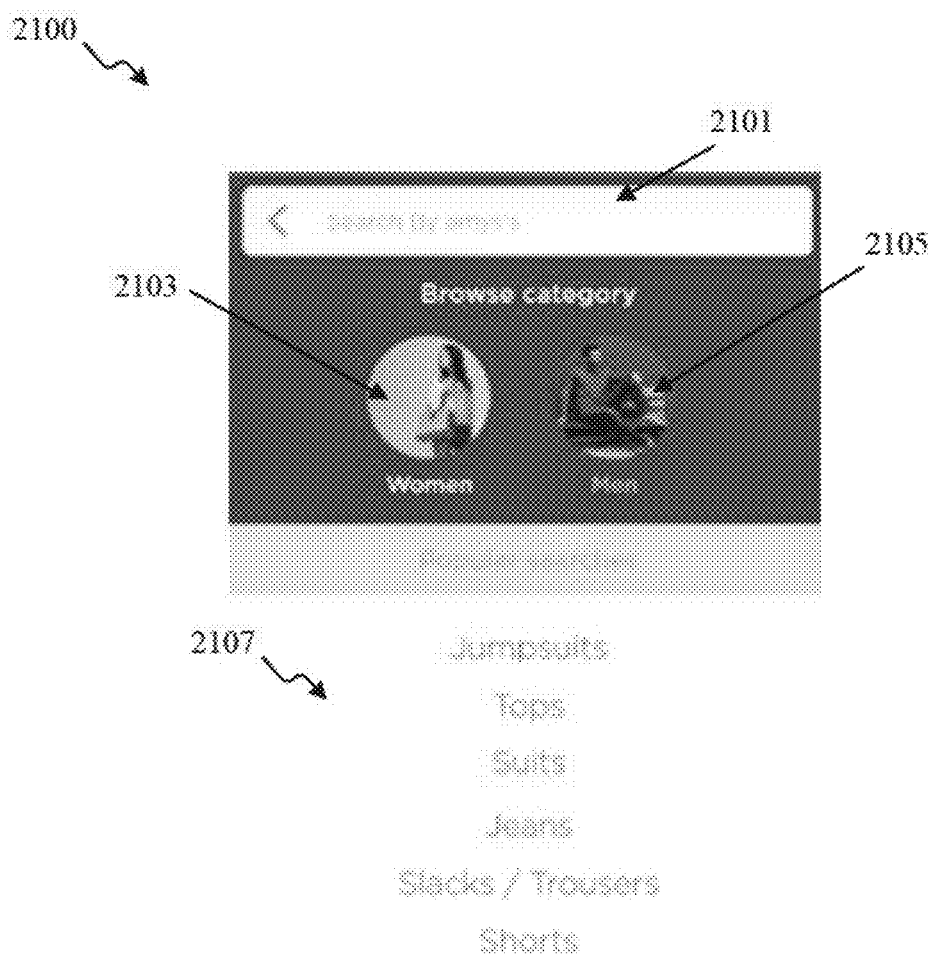
FIG. 21 illustrates a non-limiting, example user interface search display according to certain embodiments of this disclosure.

FIG. 21 illustrates a non-limiting, example user interface search display 2100 according to certain embodiments of this disclosure. The computing system 115, utilizing the at least one processor 205 executing one or more wearable article display operations, generates the user interface search display 2100 for display on a display screen. The user interface item display 2100 may be generated by the computing system 115 in response to receiving a selection a search wearable article selection button, a search items selection button, or a search selection button as described herein. As shown in FIG. 21, the user interface item display 2100 may include a search text input field 2101. The search text input field 2101 may receive text associated with a specific wearable article, a category of wearable articles, a characteristic of wearable articles, a wearable article type, or the like. In response to receiving text in the search text input field 2101, the computing system 115, performing one or more wearable article display operations, may generate for display a list of wearable articles that satisfies the text provided in the search text input field 2101. The user interface item display 2100 may also include a women's browse category selection button 2103 and a men's browse category selection button 2105. In response to receiving a selection of the women's browse category selection button 2103, the computing system 115, performing one or more wearable article display operations, may generate for display a list of wearable articles for women. Similarly, in response to receiving a selection of the men's browse category selection button 2105, the computing system 115, performing one or more wearable article display operations, may generate for display a list of wearable articles for men. The user interface item display 2100 may further include one or more popular searches 2107. For example, the one or more popular searches 2107 may include jumpsuits, tops, suits, jeans, slacks/trousers, shorts, or the like. In response to receiving a selection of a popular search of the one or more popular searches 2107, the computing system 115, performing one or more wearable article display operations, may generate for display a list of wearable articles that satisfy the selected popular search.

Figure 22:
FIG. 22 illustrates a non-limiting, example user interface search sub-display according to certain embodiments of this disclosure.

FIG. 22 illustrates a non-limiting, example user interface search display 2200 according to certain embodiments of this disclosure. The computing system 115, utilizing the at least one processor 205 executing one or more wearable article display operations, generates the user interface search display 2200 for display on a display screen. The user interface item display 2200 may be generated by the computing system 115 in response to receiving a selection a search wearable article selection button, a search items selection button, or a search selection button as described herein. As shown in FIG. 22, the user interface item display 2200 may include a search category selection window 2201. The search category selection window 2201 may include one or more fields 2203 by which to sort a search. For example, the one or more fields 2203 may include a category, a size, a price or price range, one or more colors, one or more styles, a pattern, a condition, or the like. The search category selection window 2201 may also include one or more subfields 2205. The one or more subfields 2205 may further sort a search after a field of the one or more fields 2203 selected. As shown in FIG. 22, the field, "Category," of the one or more fields 2203 has been selected. Because the field, "Category" has been selected, the one or more subfields 2205 includes the subfields of dresses, jumpsuits, tops, suits, jeans, slacks/trouser, or the like. In response to selecting one of the one or more subfields 2203, a drop-down may be generated to further sort or specify the search. For example, as shown in FIG. 22, the dresses subcategory has been selected generating a drop-down that includes casual dresses, cocktail dresses, formal dresses, and maxi dresses. A selection of one or more of the descriptors provided in the drop-down may be used to further sort or specify the search.

Figure 23:
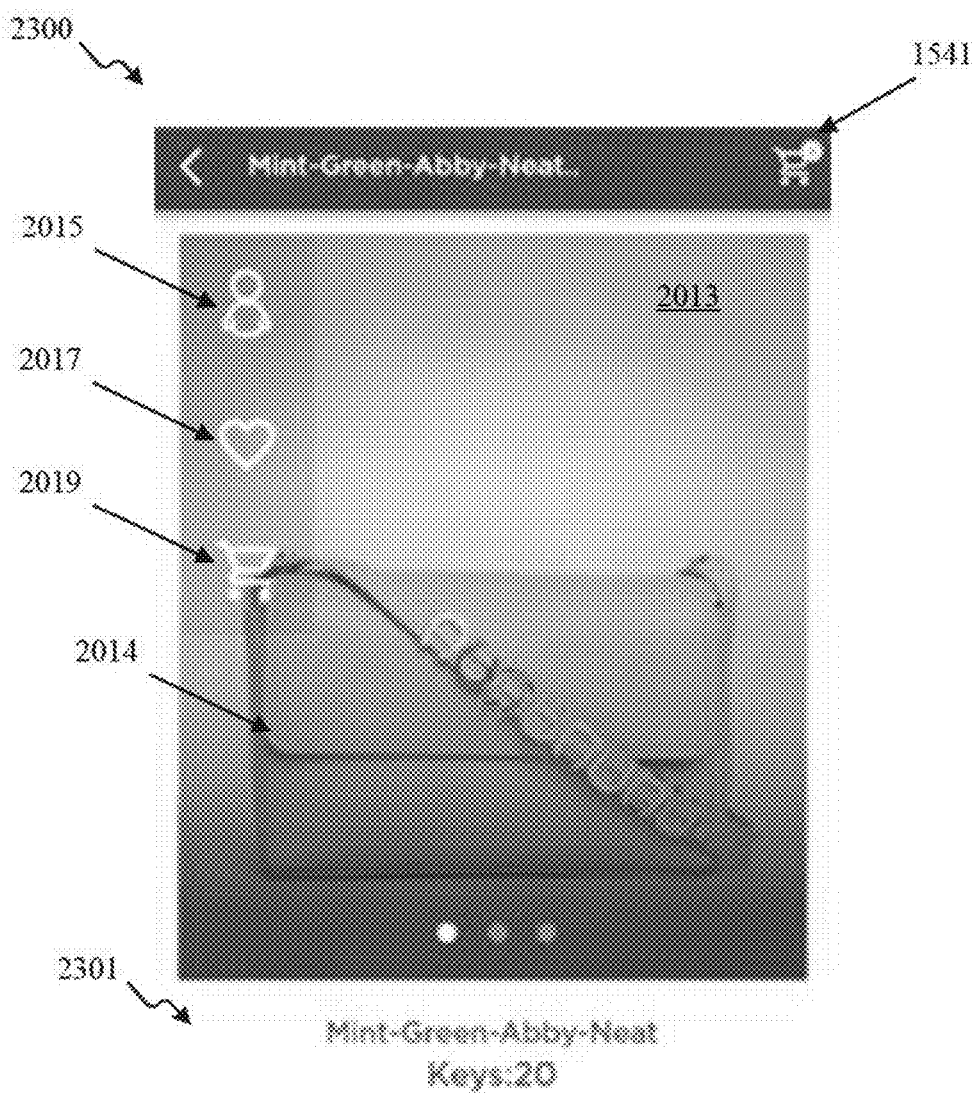
FIG. 23 illustrates a non-limiting, example user interface item display according to certain embodiments of this disclosure.

FIG. 23 illustrates a non-limiting, example user interface search sub-display 2300 according to certain embodiments of this disclosure. The computing system 115, utilizing the at least one processor 205 executing one or more wearable article display operations, generates the user interface search sub-display 2300 for display on a display screen. The user interface search sub-display 2300 may be generated by the computing system 115 in response to receiving a selection on an image of a wearable article of the one or more wearable articles 1901 illustrated in FIG. 19 or the one or more wearable articles 2001 illustrated in FIG. 20. As shown in FIG. 23, the user interface search sub-display 2300 may include the wearable article 2013, an image of the wearable article 2014, a paper doll selection button 2015, a favorite selection button 2017, an add to shopping cart selection button 2019. Each of these features may perform one or more of the same or similar functions as described with respect to at least FIGS. 19 and 20 herein. In addition, the user interface search sub-display 2300 may also include an expanded information display section 2301 providing information concerning the wearable article 2013. As shown in FIG. 23, the expanded information display section 2301 includes a title or name of the wearable article, a source or designer of the wearable article, a price of the wearable article, a style of the wearable article, a condition of the wearable article, and a label of the wearable article.

Figure 24:
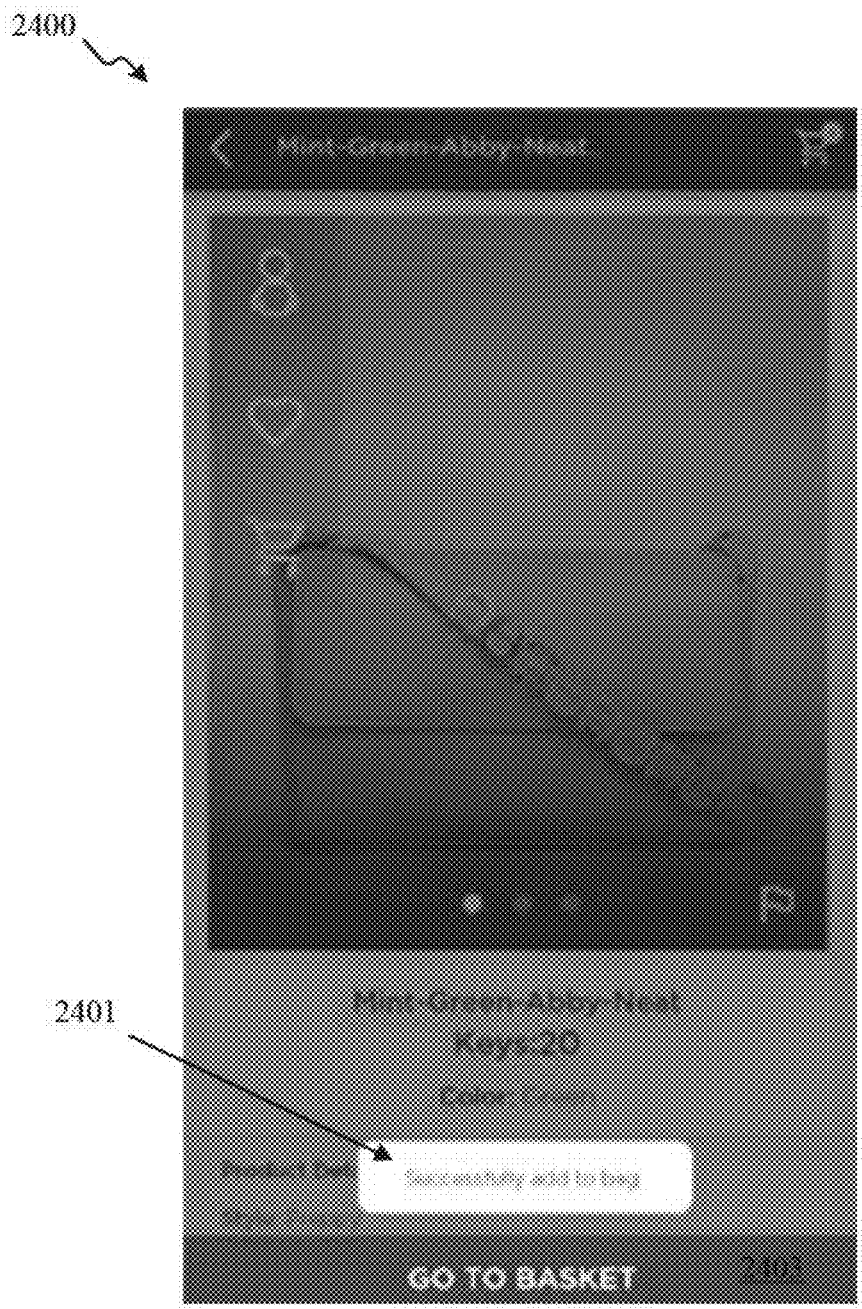
FIG. 24 illustrates a non-limiting, example user interface item display according to certain embodiments of this disclosure.

FIG. 24 illustrates a non-limiting, example user interface item display 2400 according to certain embodiments of this disclosure. The computing system 115, utilizing the at least one processor 205 executing one or more wearable article display operations, generates the user interface item display 2400 for display on a display screen. The user interface search sub-display 2300 may be generated by the computing system 115 in response to receiving a selection of a shopping cart selection button 2019 illustrated in FIGS. 20 and 23. As shown in FIG. 24, a display screen is grayed-out and a window 2401 is overlaid the grayed-out display screen. The window 2401 includes an indication that a wearable article has been placed in a shopping cart for purchase. For example, the window 2401 includes the text "successfully add to bag" to indicate that the wearable article has been placed in a shopping cart for purchase. The user interface item display 2400 also includes a purchased items selection button 2403. The purchased items selection button, when selected, may cause the computing system, performing one or more wearable article display operations, to generate a shopping cart list of wearable articles selected for purchase as described herein.

Figure 25:
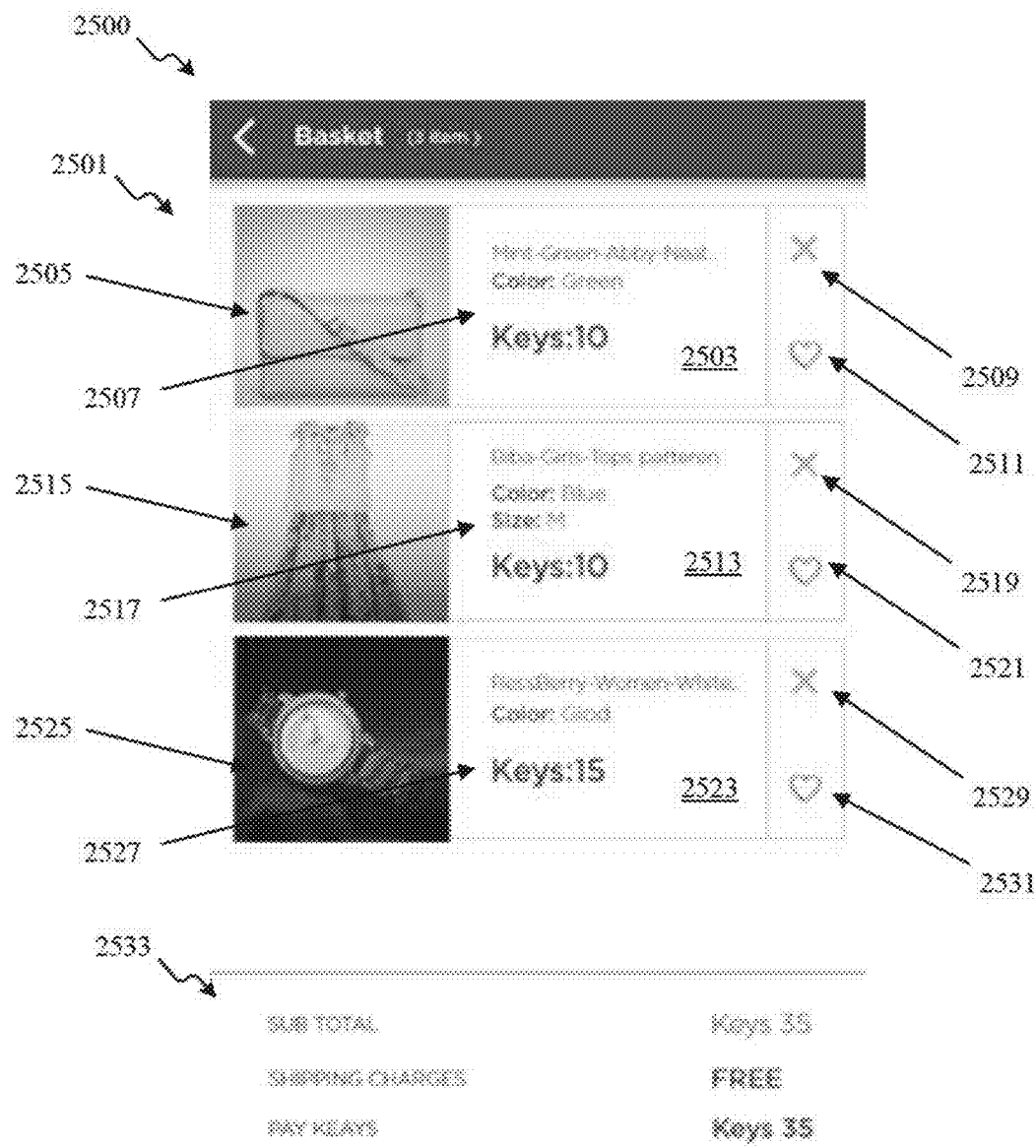
FIG. 25 illustrates a non-limiting, example user interface item basket display according to certain embodiments of this disclosure.

FIG. 25 illustrates a non-limiting, example user interface item basket display 2500 according to certain embodiments of this disclosure. The computing system 115, utilizing the at least one processor 205 executing one or more wearable article display operations, generates the user interface item basket display 2500 for display on a display screen. The user interface item basket display 2500 may display a list of items or wearable articles to be purchased by a user. The user interface item basket display 2500 may be generated by the computing system 115 in response to receiving a selection of the purchased items selection button 2403 illustrated in FIG. 24. As shown in FIG. 25, the user interface item basket display 2500 includes one or more to be purchased wearable articles including a first wearable article 2503, a second wearable article 2513, and a third wearable article 2523. Each of the one or more to be purchased wearable articles 2501 may include a wearable article image, a wearable article description, a wearable article removal selection button, and a wearable article save selection button. For example, the first wearable article 2503 may include a wearable article image 2505, a wearable article description 2507, a wearable article removal selection button 2509, and a wearable article save selection button 2511. Similarly, the second wearable article 2513 may include a wearable article image 2515, a wearable article description 2517, a wearable article removal selection button 2519, and a wearable article save selection button 2521. As another example, the third wearable article 2523 may include a wearable article image 2525, a wearable article description 2527, a wearable article removal selection button 2529, and a wearable article save selection button 2531.

In certain embodiments, each of the wearable article descriptions may include a name of the wearable article, a source of the wearable article, a color of the wearable article, and a price for the wearable article. Each of the wearable article removal selection buttons, when selected, may cause the computing system 115, performing one or more wearable article display operations, to remove the wearable article associated with the wearable article removal selection button from the user interface item basket display 2500. Each of the wearable article save selection buttons, when selected, may cause the computing system 115, performing one or more wearable article display operations, to save the wearable article associated with the wearable article save selection button for purchase at another time. For example, the selection of the wearable article save selection button 2511 may cause the computing system 115 to keep the wearable article 2503 in the user interface item basket display 2500 well preventing the wearable article 2503 from being tabulated for purchase until a future time.

In certain embodiments, user interface item basket display 2500 may also include a price total display section 2533. The price total display section 2533 may include the sum of the prices for each of the first wearable item 2503, the second wearable item 2513, and the third wearable item 2523. In certain embodiments, the price total display section 2533 may also include any shipping charges and any applicable taxes and provide a total price for the one or more wearable articles 2501. In certain embodiments, the individual prices for each wearable article and the total price may be displayed in keys. Additionally, or alternatively, the individual prices for each wearable article in the total price may be displayed and commonly use currency such as United States dollars. In certain embodiments, when one or more wearable article save selection buttons have been selected, the total price illustrated in the price total display section 2533 may not include the price of items associated with each of the selected wearable article save selection buttons.

Figure 26:
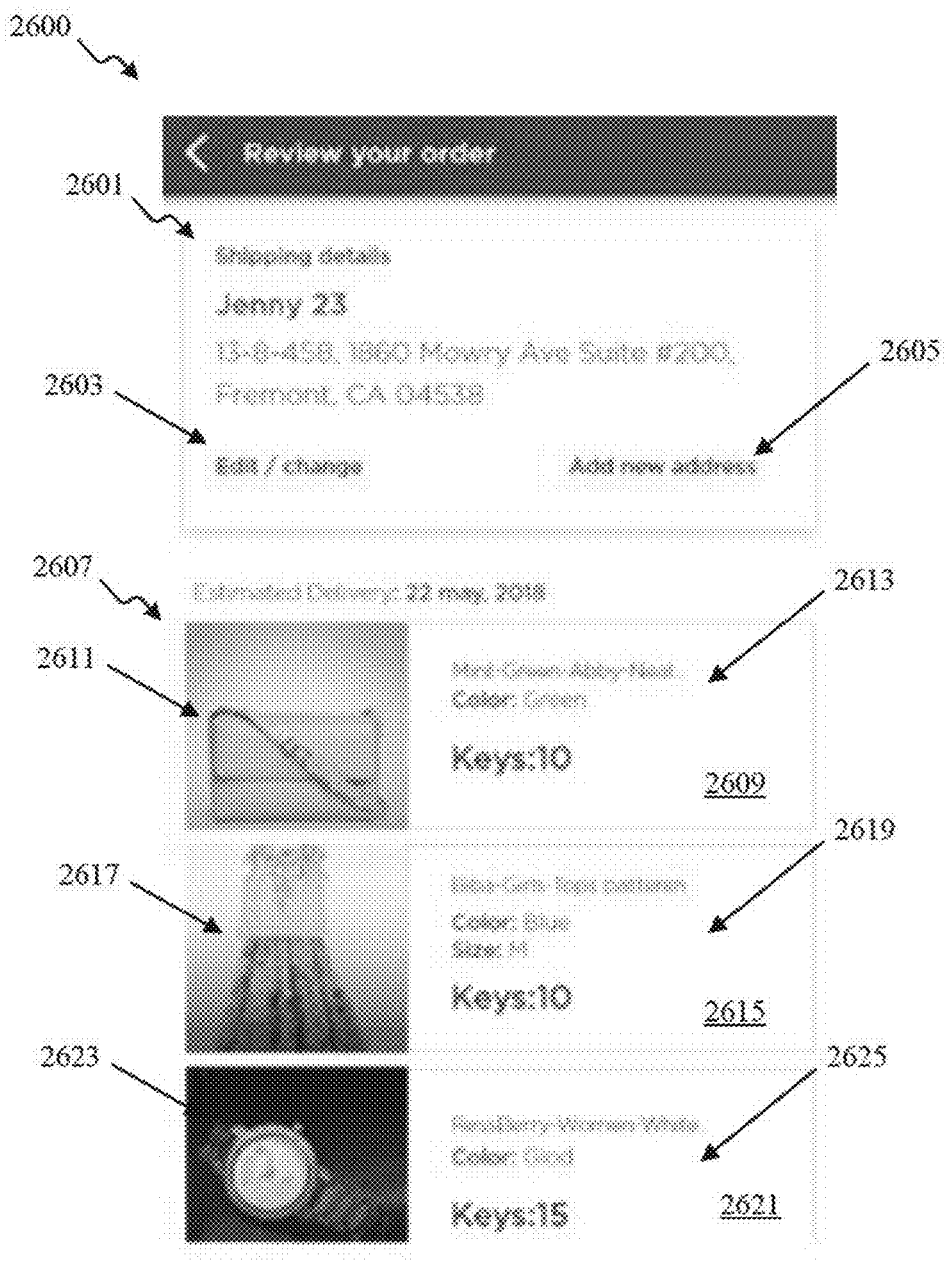
FIG. 26 illustrates a non-limiting, example user interface item order display according to certain embodiments of this disclosure.

FIG. 26 illustrates a non-limiting, example user interface item order display 2600 according to certain embodiments of this disclosure. The computing system 115, utilizing the at least one processor 205 executing one or more wearable article display operations, generates the user interface item order display 2600 for display on a display screen. The user interface item order display 2600 may display a list of items or wearable articles that have been purchased and ordered for delivery by a user. The user interface item order display 2600 may be generated by the computing system 115 after the user interface item basket display 2500 illustrated in FIG. 25 is displayed. As shown in FIG. 26, the user interface item order display 2600 includes a shipping details window 2601 and a list of one or more wearable articles 2607 that have been purchased and ordered for delivery by a user. As shown in FIG. 26, the shipping details window 2601 includes a username associated with a user profile and a shipping address associated with the user profile. The shipping details window 2601 also includes an edit or change shipping address selection button 2603 and add new address selection button 2605. In response to receiving a selection of the editor change shipping address selection button 2603, the computing system 115, performing one or more wearable article display operations, may generate for display one or more fields containing the displayed shipping address or one or more shipping addresses associated with the user profile and may permit a user to edit the displayed shipping address or change the displayed shipping address to another shipping address associated with the user profile. In response to receiving a selection of the add new address selection button 2605, the computing system 115, performing one or more wearable article display operations, may generate for display one or more fields so that a user may provide a new shipping address that may receive the order.

The user interface item order display 2600 may also include a display of one or more ordered wearable articles 2607. For example, the display of one or more ordered wearable articles 2607 may include a first ordered wearable article 2609, a second ordered wearable article 2615, and a third ordered wearable article 2621. Each of the one or more ordered wearable articles 2607 may include a wearable article image and the wearable article description. For example, the first ordered wearable article 2609 may include a wearable article image 2611 and a wearable article description 2613. As another example, the second ordered wearable article 2615 may include a wearable article image 2617 and a wearable article description 2619. As yet another example, the third ordered wearable article 2621 may include a wearable article image 2623 and a wearable article description 2625. Each of the wearable article descriptions of FIG. 26 may be the same as or similar to other wearable article descriptions described herein.

Figure 27:
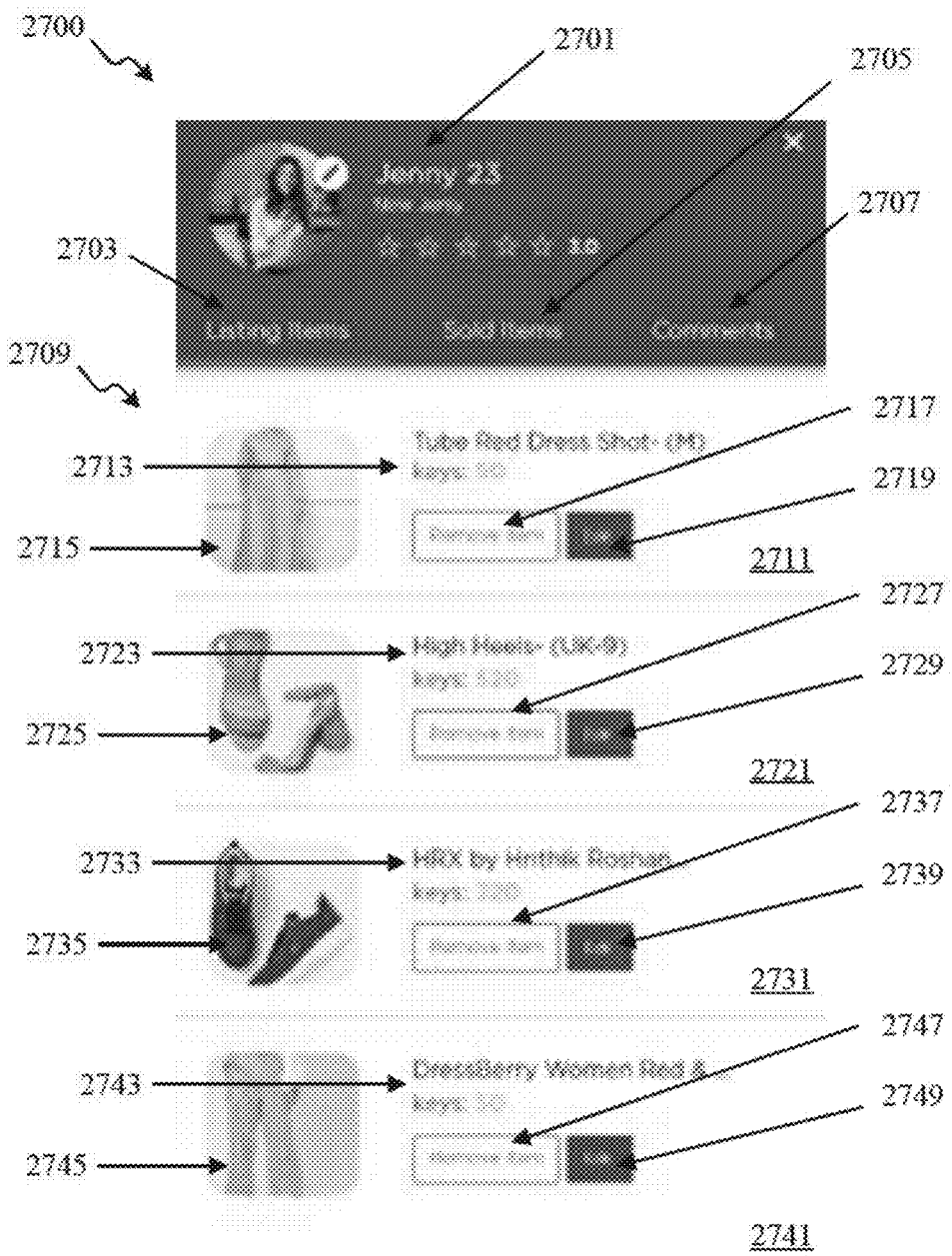
FIG. 27 illustrates a non-limiting, example user interface merchant product display according to certain embodiments of this disclosure.

FIG. 27 illustrates a non-limiting, example user interface merchant product display 2700 according to certain embodiments of this disclosure. The computing system 115, utilizing the at least one processor 205 executing one or more wearable article display operations, generates the user interface merchant product display 2700 for display on a display screen. The user interface merchant product display 2700 may display a list of items or wearable articles that have been placed on display for purchase by a user associated with a user account. As shown in FIG. 27, the user interface merchant product display 2700 includes a user profile information display section 2701, a listing of items selection button 2703, a listing of sold items selection button 2705, and a comments section selection button 2707. The user profile information display section 2701 may include an image of a user associated with the user profile, a user profile name, a user profile location, and an average customer rating of the user profile. The listing of items selection button 2703, when selected, may cause the computing system 115, performing one or more wearable article display operations, to generate a display of one or more wearable articles that are presented to potential purchasers for purchase. The listing of sold items selection button 2705, when selected, may cause the computing system 115, performing one or more wearable article display operations, to generate for display of one or more wearable articles that have been sold by a user associated with the user profile. The comments section selection button 2707, when selected, may cause the computing system 115, performing one or more wearable article display operations, to generate for display comments provided by purchasers or potential purchasers concerning the user of the user profile or wearable items sold by the user of the user profile.

As described herein, when the listing of items selection button 2703 is selected, the computing system 115 may generate for display one or more wearable articles that are presented to potential purchasers for purchase. As shown in FIG. 27, the listing of items selection button 2703 is selected and one or more wearable articles 2709 that are presented to potential purchasers for purchase are displayed. For example, the one or more wearable articles 2709 include a first wearable article 2711, a second wearable article 2721, a third wearable article 2731, and a fourth wearable article 2741. Each of the one or more wearable articles 2709 may include a wearable article description, a wearable article image, a remove wearable article selection button, and an edit wearable article selection button. For example, the first wearable article 2711 includes a wearable article description 2713, a wearable article image 2715, a remove wearable article selection button 2717, and an edit wearable article selection button 2719. As another example, the second wearable article 2721 includes a wearable article description 2723, a wearable article image 2725, a remove wearable article selection button 2727, and an edit wearable article selection button 2729. As yet another example, the third wearable article 2731 includes a wearable article description 2733, a wearable article image 2735, a remove wearable article selection button 2737, and an edit wearable article selection button 2739. As another example, the fourth wearable article 2741 includes a wearable article description 2743, a wearable article image 2745, a remove wearable article selection button 2747, and an edit wearable article selection button 2749.

Each of the wearable article descriptions may include information concerning a respective wearable article. For example, each of the wearable article descriptions may include a name of the wearable article, a brand of the wearable article, a size of the wearable article, and a price for the wearable article. Each of the remove wearable article selection buttons, when selected, may cause the computing system 115, performing one or more wearable article display operations, to remove an associated wearable article from the one or more verbal articles 2709 that are displayed for presentation to potential purchasers. Each of the edit wearable article selection buttons, when selected, may cause the computing system 115, performing one or more wearable article display operations, to permit a user of a user profile to edit a wearable article description or a wearable article image of an associated wearable article.

Figure 28:
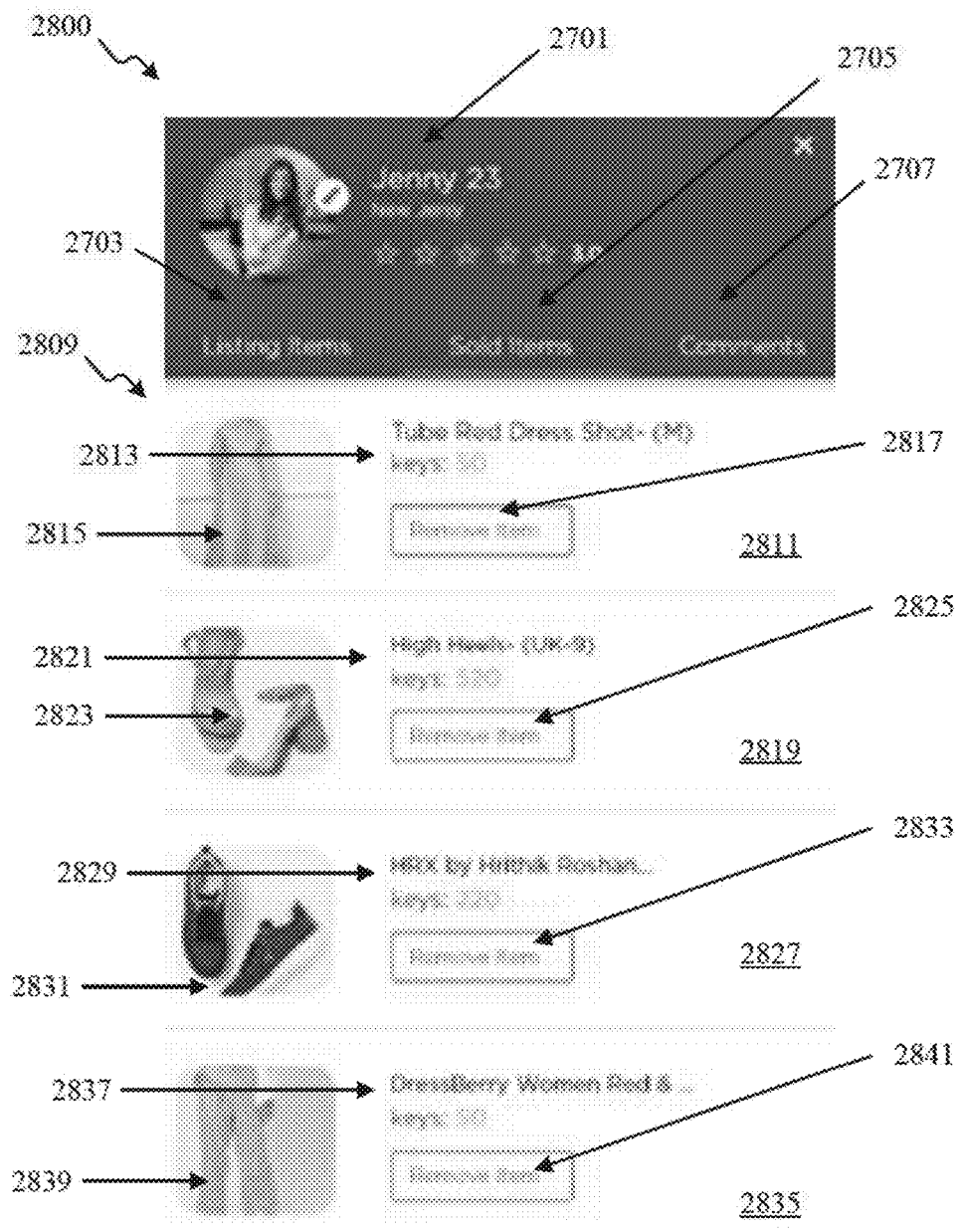
FIG. 28 illustrates a non-limiting, example user interface merchant product display according to certain embodiments of this disclosure.

FIG. 28 illustrates a non-limiting, example user interface merchant product display 2800 according to certain embodiments of this disclosure. The computing system 115, utilizing the at least one processor 205 executing one or more wearable article display operations, generates the user interface merchant product display 2800 for display on a display screen. The user interface merchant product display 2800 may display a list of items or wearable articles that have been sold to customers by a user associated with a user account. As shown in FIG. 28, the user interface merchant product display 2800 includes a user profile information display section 2701, a listing of items selection button 2703, a listing of sold items selection button 2705, and a comments section selection button 2707. The user profile information display section 2701 may include an image of a user associated with the user profile, a user profile name, a user profile location, and an average customer rating of the user profile. The listing of items selection button 2703, when selected, may cause the computing system 115, performing one or more wearable article display operations, to generate a display of one or more wearable articles that are presented to potential purchasers for purchase. The listing of sold items selection button 2705, when selected, may cause the computing system 115, performing one or more wearable article display operations, to generate for display of one or more wearable articles that have been sold by a user associated with the user profile. The comments section selection button 2707, when selected, may cause the computing system 115, performing one or more wearable article display operations, to generate for display comments provided by purchasers or potential purchasers concerning the user of the user profile or wearable items sold by the user of the user profile.

As described herein, when the listing of sold items selection button 2705 is selected, the computing system 115 may generate for display of one or more wearable articles that have been sold by a user associated with the user profile. As shown in FIG. 28, the listing of sold items selection button 2705 is selected and one or more wearable articles 2809 that have been sold to purchasers by a user associated with the user profile are displayed. For example, the one or more wearable articles 2809 include a first wearable article 2811, a second wearable article 2819, a third wearable article 2827, and a fourth wearable article 2835. Each of the one or more wearable articles 2809 may include a wearable article description, a wearable article image, and a remove wearable article selection button. For example, the first wearable article 2811 includes a wearable article description 2813, a wearable article image 2815, and a remove wearable article selection button 2817. As another example, the second wearable article 2819 includes a wearable article description 2821, a wearable article image 2823, and a remove wearable article selection button 2825. As yet another example, the third wearable article 2827 includes a wearable article description 2829, a wearable article image 2831, and a remove wearable article selection button 2833. As another example, the fourth wearable article 2835 includes a wearable article description 2837, a wearable article image 2839, and a remove wearable article selection button 2841.

Each of the wearable article descriptions may include information concerning a respective wearable article. For example, each of the wearable article descriptions may include a name of the wearable article, a brand of the wearable article, a size of the wearable article, and a price that the wearable article sold for. Each of the remove wearable article selection buttons, when selected, may cause the computing system 115, performing one or more wearable article display operations, to remove an associated wearable article from the one or more verbal articles 2809 that are displayed.

Figure 29:
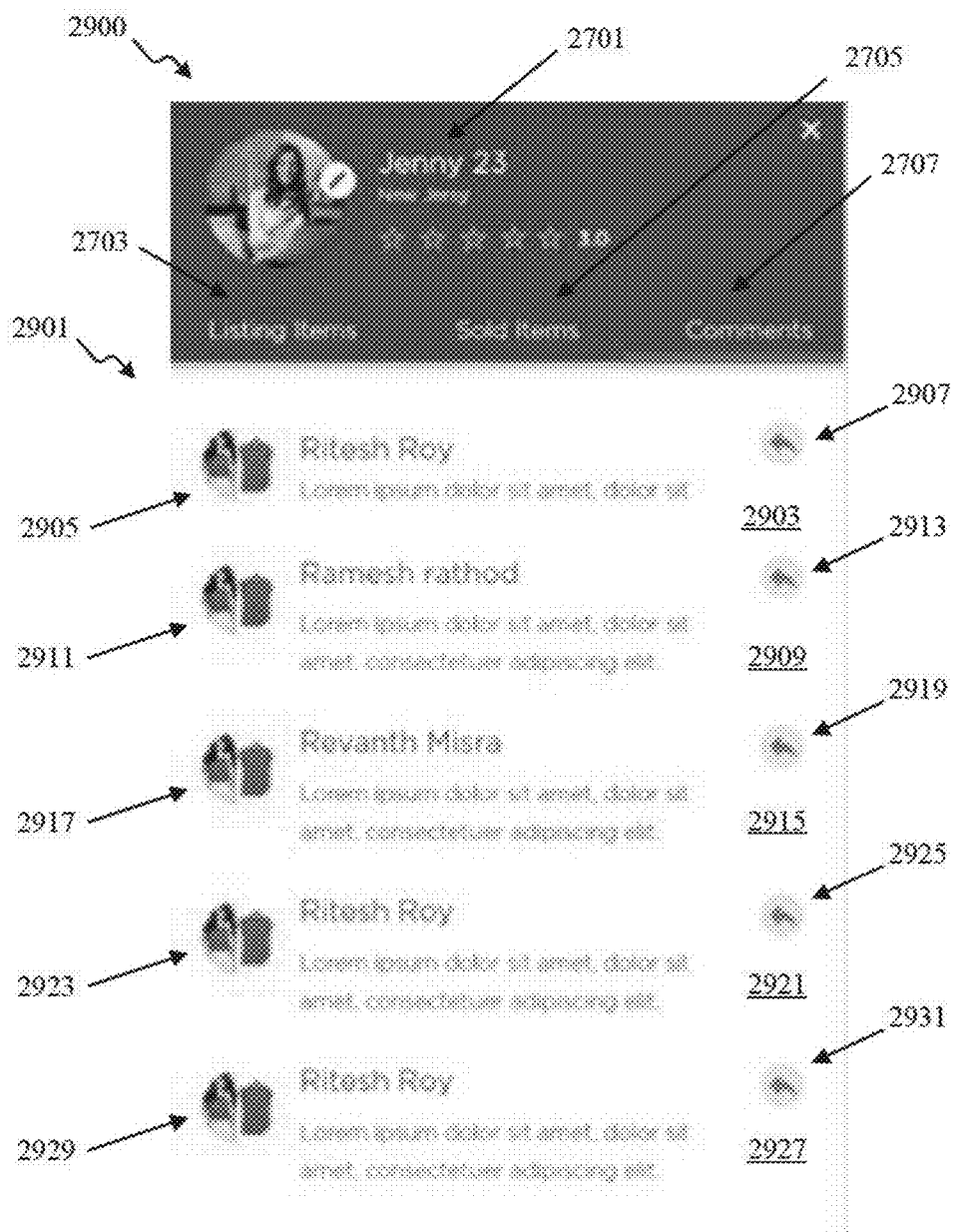
FIG. 29 illustrates a non-limiting, example user interface merchant comment display according to certain embodiments of this disclosure.

FIG. 29 illustrates a non-limiting, example user interface merchant comment display 2900 according to certain embodiments of this disclosure. The computing system 115, utilizing the at least one processor 205 executing one or more wearable article display operations, generates the user interface merchant comment display 2900 for display on a display screen. The user interface merchant comment display 2900 may display comments from purchaser or potential purchasers about a user of the user profile or one or more products that have been purchased or that may be purchased. As shown in FIG. 29, the user interface merchant product display 2900 includes a user profile information display section 2701, a listing of items selection button 2703, a listing of sold items selection button 2705, and a comments section selection button 2707. The user profile information display section 2701 may include an image of a user associated with the user profile, a user profile name, a user profile location, and an average customer rating of the user profile. The listing of items selection button 2703, when selected, may cause the computing system 115, performing one or more wearable article display operations, to generate a display of one or more wearable articles that are presented to potential purchasers for purchase. The listing of sold items selection button 2705, when selected, may cause the computing system 115, performing one or more wearable article display operations, to generate for display of one or more wearable articles that have been sold by a user associated with the user profile. The comments section selection button 2707, when selected, may cause the computing system 115, performing one or more wearable article display operations, to generate for display comments provided by purchasers or potential purchasers concerning the user of the user profile or wearable items sold by the user of the user profile.

As described herein, when the comments selection button 2707 is selected, the computing system 115 may generate for display comments provided by purchasers or potential purchasers concerning the user of the user profile or items sold by the user of the user profile. As shown in FIG. 29, the comments selection button 2707 is selected and one or more comments 2901 from purchaser or potential purchasers of products displayed for sale are displayed. For example, the one or more comments 2901 include a first comment 2903, a second comment 2909, a third comment 2915, and a fourth comment 2921, and a fifth comment 2927. Each of the one or more comments 2901 may include a comment body and a reply to comment selection button. For example, the first comment 2903 includes a comment body 2905 and a reply to comment selection button 2907. As another example, the second comment 2909 includes a comment body 2911 and a reply to comment selection button 2913. As yet another example, the third comment 2915 includes a comment body 2917 and a reply to comment selection button 2919. As another example, the fourth comment 2921 includes a comment body 2923 and a reply to comment selection button 2925. As yet another example, the fifth comment 2927 includes a comment body 2929 and a reply to comment selection button 2931.

Each of the comment bodies may include information concerning a respective comment. For example, each of the comments may include an image of the commenter, a name of the commenter, and a comment provided by the commenter. Each of the replay to comment selection buttons, when selected, may cause the computing system 115, performing one or more wearable article display operations, to generate another comment that directly replies to the associated comment and the associated commenter.

Figure 30:
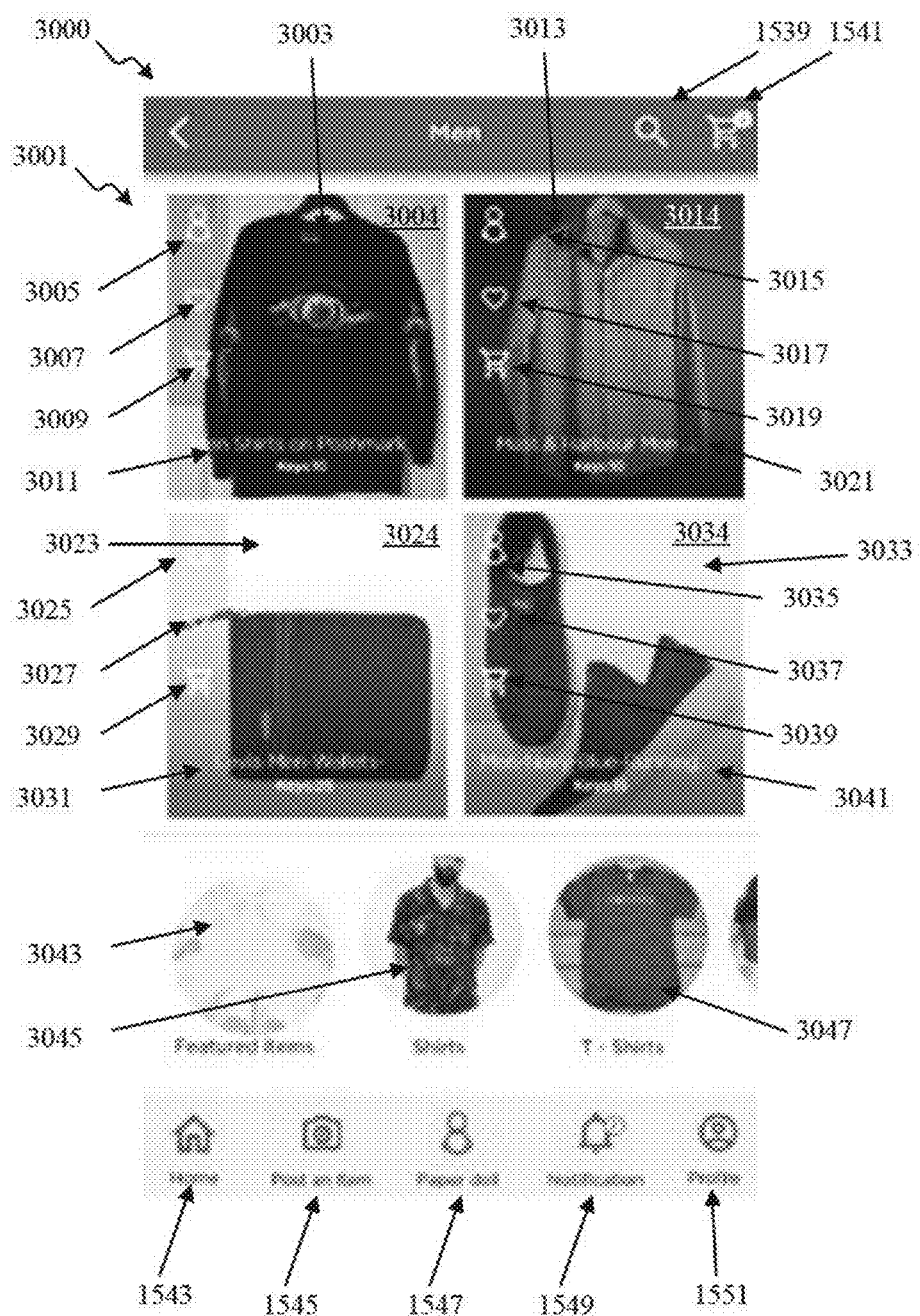
FIG. 30 illustrates a non-limiting, example user interface item display according to certain embodiments of this disclosure.

FIG. 30 illustrates a non-limiting, example user interface item display 3000 according to certain embodiments of this disclosure. The computing system 115, utilizing the at least one processor 205 executing one or more wearable article display operations, generates the user interface item display 3000 for display on a display screen. The user interface item display 1900 may be generated by the computing system 115 in response to receiving a selection of the men's wearable article search selection button 1510 illustrated in FIG. 15. As shown in FIG. 30, the user interface item display 3000 may display one or more wearable articles 3001 for viewing and selection by a user. For example, the one or more wearable articles 3001 may include a first wearable article 3003, a second wearable article 3013, a third wearable article 3023, and a fourth wearable article 3033. Each of the one or more wearable articles 3001 may include an image of the wearable article. For example, the first wearable article 3003 may include a first image 3004, the second wearable article 3013 may include a second image 3014, the third wearable article 3023 may include a third image 3024, and the fourth wearable article 3033 may include a fourth image 3034.

Each of the one or more wearable articles 3001 may include a paper doll selection button, a favorite selection button, an add to shopping cart selection button, and an information display section. For example, the first wearable article 3003 may include a paper doll selection button 3005, a favorite selection button 3007, an add to shopping cart selection button 3009, and an information display section 3011. The second wearable article 3013 may include a paper doll selection button 3015, a favorite selection button 3017, an add to shopping cart selection button 3019, and an information display section 3021. The third wearable article 3023 may include a paper doll selection button 3025, a favorite selection button 3027, an add to shopping cart selection button 3029, and an information display section 3031. The fourth wearable article 3033 may include a paper doll selection button 3035, a favorite selection button 3037, an add to shopping cart selection button 3039, and an information display section 3041.

Each of the paper doll selection buttons, when selected, may cause the computing system 115, performing one or more wearable article display operations, to transmit the image of the wearable article associated with the paper doll selection button to a paper doll display screen described herein. Each of the favorite selection buttons, when selected, may cause the computing system 115, performing one or more wearable article display operations, to store the wearable article associated with the favorite selection button to a list of selected favorite wearable articles. In certain embodiments, a selection of the favorite selection button may cause the computing system 115 to include the associated wearable article in the list of one or more selected wearable articles 807 of the user interface saved items display 800 illustrated in FIG. 8. Each of the shopping cart selection buttons, when selected, may cause the computing system 115, performing one or more wearable article display operations, to store the wearable article associated with the shopping cart selection button to a list of wearable articles that are selected for purchase. Each information display section may provide information associated with a wearable article. For example, an information display section may include a name of the wearable article, a source or designer of the wearable article, a size of the wearable article, or a price of the wearable article.

The computing system 115, utilizing the at least one processor 205 executing one or more wearable article display operations, receives a selection of a first wearable article of a first article type displayed on a display screen. For example, the computing system 115 may receive a selection of the paper doll selection button 3005 associated with the first wearable article 3003. The computing system 115 may also determine that the first wearable article 3003 is a shirt and is a wearable article of a first article type (e.g., a wearable article that is to be worn on a person's torso). Similarly, the computing system 115 may receive a selection of the paper doll selection button 3015 associated with the second wearable article 3013. The computing system 115 may also determine that the second wearable article 3013 is a shirt and is a wearable article of the first article type (e.g., a wearable article that is to be worn on a person's torso). As another example, the computing system 115 may receive a selection of the paper doll selection button 3025 associated with the third wearable article 3023. The computing system 115 may also determine that the third wearable article 3023 is a wallet and is a wearable article of a second article type (e.g., a wearable article that is held or carried in a pants pocket). As yet another example, the computing system 115 may receive a selection of the paper doll selection button 3035 associated with the fourth wearable article 3033. The computing system 115 may also determine that the fourth wearable article 3033 is a pair of shoes and is a wearable article of a third article type (e.g., a wearable article that is to be worn on a person's feet). Each of the article types may be used to place respective wearable articles at different location on a paper doll as described herein.

Additionally, or alternatively, a favorite selection button or an add to shopping cart selection button may be selected. Similar to selected a paper doll selection button, the computing system 115 may identify a wearable article associated with the selected favorite selection button or associated with the selected add to shopping cart selection button. The computing system 115 may then determine an article type associated with the identified wearable article.

In certain embodiments, the user interface item display 3000 may also include a featured items selection button. As shown in FIG. 30, the user interface item display 3000 includes a feature items selection button 3043. The feature items selection button 3043, when selected, may cause the computing system 115, performing one or more wearable article display operations, to generate for display only features items as the one or more wearable articles 3001.

Additionally, or alternatively, the user interface item display 3000 may also include category specific selection buttons. A selection of a category specific selection button causes the computing system 115, performing one or more wearable article display operations, to generate for display only wearable articles of a specific category as the one or more wearable articles 3001. As shown in FIG. 30, the user interface item display 3000 includes a button-down shirt category selection button 3045 and a t-shirt category selection button 3047. When a selection of the button-down shirt category selection button 3045 is received, the computing system 115, performing one or more wearable article display operations, may generate the one or more wearable articles 3001 containing only wearable articles that are button-down shirts. When a selection of the t-shirt category selection button 3047 is received, the computing system 115, performing one or more wearable article display operations, may generate the one or more wearable articles 1901 containing only wearable articles that are t-shirts. It should be understood that category specific selection buttons are not limited to only button-down shirts and t-shirts. In certain embodiments, category specific selection buttons may additionally, or alternatively, include pants, rain jackets, sweaters, pairs of socks, pairs stockings, shirts, blouses, coats, hats, sunglasses, bracelets, rings, earrings, undergarments, scarfs, leggings, swimsuits, robes, slippers, sandals, shawls, ties, cuff-links, belts, wallets, watches, or the like.

Figure 31:
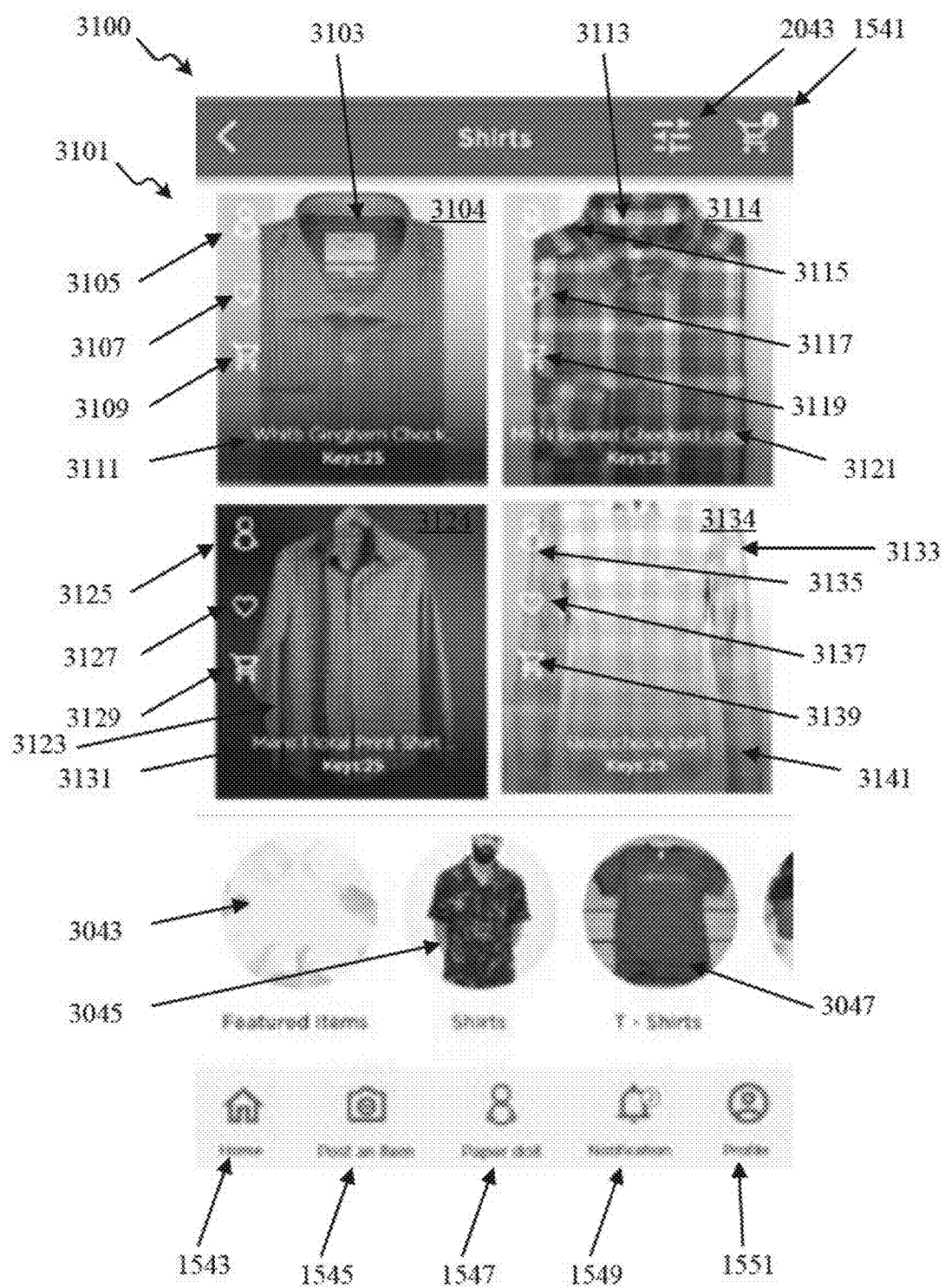
FIG. 31 illustrates a non-limiting, example user interface item display according to certain embodiments of this disclosure.

FIG. 31 illustrates a non-limiting, example user interface item display 3100 according to certain embodiments of this disclosure. The computing system 115, utilizing the at least one processor 205 executing one or more wearable article display operations, generates the user interface item display 3100 for display on a display screen. The user interface item display 3100 may be generated by the computing system 115 in response to receiving a selection of the button-down shirts category selection button 3145 illustrated in FIGS. 30 and 31. As shown in FIG. 31, the user interface item display 3100 may display one or more wearable articles 3101 for viewing and selection by a user. Because the button-down shirts category selection button 3147 has been selected, the one or more wearable articles 3101 may include only button-down shirts. For example, the one or more wearable articles 3101 may include a first button-down shirt 3103, a second button-down shirt 3113, a third button-down shirt 3123, and a fourth button-down shirt 3133. Each of the one or more wearable articles 3101 may include an image of the wearable article. For example, the first button-down shirt 3103 may include an image of the button-down shirt 3104, the second button-down shirt 3113 may include an image of the button-down shirt 3114, the third button-down shirt 3123 may include an image of the button-shirt 3124, and the fourth button-down shirt 3133 may include an image of the button-down shirt 3134.

Each of the one or more wearable articles 3101 may include a paper doll selection button, a favorite selection button, an add to shopping cart selection button, and an information display section. For example, the first button-down shirt 3103 may include a paper doll selection button 3105, a favorite selection button 3107, an add to shopping cart selection button 3109, and an information display section 3111. The second button-down shirt 3113 may include a paper doll selection button 3115, a favorite selection button 3117, an add to shopping cart selection button 3119, and an information display section 3121. The third button-down shirt 3123 may include a paper doll selection button 3125, a favorite selection button 3127, an add to shopping cart selection button 3129, and an information display section 3131. The fourth button-down shirt 3133 may include a paper doll selection button 3135, a favorite selection button 3137, an add to shopping cart selection button 3139, and an information display section 3141.

Each of the paper doll selection buttons, when selected, may cause the computing system 115, performing one or more wearable article display operations, to transmit the image of the wearable article associated with the paper doll selection button to a paper doll display screen described herein. Each of the favorite selection buttons, when selected, may cause the computing system 115, performing one or more wearable article display operations, to store the wearable article associated with the favorite selection button to a list of selected favorite wearable articles. In certain embodiments, a selection of the favorite selection button may cause the computing system 115 to include the associated wearable article in the list of one or more selected wearable articles 807 of the user interface saved items display 800 illustrated in FIG. 8. Each of the shopping cart selection buttons, when selected, may cause the computing system 115, performing one or more wearable article display operations, to store the wearable article associated with the shopping cart selection button to a list of wearable articles that are selected for purchase. Each information display section may provide information associated with a wearable article. For example, an information display section may include a name of the wearable article, a source or designer of the wearable article, a size of the wearable article, or a price of the wearable article.

The computing system 115, utilizing the at least one processor 205 executing one or more wearable article display operations, receives a selection of a first wearable article of a first article type displayed on a display screen. For example, the computing system 115 may receive a selection of the paper doll selection button 3105 associated with the first button-down shirt 3103. The computing system 115 may also determine that the first button-down shirt 3103 is a button-down shirt and is a wearable article of a first article type (e.g., a wearable article that is to be worn over a person's torso). Similarly, the computing system 115 may receive a selection of the paper doll selection button 3115 associated with the second button-down shirt 3113. The computing system 115 may also determine that the second button-down shirt 3113 is a button-down shirt and is a wearable article of the first article type (e.g., a wearable article that is to be worn over a person's torso). As another example, the computing system 115 may receive a selection of the paper doll selection button 3125 associated with the third button-down shirt 3123. The computing system 115 may also determine that the third button-down shirt 3123 is a button-down shirt and is a wearable article of the first article type (e.g., a wearable article that is to be worn over a person's torso). As yet another example, the computing system 115 may receive a selection of the paper doll selection button 3135 associated with the fourth button-down shirt 3133. The computing system 115 may also determine that the fourth button-down shirt 3133 is a button-down shirt and is a wearable article of the first article type (e.g., a wearable article that is to be worn over a person's torso). Each of the article types may be used to place respective wearable articles at different location on a paper doll as described herein. In certain embodiments, for example, when at least two of the one or more wearable articles 3101 have a same article type, only one of the two or more wearable articles having the same article type may be displayed on a paper doll, described herein, at any one time.

Figure 32:
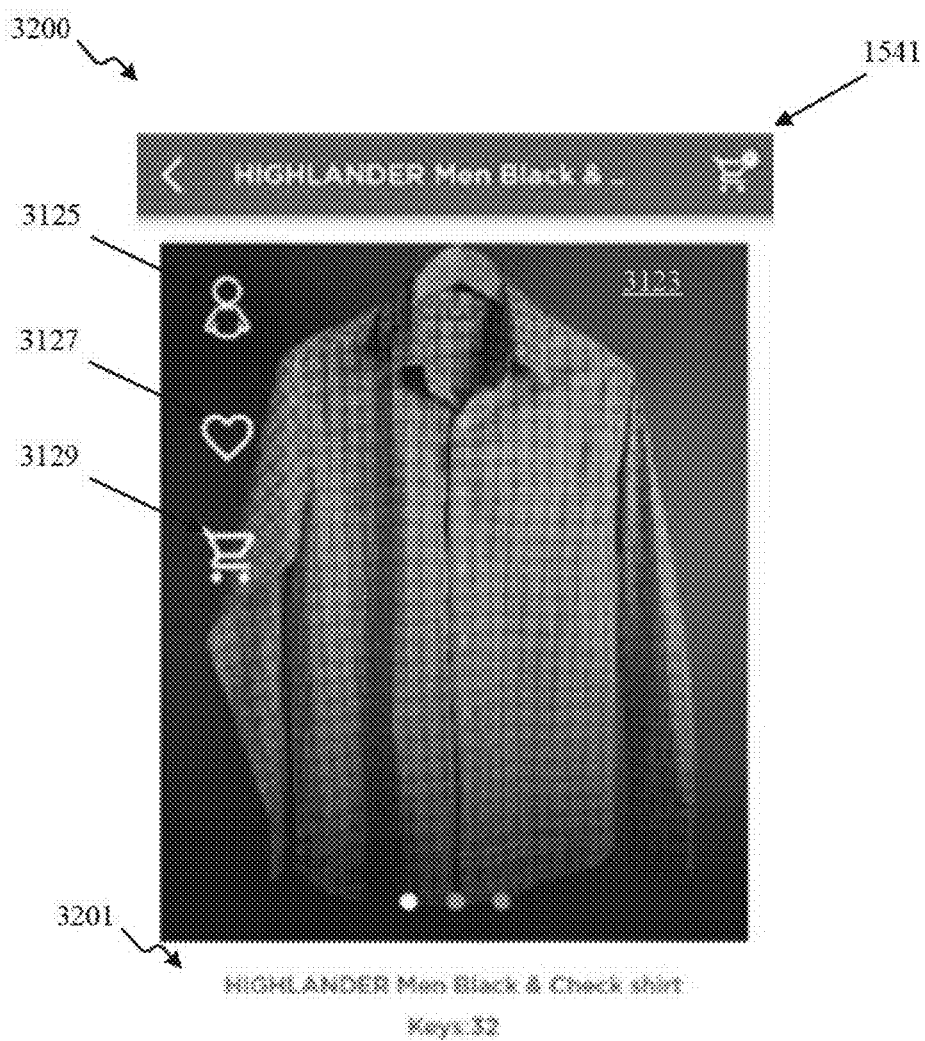
FIG. 32 illustrates a non-limiting, example user interface search sub-display according to certain embodiments of this disclosure.

FIG. 32 illustrates a non-limiting, example user interface search sub-display 3200 according to certain embodiments of this disclosure. The computing system 115, utilizing the at least one processor 205 executing one or more wearable article display operations, generates the user interface search sub-display 3200 for display on a display screen. The user interface search sub-display 3200 may be generated by the computing system 115 in response to receiving a selection on an image of a wearable article of the one or more wearable articles 3001 illustrated in FIG. 30 or the one or more wearable articles 3101 illustrated in FIG. 31. As shown in FIG. 32, the user interface search sub-display 3200 may include the wearable article 3113, an image of the wearable article 3114, a paper doll selection button 3115, a favorite selection button 3117, an add to shopping cart selection button 3119. Each of these features may perform one or more of the same or similar functions as described with respect to at least FIGS. 30 and 31 herein. In addition, the user interface search sub-display 3200 may also include an expanded information display section 3201 providing information concerning the wearable article 3113. As shown in FIG. 32, the expanded information display section 3201 includes a title or name of the wearable article, a source or designer of the wearable article, a price of the wearable article, a style of the wearable article, a condition of the wearable article, and a label of the wearable article.

Figure 33:
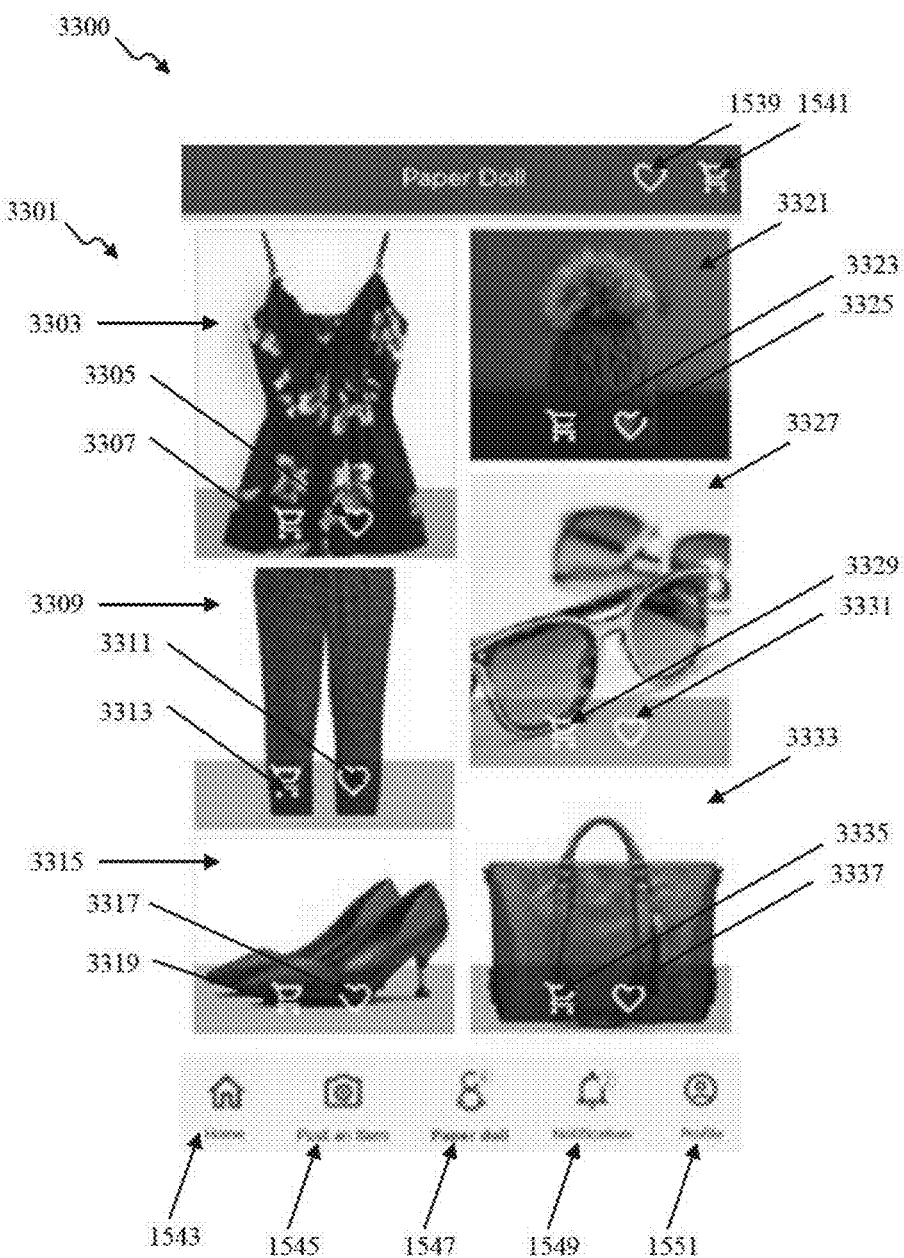
FIG. 33 illustrates a non-limiting, example user interface paper doll display according to certain embodiments of this disclosure.

FIG. 33 illustrates a non-limiting, example user interface paper doll display 3300 according to certain embodiments of this disclosure. The computing system 115, utilizing the at least one processor 205 executing one or more wearable article display operations, generates the user interface paper doll display 3300 for display on a display screen. The user interface paper doll display 3300 may be generated by the computing system 115 in response to receiving a selection of the paper doll selection button 1547 illustrated in FIGS. 15, 19, 20, 30, and 31. As shown in FIG. 33, the user interface paper doll display 3300 may display one or more wearable articles 3301 for viewing and selection by a user. For example, the one or more wearable articles 3301 may include a first wearable article 3303, a second wearable article 3309, a third wearable article 3315, a fourth wearable article 3321, a fifth wearable article 3327, and a sixth wearable article 3333. Each of the one or more wearable articles 3301 may include an image of the wearable article. Each of the one or more wearable articles 3301 may include a favorite selection button and an add to shopping cart selection button. For example, the first wearable article 3303 may include a favorite selection button 3305 and an add to shopping cart selection button 3307. The second wearable article 3309 may include a favorite selection button 3311 and an add to shopping cart selection button 3313. The third wearable article 3315 may include a favorite selection button 3317 and an add to shopping cart selection button 3319. The fourth wearable article 3321 may include a favorite selection button 3323 and an add to shopping cart selection button 3325. The fifth wearable article 3327 may include a favorite selection button 3329 and an add to shopping cart selection button 3331. The sixth wearable article 3333 may include a favorite selection button 3335 and an add to shopping cart selection button 3337. Each of the favorite selection buttons and the add to shopping cart selection button may function in a same or similar manner as other favorite selection buttons and as other add to shopping cart selection buttons described herein.

The computing system 115, utilizing the at least one processor 205 executing one or more wearable article display operations, identifies one or more additional wearable articles each having a different article type from a first article of a first selected wearable article. For example, the computing system 115 may have received a selection of a wearable article after a receiving search criteria and generating a list of wearable articles based on the search criteria as described with respect to at least FIGS. 19, 20, 21, 22, 23, 30, 31, and 32. The computing system 115 may have also determined that the selected wearable article has a first wearable article type (e.g., a wearable article that is to be worn on a particular location of a person's body). After determining that the selected wearable article has the first wearable article type, the computing system 115 may identify one or more additional wearable articles that each have a different wearable article type from the first wearable article type (e.g., a wearable article that is to be worn on a particular location of a person's body that is different from the location where the first wearable article is to be worn on a person's body).

The computing system 115, utilizing the at least one processor 205 executing one or more wearable article display operations, generate for display on a display screen a second wearable article of a second article type from the one or more additional wearable articles based on at least one preference of the one or more preferences. For example, the computing system 115 may have previous received one or more preferences of wearable articles from a user. The computing system 115 may have received one or more preferences from the user as a result of receiving one or more search criteria as described with respect to at least FIGS. 19, 20, 21, 22, 23, 30, 31, and 32. The search criteria may include a particular style, color scheme, utility, condition, price range, or the like. One or more wearable articles that may have been identified by the computing system 115 based on received search criteria may be used the computing system 115 to infer one or more preferences including a particular style, color scheme, utility, condition, price range, or the like. The computing system 115 may have received one or more preferences from the user as a result of receiving a selection of a rating selection button as described with respect to at least FIG. 5. One or more wearable articles that may have received a favorable rating or may not have received an unfavorable rating may be used the computing system 115 to infer one or more preferences including a particular style, color scheme, utility, condition, price range, or the like. In certain embodiments, the computing system 115 may have generated for display a preference display including one or more fields or selection buttons to receive one or more preferences. The computing system 115, performing one or more wearable article display operations, may identify one or more additional wearable articles based on at least one preference of the received one or more preferences.

After or while identifying one or more additional wearable articles, the computing system 115 may determine the wearable article types for each of the one or more additional wearable articles. Subsequently, the computing system 115 may compare each of the wearable article types for each of the one or more wearable articles with the wearable article type of the first selected wearable article. The computing system 115 may generate for display at least one wearable article from the one or more additional wearable articles that have an article type that is different from or does not match with the wearable article type of first selected wearable article. For example, as shown in FIG. 33, the computing system 115, performing one or more wearable article display operations generates the user interface paper doll display 3300. The computing system 115 may have previously received a selection of the first wearable article 3303 in this case a woman's top or shirt after displaying search results based on a search criteria. The computing system 115 may also determine that a first article type of the first wearable article 3303 (e.g., that the first wearable article is to be worn on a person's torso). In addition, the computing system 115, performing one or more wearable article display operations, may have received one or more preferences of wearable articles including a particular style, color scheme, utility, condition, price range, or the like using one or more processes described herein.

The computing system 115, performing one or more wearable article display operations, may have identified one or more additional wearable articles that each have a different article type from the first article type and that are each based on the one or more preferences. For example, the identified one or more additional wearable articles may be worn on a different portion of a human body than the first selected wearable article while satisfying the one or more preferences. After identifying the one or more additional wearable articles, the computing system 115, performing one or more wearable article display operations, may display the second wearable article 3309 in this case a pair of pants, a third wearable article 3315 in this case a pair of shoes, a fourth wearable article 3321 in this case a hat, a fifth wearable article 3327 in this case sunglasses, and a sixth wearable article 3333 in this case a purse. Each of the first wearable article 3303, the second wearable article 3309, the third wearable article 3315, the fourth wearable article 3321, the fifth wearable article 3327, and the sixth wearable article 3333 are worn on different parts or portions of the human body and thus have different article types. In certain embodiments, the first wearable article 3303 may be displayed in the user interface paper doll display 3300 with the second wearable article 3309, the third wearable article 3315, the fourth wearable article 3321, the fifth wearable article 3327, and the sixth wearable article 3333. In certain embodiments, only at least one of the second wearable article 3309, the third wearable article 3315, the fourth wearable article 3321, the fifth wearable article 3327, and the sixth wearable article 3333. By displaying one or more wearable articles that each have a different article type while also each being based on one or more preferences, a user viewing the user interface paper doll display 3300 may easily determine whether two or more wearable articles may fashionably coordinate with each other as part of a single outfit.

In certain embodiments, the computing system 115, performing one or more wearable article display operations, may identify each of the wearable articles types for each of the identified one or more additional wearable articles and arrange each of the identified one or more additional wearable articles on a display screen based on each of the respective wearable article types. For example, as shown in FIG. 33, the first wearable article 3303 in this case a top may be positioned on the user interface paper doll display 3300 at a section closer to the top of the user interface paper doll display 3300 because the top may be worn on the torso of the human body which is on a top portion of the human body. As another example, the second wearable article 3309 in this case a pair of pants may be positioned on the user interface paper doll display 3300 at a section closer to the bottom of the user interface paper doll display 3300 because the pants may be worn on around the waste and over the legs of the human body which is on a lower portion of the human body. As another example, the third wearable article 3315 in this case a pair of shoes may be positioned on the user interface paper doll display 3300 at a section closer to the bottom of the user interface paper doll display 3300 because the shoes may be worn on the feet of the human body which is on a lower portion of the human body. As yet another example, the fourth wearable article 3321 in this case a hat may be positioned on the user interface paper doll display 3300 at a section closer to the top of the user interface paper doll display 3300 because the hat may be worn on the head of the human body which is on a top portion of the human body. As another example, the fifth wearable article 3327 in this case sunglasses may be positioned on the user interface paper doll display 3300 at a section closer to the top of the user interface paper doll display 3300 because the sunglasses may be worn on the face or on the head of the human body which is on a top portion of the human body. As yet another example, the sixth wearable article 3333 in this case a purse may be positioned on the user interface paper doll display 3300 at a section closer to the bottom of the user interface paper doll display 3300 because the purse may be carried in a hand of the human body and may be positioned with respect to the human body at a lower portion of the human body.

In certain embodiments, two or more wearable articles may positioned on the user interface paper doll display 3300 based on relative wearable article types for each of the two or more wearable articles. For example, as shown in FIG. 33, the first wearable article 3303 in this case a top may be positioned on the user interface paper doll display 3300 at a section closer to the top of the user interface paper doll display 3300 relative to the positioned on the user interface paper doll display 3300 of the second wearable article 3309 in this case a pair of pants because the top may be worn on the torso of the human body which is higher than the waste and legs of the human body while the pants may be worn on around the waste and over the legs of the human body. Similarly, the second wearable article 3309 in this case pants may be positioned on the user interface paper doll display 3300 at a section closer to the top of the user interface paper doll display 3300 relative to the positioned on the user interface paper doll display 3300 of the third wearable article 3315 in this case a pair of shoes because the pants may be worn on around the waste on over the legs of the human body which is higher than the feet of the human body while the shoes may be worn on the feet of the human body. Placing wearable articles on the user interface paper doll display 3300 in an arrange as worn by a human being may allow a user view the paper doll to better visualize how two or more wearable article may look together when worn.

Figure 34:
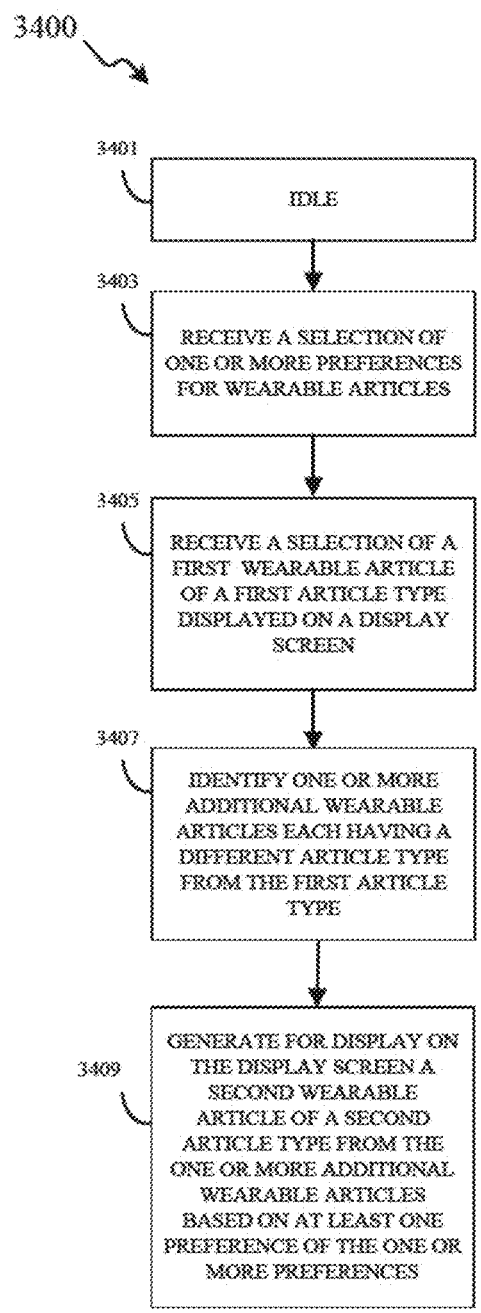
FIGS. 34-38 illustrate flow diagrams of methods for wearable article display operations according to certain embodiments of the disclosure.

FIG. 34 illustrates a method 3400 implemented by the computing system 115 of an electronic device 110, utilizing the at least one processor 205, for performing one or more wearable article display operations according to certain embodiments of this disclosure. Although certain details will be provided with reference to the method 3400 of FIG. 34, it should be understood that other embodiments may include more, less, or different method steps. At step 3401, the computing system 115 is in an idle state at least with respect to performing one or more wearable article display operations. At step 3403, the computing system 115 of an electronic device 110 receives a selection of one or more preferences for wearable articles. For example, the computing system 115 may have previous received one or more preferences of wearable articles from a user. The computing system 115 may have received one or more preferences from the user as a result of receiving one or more search criteria as described with respect to at least FIGS. 19, 20, 21, 22, 23, 30, 31, and 32. The search criteria may include a particular style, color scheme, utility, condition, price range, or the like. One or more wearable articles that may have been identified by the computing system 115 based on received search criteria may be used the computing system 115 to infer one or more preferences including a particular style, color scheme, utility, condition, price range, or the like. The computing system 115 may have received one or more preferences from the user as a result of receiving a selection of a rating selection button as described with respect to at least FIG. 5. One or more wearable articles that may have received a favorable rating or may not have received an unfavorable rating may be used the computing system 115 to infer one or more preferences including a particular style, color scheme, utility, condition, price range, or the like. In certain embodiments, the computing system 115 may have generated for display a preference display including one or more fields or selection buttons to receive one or more preferences and to subsequently identify one or more additional wearable articles based on the received one or more preferences.

At step 3405, the computing system 115 receives a selection of a first wearable article of a first article type displayed on a display screen. For example, the computing system 115 may have received a selection of a first wearable article after a receiving search criteria and generating a list of wearable articles based on the search criteria as described with respect to at least FIGS. 19, 20, 21, 22, 23, 30, 31, and 32. The computing system 115 may have also determined that the selected first wearable article has a first wearable article type (e.g., a wearable article that is to be worn on a particular location of a person's body) based on a description or a name of the first selected wearable article. In certain embodiments, the selected first wearable article may include at least one of a pair of shoes, a pair of pants, a rain jacket, a sweater, a pair of socks, a pair stockings, a shirt, a blouse, a coat, a hat, a pair of sunglasses, a bracelet, a ring, a pair of earrings, an undergarment, a scarf, a pair of leggings, a swimsuit, a robe, a pair of slippers, a pair of sandals, a clutch, a shawl, a purse, a handbag, a tie, a pair of cuff-links, a belt, a wallet, a watch, or the like.

At step 3407, the computing system 115 identifies one or more additional wearable articles each having a different article type from the first wearable article type of the first selected wearable article. In certain embodiments, the identified one or more additional wearable articles may be worn on a different portion of a human body than the first selected wearable article while satisfying the one or more preferences. For example, the first wearable article 3303 may be top or a shirt. The one or more additional wearable articles may include second wearable article 3309 such as a pair of pants, a third wearable article 3315 such as a pair of shoes, a fourth wearable article 3321 such as a hat, a fifth wearable article 3327 such as sunglasses, and a sixth wearable article 3333 such as a purse. Each of the first wearable article 3303, the second wearable article 3309, the third wearable article 3315, the fourth wearable article 3321, the fifth wearable article 3327, and the sixth wearable article 3333 are worn on different parts or portions of the human body and thus have different wearable article types.

At step 3409, the computing system 115 generates for display on a display screen a second wearable article of a second article type from the one or more additional wearable articles based on at least one preference of the one or more preferences. For example, the second wearable article may be a pair of pants and thus may be positioned on a user interface paper doll display 3300 at a section closer to the bottom of the user interface paper doll display 3300 because the pants may be worn on around the waste and over the legs of the human body which is on a lower portion of the human body. As another example, the second wearable article may be a pair of sunglasses and thus may be positioned on a user interface paper doll display 3300 at a section closer to the bottom of the user interface paper doll display 3300 because the pants may be worn on around the waste and over the legs of the human body which is on a lower portion of the human body.

As described herein, the second wearable article may be identified and displayed based on at least one preferences of one or more received preferences. For example, the computing system 115 may have previous received one or more preferences of wearable articles from a user. The computing system 115 may have received one or more preferences from the user as a result of receiving one or more search criteria as described with respect to at least FIGS. 19, 20, 21, 22, 23, 30, 31, and 32. The search criteria may include a particular style, color scheme, utility, condition, price range, or the like. One or more wearable articles that may have been identified by the computing system 115 based on received search criteria may be used the computing system 115 to infer one or more preferences including a particular style, color scheme, utility, condition, price range, or the like. The computing system 115 may have received one or more preferences from the user as a result of receiving a selection of a rating selection button as described with respect to at least FIG. 5. One or more wearable articles that may have received a favorable rating or may not have received an unfavorable rating may be used the computing system 115 to infer one or more preferences including a particular style, color scheme, utility, condition, price range, or the like. In certain embodiments, the computing system 115 may have generated for display a preference display including one or more fields or selection buttons to receive one or more preferences. The computing system 115, performing one or more wearable article display operations, may identify for display one or more additional wearable articles based on at least one preference of the one or more received preferences.

Figure 35:
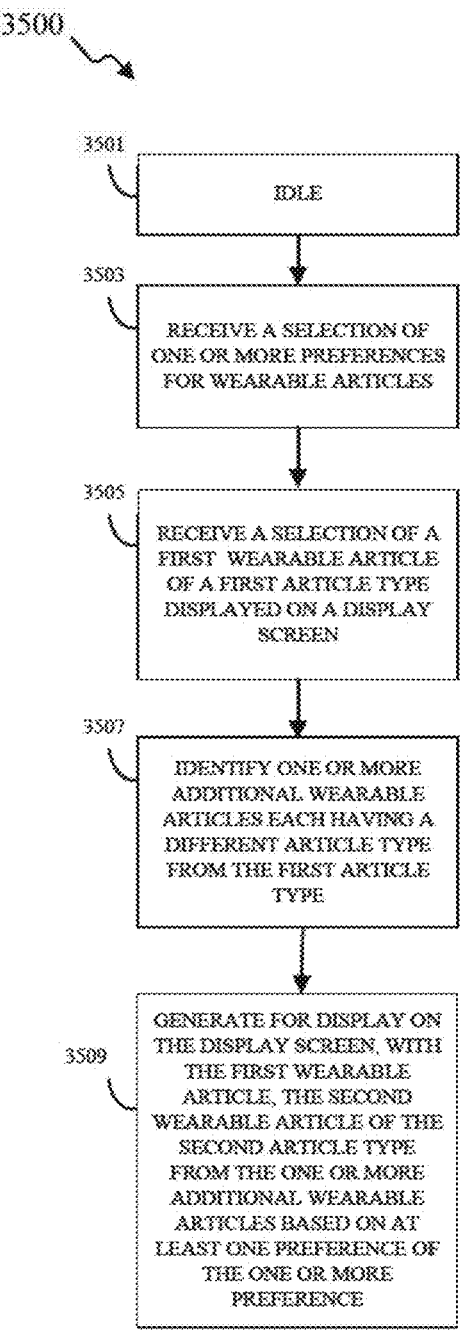

FIG. 35 illustrates a method 3400 implemented by a computing system 115 of an electronic device 110, utilizing at least one processor 205, for performing one or more wearable article display operations according to certain embodiments of this disclosure. Although certain details will be provided with reference to the method 3500 of FIG. 35, it should be understood that other embodiments may include more, less, or different method steps. At step 3501, the computing system 115 is in an idle state at least with respect to performing one or more interactive gaming operations. Step 3501 is at least similar to step 3401 of method 3400 illustrated in FIG. 34. At step 3503, the computing system 115 of an electronic device 110 receives a selection of one or more preferences for wearable articles. Step 3503 is at least similar to step 3403 of method 3400 illustrated in FIG. 34. At step 3505, the computing system 115 receives a selection of a first wearable article of a first article type displayed on a display screen. Step 3505 is at least similar to step 3405 of method 3400 illustrated in FIG. 34. At step 3507, the computing system 115 identifies one or more additional wearable articles each having a different article type from the first wearable article type of the first selected wearable article. Step 3507 is at least similar to step 3407 of method 3400 illustrated in FIG. 34. At step 3509, the computing system 115 generates for display on a display screen, with the first wearable article, a second wearable article of a second article type from the one or more additional wearable articles based on at least one preference of the one or more preferences. Step 3509 is at least similar to step 3409 of method 3400 illustrated in FIG. 34.

Figure 36:
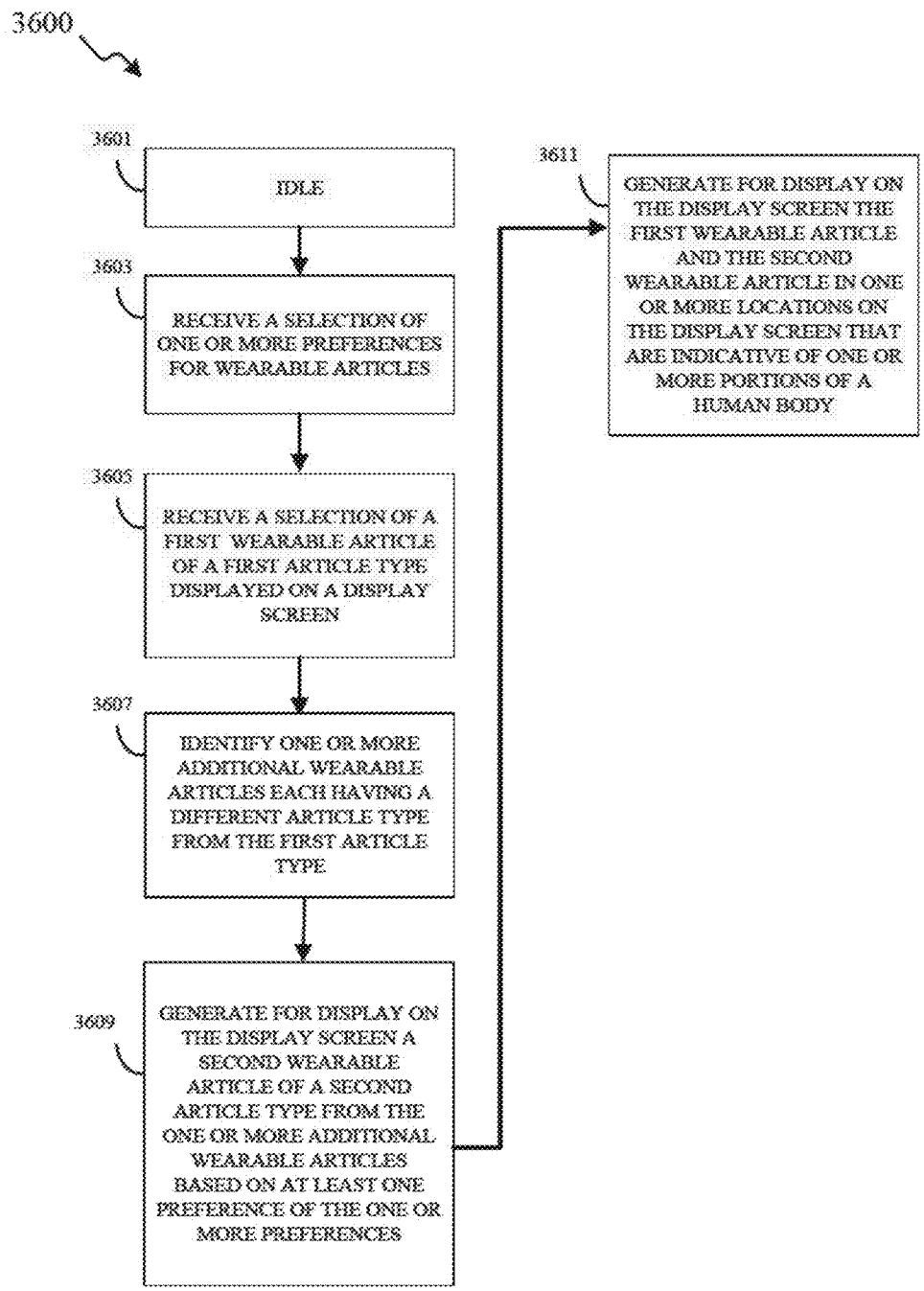

FIG. 36 illustrates a method 3600 implemented by a computing system 115, utilizing at least one processor 205, for performing one or more wearable article display operations according to certain embodiments of this disclosure. Although certain details will be provided with reference to the method 3600 of FIG. 36, it should be understood that other embodiments may include more, less, or different method steps. At step 3601, the computing system 115 is in an idle state at least with respect to performing one or more interactive gaming operations. Step 3601 is at least similar to step 3401 of method 3400 illustrated in FIG. 34. At step 3603, the computing system 115 of an electronic device 110 receives a selection of one or more preferences for wearable articles. Step 3603 is at least similar to step 3403 of method

3400 illustrated in FIG. 34. At step 3605, the computing system 115 receives a selection of a first wearable article of a first article type displayed on a display screen. Step 3605 is at least similar to step 3405 of method 3400 illustrated in FIG. 34. At step 3607, the computing system 115 identifies one or more additional wearable articles each having a different article type from the first wearable article type of the first selected wearable article. Step 3607 is at least similar to step 3407 of method 3400 illustrated in FIG. 34. At step 3609, the computing system 115 generates for display on a display screen a second wearable article of a second article type from the one or more additional wearable articles based on at least one preference of the one or more preferences. Step 3609 is at least similar to step 3409 of method 3400 illustrated in FIG. 34.

At step 3611, the computing system 115 generates for display on the display screen the first wearable article and the second wearable in one or more locations on the display screen that are indicative of one or more portions of a human body. For example, as shown in FIG. 33, the first wearable article 3303 such as a top may be positioned on the user interface paper doll display 3300 at a section closer to the top of the user interface paper doll display 3300 because the top may be worn on the torso of the human body which is on a top portion of the human body. Further, the second wearable article 3309 such as a pair of pants may be positioned on the user interface paper doll display 3300 at a section closer to the bottom of the user interface paper doll display 3300 because the pants may be worn on around the waste and over the legs of the human body which is on a lower portion of the human body. In addition, a third wearable article 3315 such as a pair of shoes may be positioned on the user interface paper doll display 3300 at a section closer to the bottom of the user interface paper doll display 3300 because the shoes may be worn on the feet of the human body which is on a lower portion of the human body.

In certain embodiments, two or more wearable articles may positioned on the user interface paper doll display 3300 based on relative wearable article types for each of the two or more wearable articles. For example, as shown in FIG. 33, the first wearable article 3303 such as a top may be positioned on the user interface paper doll display 3300 at a section closer to the top of the user interface paper doll display 3300 relative to the positioned on the user interface paper doll display 3300 of the second wearable article 3309 such as a pair of pants because the top may be worn on the torso of the human body which is higher than the waste and legs of the human body while the pants may be worn on around the waste and over the legs of the human body. Similarly, the second wearable article 3309 such as a pair of pants may be positioned on the user interface paper doll display 3300 at a section closer to the top of the user interface paper doll display 3300 relative to the positioned on the user interface paper doll display 3300 of the third wearable article 3315 such as a pair of shoes because the pants may be worn on around the waste on over the legs of the human body which is higher on the human body than the feet while the shoes may be worn on the feet. Placing wearable articles on the user interface paper doll display 3300 in an arrange as worn by a human being may allow a user view the paper doll to better visualize how two or more wearable article may look together when worn.

Figure 37:
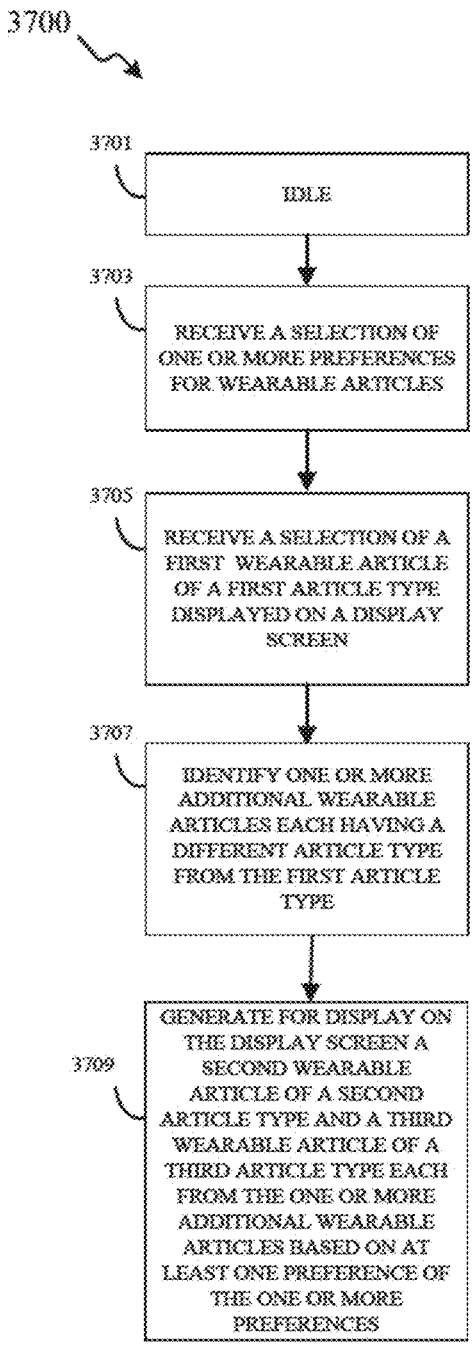

FIG. 37 illustrates a method 3700 implemented by a computing system 115, utilizing at least one processor 205, for performing one or more wearable article display operations according to certain embodiments of this disclosure. Although certain details will be provided with reference to the method 3700 of FIG. 37, it should be understood that other embodiments may include more, less, or different method steps. At step 3701, the computing system 115 is in an idle state at least with respect to performing one or more interactive gaming operations. Step 3701 is at least similar to step 3401 of method 3400 illustrated in FIG. 34. At step 3703, the computing system 115 of an electronic device 110 receives a selection of one or more preferences for wearable articles. Step 3703 is at least similar to step 3403 of method 3400 illustrated in FIG. 34. At step 3705, the computing system 115 receives a selection of a first wearable article of a first article type displayed on a display screen. Step 3705 is at least similar to step 3405 of method 3400 illustrated in FIG. 34. At step 3707, the computing system 115 identifies one or more additional wearable articles each having a different article type from the first wearable article type of the first selected wearable article. Step 3707 is at least similar to step 3407 of method 3400 illustrated in FIG. 34. At step 3709, the computing system 115 generates for display on a display screen a second wearable article of a second article type and a third wearable article of a third article type from the one or more additional wearable articles based on at least one preference of the one or more preferences. Step 3709 is at least similar to step 3409 of method 3400 illustrated in FIG. 34.

Figure 38:
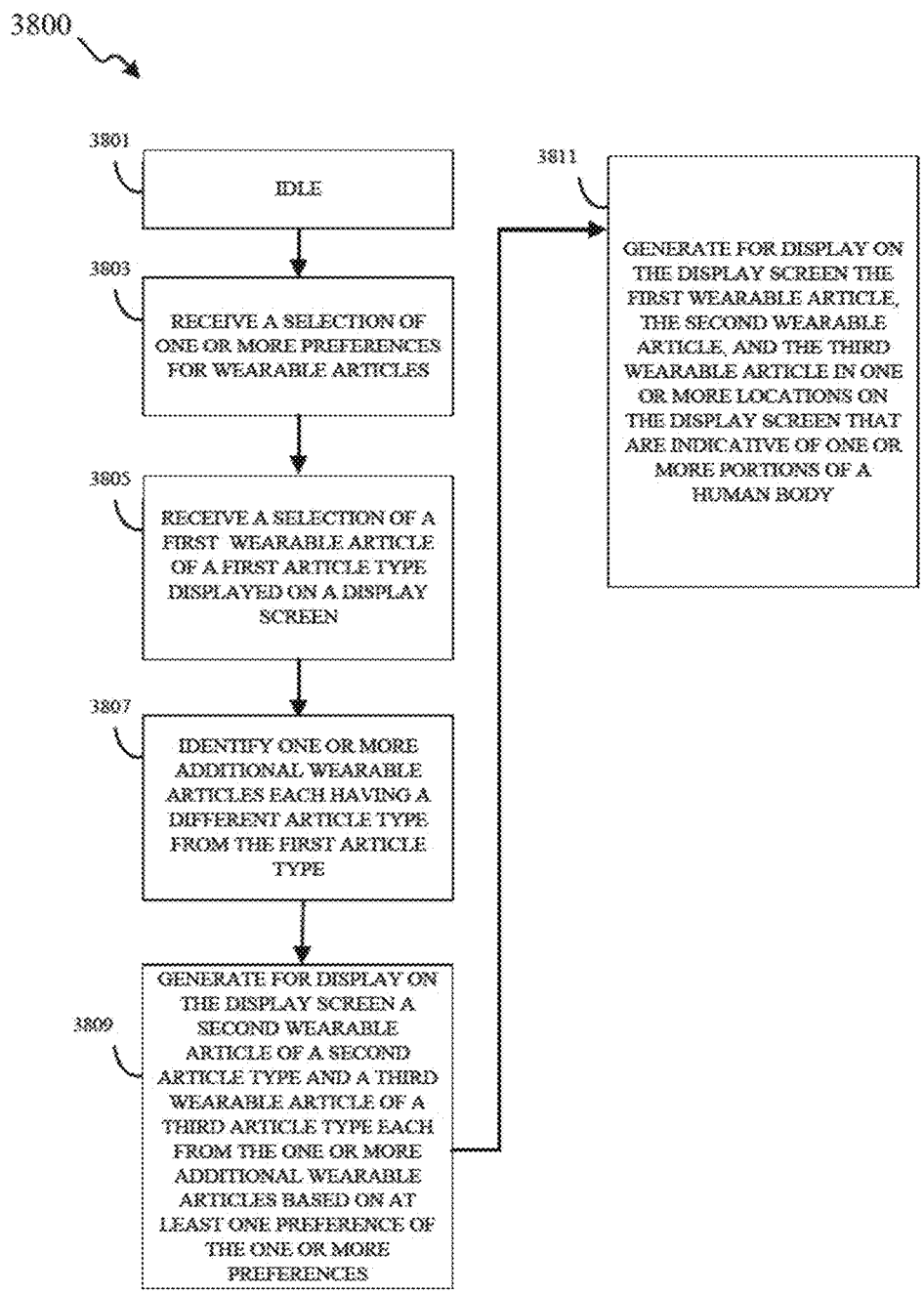

FIG. 38 illustrates a method 3800 implemented by a computing system 115, utilizing at least one processor 205, for performing one or more wearable article display operations according to certain embodiments of this disclosure. Although certain details will be provided with reference to the method 3800 of FIG. 38, it should be understood that other embodiments may include more, less, or different method steps. At step 3801, the computing system 115 is in an idle state at least with respect to performing one or more interactive gaming operations. Step 3801 is at least similar to step 3401 of method 3400 illustrated in FIG. 34. At step 3803, the computing system 115 of an electronic device 110 receives a selection of one or more preferences for wearable articles. Step 3803 is at least similar to step 3403 of method 3400 illustrated in FIG. 34. At step 3805, the computing system 115 receives a selection of a first wearable article of a first article type displayed on a display screen. Step 3805 is at least similar to step 3405 of method 3400 illustrated in FIG. 34. At step 3807, the computing system 115 identifies one or more additional wearable articles each having a different article type from the first wearable article type of the first selected wearable article. Step 3807 is at least similar to step 3407 of method 3400 illustrated in FIG. 34. At step 3809, the computing system 115 generates for display on a display screen a second wearable article of a second article type and a third wearable article of a third article type from the one or more additional wearable articles based on at least one preference of the one or more preferences. Step 3809 is at least similar to step 3709 of method 3700 illustrated in FIG. 37. At step 3811, the computing system 115 generates for display on a display screen the first wearable article, the second wearable article, and the third wearable article in one or more locations on the display screen that are indicative of one or more portions of a human body. Step 3811 is at least similar to step 3611 of method 3600 illustrated in FIG. 36.

Figure 39:
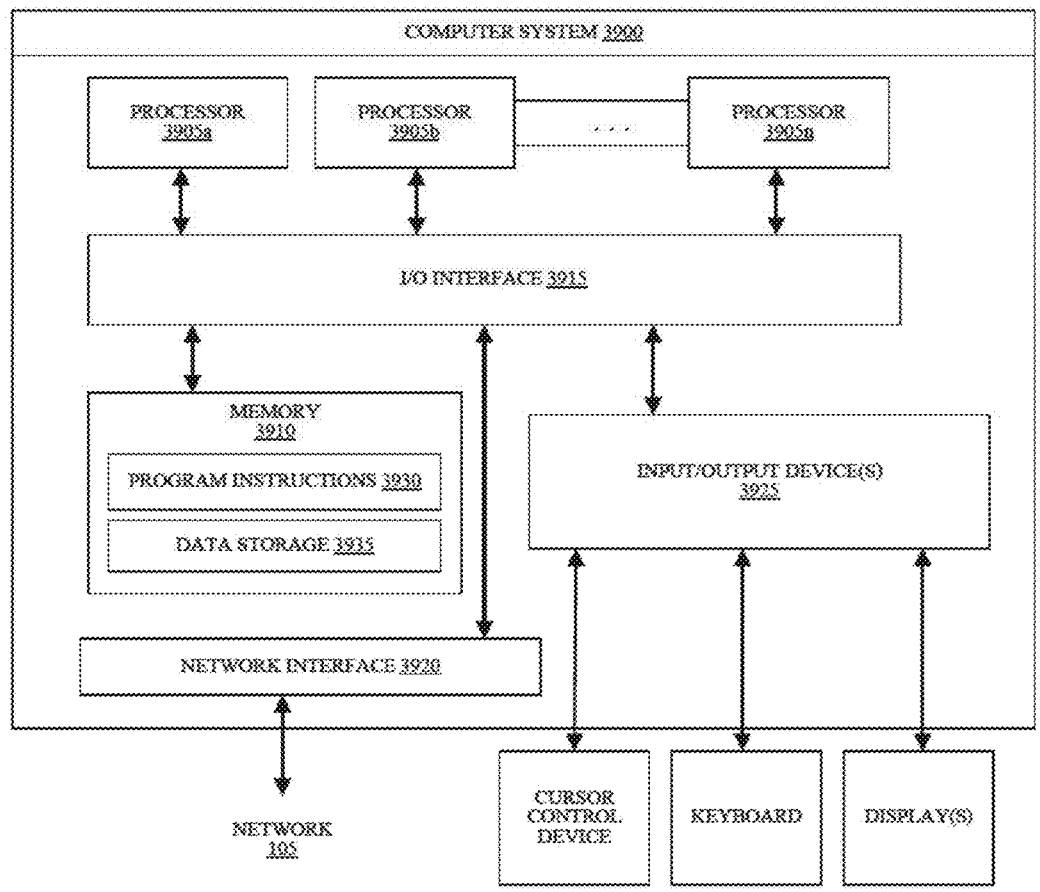
FIG. 39 illustrates a non-limiting, example computer system configured to implement aspects of apparatuses, systems, and methods according to certain embodiments of this disclosure.

FIG. 39 illustrates a non-limiting, example computer system 3900 configured to implement systems and methods for performing one or more interactive gaming operations according to certain embodiments of this disclosure. FIG. 39 illustrates a computer system 3900 that is configured to execute any and all of the embodiments described herein. In certain embodiments, the computer system 3900 describes at least some of the components of electronic device 110 or the computing system 115 illustrated in FIGS. 1 and 2. In different embodiments, the computer system 3900 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 301 of a handset), an application server, a storage device, a television, a peripheral device such as a switch, modem, router, or in general any type of computing or electronic device.

Various embodiments of a system and method for display wearable articles, as described herein, may be executed on one or more computer systems 3900, which may interact with various other devices. In the illustrated embodiment, the computer system 3900 includes one or more processors 3905 coupled to a system memory 3910 via an input/output (I/O) interface 3915. The computer system 3900 further includes a network interface 3920 coupled to I/O interface 3915, and one or more input/output devices 3925, such as cursor control device, keyboard, and display(s). In some cases, it is contemplated that embodiments may be implemented using a single instance of computer system 3900, while in other embodiments multiple such systems, or multiple nodes making up computer system 3900, may be configured to host different portions or instances of embodiments. For example, in one embodiment some elements may be implemented via one or more nodes of computer system 3900 that are distinct from those nodes implementing other elements.

In various embodiments, computer system 3900 may be a uniprocessor system including one processor 3905a, or a multiprocessor system including several processors 3905a-3905n (e.g., two, four, eight, or another suitable number). The processors 3905 may be any suitable processor capable of executing instructions. For example, in various embodiments the processors 3905 may be general-purpose or embedded processors implementing any of a variety of instruction set architectures (ISAs), such as the x86, PowerPC, SPARC, or MIPS ISAs, or any other suitable ISA. In multiprocessor systems, each of processors 3905 may commonly, but not necessarily, implement the same ISA.

The system memory 3910 may be configured to store the program instructions 3930 and/or existing state information and ownership transition condition data in the data storage 3935 accessible by the processor 3905. In various embodiments, the system memory 3910 may be implemented using any suitable memory technology, such as static random access memory (SRAM), synchronous dynamic RAM (SDRAM), nonvolatile/Flash-type memory, or any other type of memory. In the illustrated embodiment, the program instructions 3930 may be configured to implement a system for performing one or more wearable article display operations incorporating any of the functionality, as described herein. In some embodiments, program instructions and/or data may be received, sent, or stored upon different types of computer-accessible media or on similar media separate from the system memory 3910 or the computer system 3900. The computer system 3900 is described as implementing at least some of the functionality of functional blocks of previous Figures.

In one embodiment, the I/O interface 3915 may be configured to coordinate I/O traffic between the processor 3905, the system memory 3910, and any peripheral devices in the device, including the network interface 3920 or other peripheral interfaces, such as the input/output devices 3925. In some embodiments, the I/O interface 3915 may perform any necessary protocol, timing or other data transformations to convert data signals from one component (e.g., the system memory 3910) into a format suitable for use by another component (e.g., the processor 3905). In some embodiments, the I/O interface 3915 may include support for devices attached through various types of peripheral buses, such as a variant of the Peripheral Component Interconnect (PCI) bus standard or the Universal Serial Bus (USB) standard, for example. In some embodiments, the function of the I/O interface 3915 may be split into two or more separate components, such as a north bridge and a south bridge, for example. Also, in some embodiments some or all of the functionality of the I/O interface 3915, such as an interface to the system memory 3910, may be incorporated directly into the processor 3905.

The network interface 3920 may be configured to allow data to be exchanged between the computer system 3900 and other devices attached to the network 105 or between nodes of the computer system 3900. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 3920 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 3925 may, in some embodiments, include one or more display terminals, keyboards, keypads, touchpads, scanning devices, voice, or optical recognition devices, or any other devices suitable for entering or accessing data by one or more the computer systems 3900. Further, various other sensors may be included in the I/O devices 3925, such as imaging sensors, barometers, altimeters, LIDAR, or any suitable environmental sensor. Multiple input/output devices 3925 may be present in the computer system 3900 or may be distributed on various nodes of the computer system 3900. In some embodiments, similar input/output devices may be separate from the computer system 3900 and may interact with one or more nodes of the computer system 3900 through a wired or wireless connection, such as over the network interface 3920.

As shown in FIG. 39, the memory 3910 may include program instructions 3930, which may be processor-executable to implement any element or action, as described herein. In one embodiment, the program instructions may implement at least a portion of methods described herein, such as the methods illustrated by FIGS. 34-38. In other embodiments, different elements and data may be included. Note that the data storage 3935 may include any data or information, as described herein.

Those skilled in the art will appreciate that the computer system 3900 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 3900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 3900 may be transmitted to the computer system 3900 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for performing one or more wearable article display operations, including a computing system. None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
    a computing system including a memory and at least one processor, wherein the computing system is configured to:
        receive a selection of one or more preferences for wearable articles,
        receive a selection of a first wearable article of a first article type displayed on a display screen,
        identify one or more additional wearable articles each having a different article type from the first article type, and
        generate for display on the display screen, with the first wearable article, a second wearable article of a second article type from the one or more additional wearable articles based on at least one preference of the one or more preferences, wherein the first wearable article is generated at a first portion on the display screen based on the first article type, the second article of the second article type, different from the first article type, is generated at a second portion of the display screen, different from the first portion, based on the second article type.

2. The electronic device of claim 1, wherein the one or more preferences include at least one of a style, a color scheme, a utility, a condition, or a price range.

3. The electronic device of claim 1, wherein the first article type is worn on a first part of a human body, and wherein the second article type is worn on a second part of the human body that is different from the first part of the human body.

4. The electronic device of claim 1, wherein the first wearable article and the second wearable article are generated for display in the first portion and the second portion, respectively, on the display screen that are indicative of one or more portions of a human body.

5. The electronic device of claim 1, wherein the computing system is further configured to:
    generate for display on the display screen a third wearable article of a third article type from the one or more additional wearable articles based on at least one preference of the one or more preferences.

6. The electronic device of claim 1, wherein the computing system is further configured to:
    generate for display on the display screen, with the first wearable article and the second wearable article, a third wearable article of a third article type from the one or more additional wearable articles based on at least one preference of the one or more preferences, wherein the third wearable article is generated at a third portion on the display screen based on the third article type, and the third portion is different from the first portion and the second portion.

7. The electronic device of claim 6, wherein the first wearable article,
    the second wearable article, and the third wearable article are generated for display in the first portion, the second portion, and the third portion, respectively, on the display screen that are indicative of one or more portions of a human body.

8. The electronic device of claim 1, wherein the first wearable article and the one or more additional wearable articles each comprise at least one of: a pair of shoes, a pair of pants, a rain jacket, a sweater, a pair of socks, a pair stockings, a shirt, a blouse, a coat, a hat, a pair of sunglasses, a bracelet, a ring, a pair of earrings, an undergarment, a scarf, a pair of leggings, a swimsuit, a robe, a pair of slippers, a pair of sandals, a clutch, a shawl, a purse, a handbag, a tie, a pair of cuff-links, a belt, a wallet, or a watch.

9. A method implemented by a computing system of an electronic device, the method comprising:
    receiving, by the computing system, a selection of one or more preferences for wearable articles;

receiving, by the computing system, a selection of a first wearable article of a first article type displayed on a display screen;

identifying, by the computing system, one or more additional wearable articles each having a different article type from the first article type; and generating, by the computing system, for display on the display screen, with the first wearable article, a second wearable article of a second article type from the one or more additional wearable articles based on at least one preference of the one or more preferences, wherein the first wearable article is generated at a first portion on the display screen based on the first article type, the second article of the second article type, different from the first article type, is generated at a second portion of the display screen, different from the first portion, based on the second article type.

10. The method of claim 9, wherein the one or more preferences include at least one of a style, a color scheme, a utility, a condition, or a price range.

11. The method of claim 9, wherein the first article type is worn on a first part of a human body, and wherein the second article type is worn on a second part of the human body that is different from the first part of the human body.

12. The method of claim 9, wherein the first wearable article and the second wearable article are generated for display in the first portion and the second portion, respectively, on the display screen that are indicative of one or more portions of a human body.

13. The method of claim 9, wherein the method further comprises:

generating, by the computing system, for display on the display screen a third wearable article of a third article type from the one or more additional wearable articles based on at least one preference of the one or more preferences.

14. The method of claim 9, wherein the method further comprises:

generating, by the computing system, for display on the display screen, with the first wearable article and the second wearable article, a third wearable article of a third article type from the one or more additional wearable articles based on at least one preference of the one or more preferences, wherein the third wearable article is generated at a third portion on the display screen based on the third article type, and the third portion is different from the first portion and the second portion.

15. The method of claim 14, wherein the first wearable article, the second wearable article, and the third wearable article are generated for display in the first portion, the second portion, and the third portion, respectively, on the display screen that are indicative of one or more portions of a human body.

16. The method of claim 9, wherein the first wearable article and the one or more additional wearable articles each comprise at least one of: a pair of shoes, a pair of pants, a rain jacket, a sweater, a pair of socks, a pair stockings, a shirt, a blouse, a coat, a hat, a pair of sunglasses, a bracelet, a ring, a pair of earrings, an undergarment, a scarf, a pair of leggings, a swimsuit, a robe, a pair of slippers, a pair of sandals, a clutch, a shawl, a purse, a handbag, a tie, a pair of cuff-links, a belt, a wallet, or a watch.

17. A non-transitory, computer-readable storage medium storing one or more executable instructions that, when executed by at least one processor, causes the at least one processor to:

receive a selection of one or more preferences for wearable articles;

receive a selection of a first wearable article of a first article type displayed on a display screen;

identify one or more additional wearable articles each having a different article type from the first article type; and generate for display on the display screen, with the first wearable article, a second wearable article of a second article type from the one or more additional wearable articles based on at least one preference of the one or more preferences, wherein the first wearable article is generated at a first portion on the display screen based on the first article type, the second article of the second article type, different from the first article type, is generated at a second portion of the display screen, different from the first portion, based on the second article type.

18. The non-transitory, computer-readable storage medium of claim 17, wherein the one or more preferences include at least one of a style, a color scheme, a utility, a condition, or a price range.

* * * * *